United States Patent [19]
Keene et al.

[11] Patent Number: 5,836,323
[45] Date of Patent: Nov. 17, 1998

[54] AUTOMATED METHOD AND APPARATUS FOR HYDRATING SOFT CONTACT LENSES

[75] Inventors: Darren Scott Keene; Timothy Patrick Newton; Daniel Tsu-Fang Wang; David Dolan, all of Jacksonville, Fla.; Kiyoshi Imai, Urawa; Katsuaki Yoshida, Honzyo, both of Japan; Svend Christensen, Allinge, Denmark; Finn Thrige Andersen, Vedbaek, Denmark; Ture Kindt-Larsen, Holte, Denmark; Kaj Bjerre, Vallensbaek Strand, Denmark; Junichi Fukuchi, Toyko, Japan; David Byram, Bunnell; Gary Hall, Jacksonville, both of Fla.

[73] Assignee: Johnson & Johnson Vision Products, Inc., Jacksonville, Fla.

[21] Appl. No.: 643,965

[22] Filed: May 7, 1996

Related U.S. Application Data

[63] Continuation-in-part of Ser. No. 432,935, May 1, 1995, Pat. No. 5,640,980, which is a continuation-in-part of Ser. No. 258,556, Jun. 10, 1994, Pat. No. 5,476,111.

[51] Int. Cl.⁶ ........................................................ B08B 3/04
[52] U.S. Cl. ............................ 134/58 R; 134/66; 134/901
[58] Field of Search .................................. 134/901, 58 R, 134/59, 66, 76, 77; 901/8; 414/222, 225, 226

[56] References Cited

U.S. PATENT DOCUMENTS

| | | | |
|---|---|---|---|
| 4,816,232 | 3/1989 | Barrau et al. | 134/901 X |
| 4,936,329 | 6/1990 | Michael et al. | 134/66 X |
| 4,985,722 | 1/1991 | Ushijima et al. | 134/66 X |
| 4,986,290 | 1/1991 | Oguma et al. | 134/901 X |
| 5,080,117 | 1/1992 | Yang | 134/901 X |
| 5,161,559 | 11/1992 | Yoshihara et al. | 134/901 X |

Primary Examiner—Philip R. Coe

[57] ABSTRACT

An automated means for hydrating a molded hydrophilic contact lens is provided in which a first robotic assembly removes a plurality of contact lens molds from a production line carrier, each of the lens molds having a contact lens adhered therein. The first robotic assembly transports the molds to a first staging area where the lens molds are sandwiched between a lens mold carrier and a top chamber plate to form a first hydration carrier. A first rotary transfer device then hands the first hydration carrier to a second robotic assembly which immerses the first hydration carrier in a hydration bath to hydrate the lens and to release the lens from the lens mold. While the lens is immersed in the hydration bath, each lens is transferred from its respective mold to a lens transfer means found within the top chamber plate. After a predetermined period of time, the second robotic assembly removes the first hydration carrier from the hydration bath and hands the hydration carrier off to a second rotary transfer device which rotates the first hydration carrier and aligns it for transfer to a third robotic assembly. The third robotic assembly then carries the top chamber plate and contact lenses through a series of steps in which the lens mold carrier and lens molds are removed from the top chamber plate. The lenses carried on the lens transfer means are then flushed and transported for assembly with a hydration base member to form a second hydration carrier for processing the lens in subsequent extraction stations. The second hydration carrier is then transported through a plurality of flushing or extraction stations wherein fresh deionized water is introduced into the hydration chambers at each hydration station to flush leachable substances from the hydration chamber. At each flushing station, fresh deionized water is introduced into the hydration chamber to remove previously extracted impurities and the products of hydrolysis. A final robotic dis-assembly device separates the top chamber plate and lens transfer means from the hydration base member, to provide fully hydrated lenses in a concave lens holding means ready for transfer to inspection and packaging stations.

41 Claims, 38 Drawing Sheets

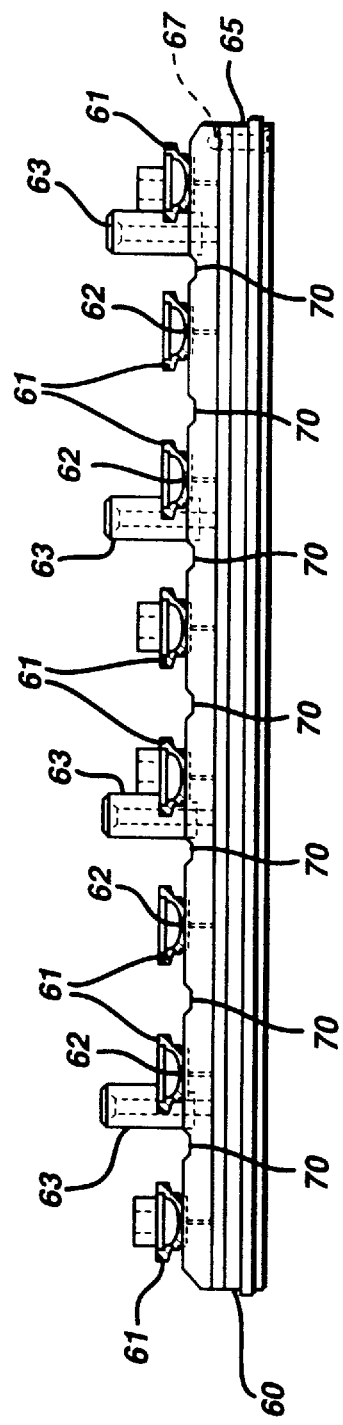

AUTOMATED METHOD AND APPARATUS FOR HYDRATING SOFT CONTACT LENSES

CROSS REFERENCE TO RELATED APPLICATIONS

This application is a continuation-in-part of Ser. No. 08/432,935 filed May 1, 1995, and now U.S. Pat. No. 5,640,980, which was in turn a continuation-in-part of Ser. No. 08/258,556 filed Jun. 10, 1994, and now U.S. Pat. No. 5,476,111, the entire disclosures of which are incorporated herein by reference thereto.

FIELD OF THE INVENTION

The present invention relates generally to the field of manufacturing ophthamalic lenses, especially molded, hydrophilic contact lenses, and more specifically, to a high speed automated method and apparatus for demolding and hydrating the lenses after polymerization.

DESCRIPTION OF THE PRIOR ART

The molding of hydrophilic contact lenses is disclosed in U.S. Pat. No. 4,495,313 to Larsen, U.S. Pat. No. 4,565,348 to Larsen, U.S. Pat. No. 4,640,489 to Larsen et al., U.S. Pat. No. 4,680,336 to Larsen et al., U.S. Pat. No. 4,889,664 to Larsen et al., and U.S. Pat. No. 5,039,459 to Larsen et al., all of which are assigned to the assignee of the present invention. This prior art discloses a contact lens production process wherein each lens is formed by sandwiching a monomer or a monomer mixture between a front curve (lower) mold section and a back curve (upper) mold section, carried in a 2×4 mold array. The monomer is polymerized, thus forming a lens, which is then removed from the mold sections and further treated in a hydration bath and packaged for consumer use. During polymerization, particularly of the hydrogels, the lens tends to shrink. To reduce shrinkage, the monomer is polymerized in the presence of an inert diluent like boric acid ester as described in the above patents, which fills up the spaces in the hydrogel lens during polymerization. The diluent is subsequently exchanged for water during the hydration process.

The prior art process of exchanging the diluent for water and hydrating the lens has been very time consuming. The two part molds are opened and the lenses are assembled in large groups and placed in a leaching tank for several hours. The leach tank includes heated water, small amounts of surfactants and salts. When the lenses are inserted in the leach tank they immediately expand in the presence of water and release from the mold in which they were molded. The boric acid ester diluent hydrolyzes into glycerol and boric acid leaving the water behind in the matrix of the lens to thus exchange diluent for water to hydrate the lens.

Salts and a pH buffer are used in the water so that the water placed in a lens has an osmolality and pH substantially similar to that of human tears so that the lens will not irritate the eye when it is inserted by the user. If the polymer from which the lens is made has ionic characteristics, the buffer neutralizes any ionic species in the lens. That neutralization causes temporary destabilization of the dimensions of the lens and requires an extended period of time to complete.

The lenses are then transferred to a rinse tank where removal of diluent and surfactant continues for another extended period of time. The lenses are then transferred to a large equilibration tank filled with heated water and salts for completion of diluent and surfactant removal and equilibration of the lenses for several more hours. The equilibration step entails completion of the neutralization of any ionic species in the polymer from which the lens is made. The lens is then removed from the equilibration tank and rinsed in clean saline and transferred for inspecting and packaging.

U.S. Pat. Nos. 5,080,839 and 5,094,609 disclose respectively a process for hydrating soft contact lenses and a chamber for hydrating contact lenses which represent a substantial improvement over the foregoing prior art process. These patents teach the use of a unique chamber formed of a male and female member which forms a hydration cavity which permits the hydration of the lens without permitting it to invert or roll over. Fluid flow is introduced into the cavity about the lens from each side to extract leachable material from the lens. The process significantly reduces the amount of leaching fluid that is used and the amount of time that is needed for hydration, washing and extraction. The apparatus disclosed in these patents enabled placement on a frame suitable for automated handling. The process significantly reduced the through-put time by hydrating the lens and releasing the lens from the mold cavity with deionized water and a small amount of surfactant without any salts, so that the time consuming ionic neutralization of the polymer from which the lens blank is made does not occur during the hydration process. When deionized water is used, the final step of the process is to introduce buffered saline solution into the final package with the lens and then sealing the lens within the package so that final lens equilibration (ionic neutralization, final hydration and final lens dimensioning) is accomplished in the package at room temperature or during sterilization.

As taught in these prior art references, the use of deionized water is an important step in this process because it allows the time consuming ionic neutralization to be done essentially outside the hydration process after the lens has been packaged and sealed.

While the chamber and process described in the foregoing patents enabled automated handling of the lens during hydration, suitable automated equipment to handle these chambers at high production rates and implement this process in a fully automated apparatus was not readily available or taught by the prior art.

SUMMARY OF THE INVENTION

It is therefore an object of the present invention to provide an automated process and apparatus that will enable high production rates in the hydration process disclosed in U.S. Pat. No. 5,080,839. It is a further object of the present invention to provide a high speed robotic apparatus to facilitate the handling and manipulation of lens molds having a molded hydrophilic contact lens therein and the chambers described in the U.S. Pat. No. 5,094,069 in a high through-put, high production rate automated apparatus.

It is an object of the present invention to provide an automated means for hydrating a molded hydrophilic contact lens wherein a first robotic assembly removes a plurality of contact lens molds from a production line carrier, wherein each of the lens molds has a contact lens adhered thereto. The first robotic assembly transports the molds to a first staging area where the lens molds are sandwiched between a lens mold carrier and a top chamber plate to form a first hydration carrier. A first rotary transfer device then hands the first hydration carrier to a first pick and place robotic assembly which immerses the first hydration carrier in a hydration bath to hydrate the lens and to release the lens from the lens mold. While the lens is immersed in the hydration bath, each lens is transferred from its respective mold to a lens transfer means found within the top chamber plate. After a predetermined period of time, a second pick and place robotic assembly removes the first hydration carrier from the hydration bath and hands the hydration carrier off to a second rotary transfer device which rotates the first hydration carrier and transports the hydration carrier to a disassembly station in which the lens mold carrier and lens molds are removed from the top chamber plate. The first and second pick and place robotic assembly may be collectively referred to as the second robotic assembly. A third robotic assembly aligns the hydration carrier for dis-assembly of the molds and mold carrier plate. After removal of the mold carrier plate at the disassembly station, the third robotic assembly then carries the top chamber plate and contact lenses through a series of steps to flush the lenses and transport them and the top chamber plate to an assembly station for assembly with a hydration base member to form a second hydration carrier for processing the lens in subsequent extraction stations. The second hydration carrier is then transported through a plurality of flushing or extraction stations wherein fresh deionized water is introduced into the hydration chambers at each hydration station to flush leachable substances from the hydration chamber. During transit travel between flushing stations, the residual fluid in the hydration chamber extracts impurities from the contact lens through mass transfer exchange. At each flushing station, fresh deionized water is introduced into the hydration chamber to remove previously extracted impurities and the products of hydrolysis. A final robotic dis-assembly device separates the top chamber plate and lens transfer means from the hydration base member, to provide fully hydrated lenses in a concave lens holding means ready for transfer to inspection and packaging stations.

It is an object of the present invention to provide a method and apparatus for the high speed robotic handling of soft, wet and slippery contact lenses, primarily through fluid flow devices, which transport the lens and move it from carrier to carrier without physically damaging the lens, losing the lens, or allowing it to invert or roll over.

It is also an object of the present invention to provide a method for handling the lenses which will minimize the formation of air bubbles which might otherwise impair subsequent handling of the lens in a fluid transfer media.

It is further an object of the present invention to provide a robotic handling device that will quickly and efficiently handle a large number of discreet individual molds having a molded contact lens therein, and then eject said discreet mold parts after said lens has been released and transferred to a lens carrier. It is further an object of the present invention to provide high speed robotic devices for handling a plurality of contact lenses which secure the contact lenses to the lens carrier elements with surface tension, and releases the lenses from the carrier elements via fluid flow of air or water.

It is another object of the present invention to provide a walking beam device for transporting a plurality of first hydration carriers through a hydration bath from a first pick and place robotic assembly to a second pick and place robotic assembly which removes the first hydration carrier from the hydration bath.

It is another object of the present invention to provide an automated control means for sequencing and coordinating each of the robotic assemblies used in the transfer of lenses from the production line pallet, through hydration and extraction stations, and finally to an inspection carrier.

It is still another object of the present invention to provide improved handling devices which improve the overall yield of the system, as compared to the Method and Apparatus for Hydrating Soft Contact Lenses as described in the two parent patent applications referred to above.

While the invention is described with particular reference to molded contact lenses wherein the lens is molded between a first and second mold half, it is understood that the hydrating apparatus is equally suitable for the hydration of lenses formed by lathe cutting wherein the hydrogel is maintained in a dry state while the desired optical surfaces may be used with spin cast lenses which subject a liquid monomer to a centrifugal force in a mold which has the same shape as the desired optical surface of the lens.

It is an object of the present invention to provide an automated process and apparatus for hydrating contact lenses where the volume of solution used to release and hydrate the lens is significantly reduced, and to significantly reduce the quantity of chemicals used in the hydration process.

It is another object of the present invention to provide a high speed automated apparatus and method to remove leachable substances with water, alcohol, or other organic solvents, or a mixture thereof, thus flushing unreacted monomers, catalysts and/or partially reacted comonomers, diluents or other impurities from a hydrophilic contact lens.

Finally, it is an object of the present invention to provide a high speed automated method and apparatus for hydrating contact lenses formed in an automated production line as more fully described in application Ser. No. 08/258,655, "Consolidated Contact Lens Molding", the disclosure of which is incorporated herein by reference thereto.

BRIEF DESCRIPTION OF THE DRAWINGS

The foregoing objects and advantages of the present invention for an automated method and apparatus for hydrating soft contact lenses may be more readily understood by one skilled in the art with reference being had to the following detailed description of the preferred embodiments, taken in conjunction with the accompanied drawings, wherein like elements are designated by identical reference numerals throughout the several views, and in which:

FIG. 6 is a side or elevation view of a hydration base carrier utilized in the present invention.

DETAILED DESCRIPTION OF THE PREFERRED EMBODIMENTS

Figure 1:
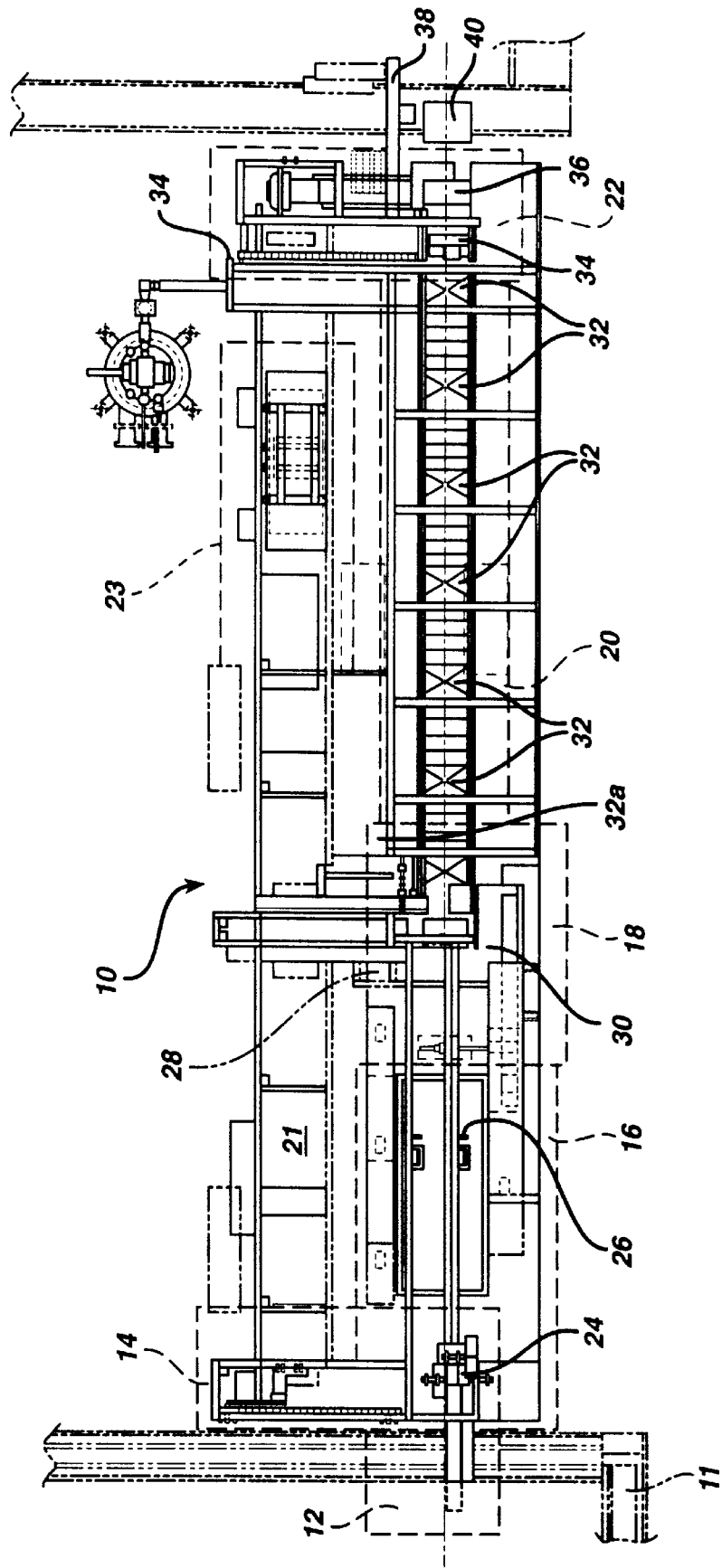
FIG. 1 is a top plan view of the apparatus of the present invention illustrating in block form the arrangement and relative location of each of the robotic handling devices of the present invention.

The present invention is an automated method and apparatus for hydrating soft contact lenses, especially molded hydrophilic contact lenses manufactured in two-part molds in the presence of a diluent and then polymerized in the presence of a catalyst with ultraviolet light. After the polymerization process is completed, the two halves of the mold are separated or demolded with the contact lens preferentially adhered to the front curve mold half, as more fully described in application Ser. No. 08/258,155 filed Jun. 10, 1994 entitled "Consolidated Contact Lens Molding". While the invention described herein is preferentially utilized in combination with the automated production line disclosed therein, it is understood that the present invention is equally suitable for the hydration of lenses formed by lathe cutting wherein the hydrogel is maintained in a dry state while the desired optical surfaces are cut and polished, or with contact lenses formed by the spin cast method wherein a liquid monomer is subjected to centrifugal force in a mold which has the same shape as the desired optical surface of the lens.

The present invention is also an improved and simplified form of the apparatus illustrated in the two parent applications, U.S. Ser. No. 08/258,556 and U.S. Ser. No. 08/432,935, both of which are entitled "Automated Method and Apparatus for Hydrating Soft Contact Lenses", the disclosures of which are incorporated herein by reference thereto.

The present invention is particularly suited to the hydration of hydrophilic contact lenses formed from monomer and monomer mixtures which include copolymers based on 2-hydroxyethyl methacrylate ("HEMA") and one or more comonomers such as 2-hydroxyethyl acrylate, methyl acrylate, methyl methacrylate, vinyl pyrrolidone, N-vinyl acrylamide, hydroxypropyl methacrylate, isobutyl methacrylate, styrene, ethoxyethyl methacrylate, methoxy triethyleneglycol methacrylate, glycidyl methacrylate, diacetone acrylamide, vinyl acetate, acrylamide, hydroxytrimethylene acrylate, methoxyethyl methacrylate, acrylic acid, methacryliccid, glyceryl methacrylate, and dimethylaino ethylacrylate.

Preferred polymerizable compositions are disclosed in U.S. Pat. No. 4,495,313 to Larsen, U.S. Pat. No. 5,039,459 to Larsen et al. an U.S. Pat. No. 4,680,336 to Larsen et al., which include anhydrous mixtures of a polymerizable hydrophilic hydroxy ester of acrylic acid or methacrylic acid and a polyhydric alcohol, and a water displaceable ester or boric acid and a polyhydroxyl compound having preferably at least 3 hydroxyl groups. Polymerization of such compositions, followed by displacement of the boric acid ester with water, yields a hydrophilic contact lens.

The polymerizable compositions preferably contain a small amount of a cross-linking agent, usually from 0.05 to 2% and most frequently from 0.05 to 1.0%, of a diester or triester. Examples of representative cross linking agents include: ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylglycol dimethacrylate, dipropylene glycol dimethacrylate, diethylene glycol diacrylate, dipropylene glycol diacrylate, glycerine trimethacrylate, trimethylol propane triacrylate, trimethylol propane trimethacrylate, and the like. Typical cross-linking agents usually, but not necessarily, have at least two ethylenically unsaturated double bonds.

The polymerizable compositions generally also include a catalyst, usually from about 0.05 to 1% of a free radical catalyst. Typical examples of such catalysts include lauroyl peroxide, benzoyl peroxide, isopropyl percarbonate, azobisisobutyronitrile and known redox systems such as the ammonium persulfate-sodium metabisulfite combination and the like. Irradiation by ultraviolet light, electron beam or a radioactive source may also be employed to catalyze the polymerization reaction, optionally with the addition of a polymerization initiator. Representative initiators include camphorquinone, ethyl-4-(N,N-dimethyl-amino) benzoate, and 4-(2-hydroxyethoxy) phenyl-2-hydroxyl-2-propyl ketone.

Polymerization of the monomer or monomer mixture in the mold assembly is preferably carried out by exposing the composition to polymerization initiating conditions. The preferred technique is to include in the composition, initiators which work upon exposure to ultraviolet radiation; and exposing the composition to ultraviolet radiation of an intensity and duration effective to initiate polymerization and to allow it to proceed. For this reason, the mold halves are preferably transparent to ultraviolet radiation. After the precure step, the monomer is again exposed to ultraviolet radiation in a cure step in which the polymerization is permitted to proceed to completion. The required duration of the remainder of the reaction can readily be ascertained experimentally for any polymerizable composition.

After the lens has been polymerized, it is demolded in preparation for the hydration process. The hydration process of the present invention is used to hydrolyze the diluent used in the monomer or monomer mixture and then extract or leach from the lens the products of hydrolysis, together with unreacted or partially reacted monomer or inhibitors, surfactants from the lens. In the hydration step, a plurality of lenses, still adhered to the mold in which they were formed, are immersed in a deionized water bath having a small amount of surfactant therein. The hydration bath hydrolyses the boric acid ester used as a diluent in the lens into glycerol and boric acid which is then exchanged by the physical phenomenon of mass transfer by the concentration gradient of the products of hydrolysis between the contact lens and the fluid in the hydration tank.

Simultaneously, the lens, in the presence of deionized water and surfactant, swells, creating a shear force with respect to the mold in which the lens was formed thereby separating the contact lens from the mold. After the contact lens and mold have been separated, they are removed from the hydration bath, the mold is discarded, and the lens is placed in a hydration chamber in a manner similar to that described in U.S. Pat. No. 5,094,609. While the lens is in the hydration chamber, deionized water is introduced through the chamber to periodically flush the chamber and permit extraction of impurities from the contact lens. As the extraction continues, the concentration gradient between the lens and each batch of fresh deionized water diminishes, and it is therefore useful to provide a residence time between each of the extraction stations. In the preferred embodiment of the invention, extraction is carried out in a series of discreet steps where fresh deionized water is introduced into the hydration cavity for approximately 2 seconds, while the residence time for leaching or mass transfer exchange continues for approximately 72 seconds between each extraction or washing station. After 6 such step-wise extraction steps, the products of hydrolysis, monomers and surfactants have been reduced below detectable levels.

In the process for the present invention, the wet contact lens is transferred by a variety of techniques, including gravity, surface tension, and fluids that are introduced through the lens from convex to concave lens holding surfaces, or vice versa. In the present invention, both air and water are utilized as suitable fluids. This avoids direct mechanical handling of the lens as it is transferred from chamber to chamber thereby minimizing physical damage to the lens.

SUMMARY OF OPERATION

Figure 2:
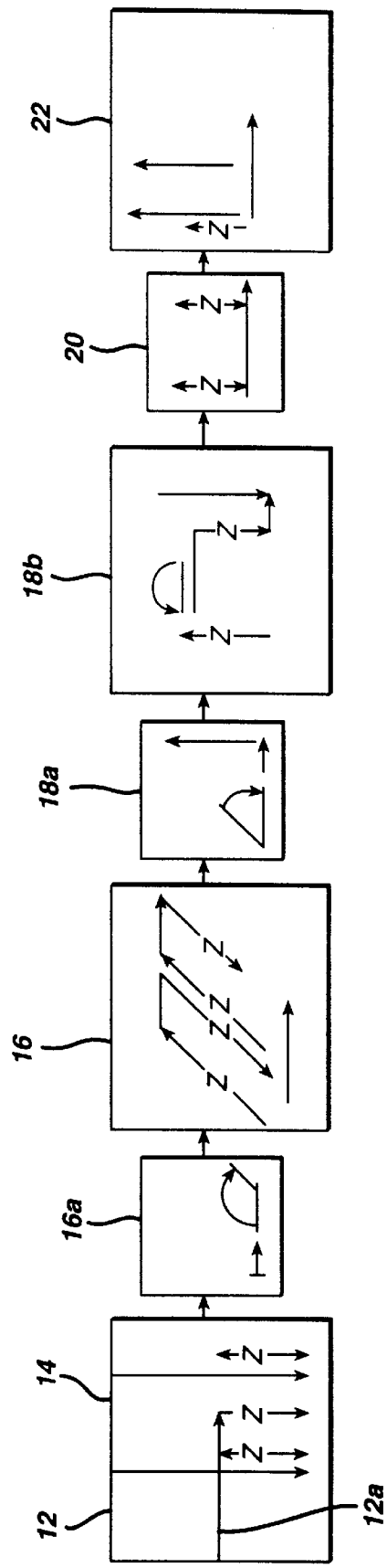
FIG. 2 is a schematic illustration of the relative motion imparted by each of the robotic handling devices as the lenses are transported through the hydration apparatus of the present invention.
Figure 3:
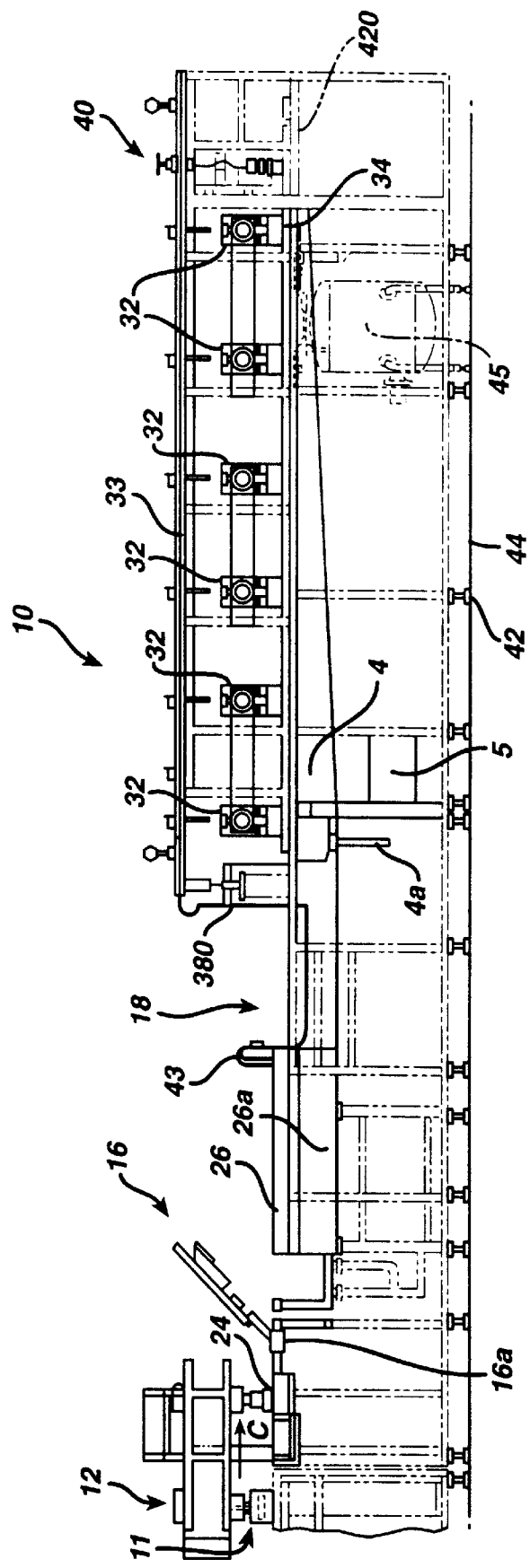
FIG. 3 is an elevation view of the apparatus illustrated in FIG. 1 illustrating in schematic form the principle components of the present invention.

FIGS. 1, 2 and 3 illustrate diagrammatically and in block form the preferred embodiment of the automated means for hydrating a mold and hydrophilic contact lens of the present invention. As illustrated in FIG. 1 an automated production line having an output conveyor 11 supplies a plurality of pallets to a first robotic assembly which transfers the lens molds and contact lenses from pallets of the production line conveyor 11 to the hydration apparatus 10 of the present invention.

While any suitable pallet arrangement would be satisfactory, the invention is described with respect to hydration carriers that handle thirty-two lenses at once, taken from four separate production pallets simultaneously. This arrangement achieves a suitable compromise between a desirable batch size and convenient robotic handling, although it is understood that a variety of pallet configurations and lens arrangements would be suitable, depending on the output rate and configuration of the contact lens production line.

For the purposes of explanation, the term X axis will refer to the horizontal axis of FIG. 1 (the linear axis), the Y axis will refer to the vertical axis of FIG. 1 (the cross axis), and the Z axis will be perpendicular to the plane of FIG. 1 (the vertical axis).

Prior to the transfer of the lens mold and contact lenses from the production line conveyor 11, a first assembly device generally denoted by the dotted line box 14 in FIG. 1, transports a lens mold carrier plate from the return conveyor 21 to a staging area 24 to provide a carrier for receiving the individual lens molds and the associated contact lenses from the production line conveyor 11. The first assembly device will be described in greater detail with respect to the description accompanying FIGS. 11–13, but the diagrammatic motions thereof are depicted at 14 in FIG. 2 in which the assembly device makes a first trip in the Y axis to bring the lens mold carrier plate to the staging area 24, and then deposits the carrier plate with a short Z axis stroke. The first robotic assembly, delineated by the dotted line box 12 in FIG. 1, and more fully described in FIGS. 14 & 15, transfers the individual contact lens molds and associated contact lenses from the mold pallets on conveyor line 11 to the lens mold carrier at the staging area 24 with an X axis movement denoted at 12a in FIG. 2, and a short Z axis stroke to deposit the lens molds in the lens mold carrier plate. The first assembly device, located in dotted line box 14, then makes a second return stroke in the Y axis and deposits a top chamber plate on the assembled lens molds and carrier plate to form a first hydration assembly.

The first hydration assembly is then moved by a short stroke cylinder in the X axis is depicted in box 16a of FIG. 2 and then rotated 135° by a first rotary transfer device that is located adjacent the staging area 24 within the dotted line box 16 illustrated in FIG. 1. The area within the dotted line box 16 is more fully described in FIGS. 10–12, and includes the first assembly area 24, the first rotary transfer device, the first pick and place robotic assembly which moves the first hydration carriers to hydration tank 26, the walking beam transport of the hydration tank 26 and a second pick and place robotic device which removes the first hydration carrier from the hydration tank. The relative motion of the two pick and place robotic assemblies are illustrated in box 16 of FIG. 2 in which a first pick and place robot takes the first hydration carrier from the first rotary transfer device, translates it diagonally along the Z axis and then along the X axis, and then back down the Z axis for deposit in the hydration tank 26. A second pick and place robot removes the first hydration carrier from the hydration tank 26 after a pre-determined period of time and deposits it with the second rotary transfer device which rotates the carrier through 45° of motion illustrated in box 18a of FIG. 2. After rotation, the second rotary transfer device transports the first hydraulic carrier in the X axis to the first disassembly station. This enables a first dis-assembly robotic transfer device 28 to remove the lens mold carrier and the associated lens molds from the first hydration carrier. A third robotic assembly assists the second rotary device in aligning the first hydration carrier for dis-assembly. The dis-assembly device then moves in the Y axis as illustrated in box 18b of FIG. 2, discharges the lens molds into a collection bin, and then continues on to the return conveyor 21 to enable the lens mold carrier plate to be returned back to the first assembly device described with respect to dotted line 14.

A third robotic assembly receives the now inverted first hydration carrier at the disassembly station and transports it through a series of motions as illustrated in box 18b in FIG. 2. The third robotic assembly may be found within the dotted line box 18 of FIG. 1, and will be more fully described and illustrated with respect to FIGS. 20, 21 and 22. After the lens mold carrier plate has been removed, the top chamber plate, having a plurality of lens transport means and contact lenses adhered thereto is elevated in the Z axis as illustrated in box 18b of FIG. 2 to enable the contact lenses to be flushed. The top chamber plate is then inverted and further translated in the X axis, and then dropped along the Z axis to a hydration base carrier to form a second hydration carrier. The second hydration carrier is then advanced by a short stroke index conveyor 30 through the extraction line enclosed within dotted line box 20 of FIG. 1. The extraction line of FIG. 1 includes six extraction stations 32, each of which moves in a Z axis to flush and extract leachable compounds from the contact lens. Two of the Z movements are illustrated in box 20 of FIG. 2. The extraction stations will be further described and illustrated in FIGS. 23–25 of the drawings. After the flushing and extraction is completed, the top chamber plate is removed by a second robotic dis-assembly device generally located in the dotted line box 22 of FIG. 1. As illustrated in FIG. 2, the second robotic dis-assembly device removes top chamber plate with a short Z axis stroke and then a long Y axis stroke to carry the top chamber plate to the return conveyor line 21. The base carrier with the contact lenses therein is then translated in the X axis to the final staging area 36. A robotic lens transfer device 38 then removes the individual contact lenses from the base carrier unit and transports them to a plurality of inspection carriers generally located at 40 in FIG. 1. After the base carrier has been emptied of contact lenses, it is moved in the Y axis as illustrated in box 22 of FIG. 2 to be returned to the return conveyor 21. The second robotic dis-assembly device will be more fully described hereinafter with respect to FIGS. 26–29 of the drawings. The top chamber plate and the base carrier are sequentially washed and cleaned in a wash station generally indicated in the dotted line box 23 of FIG. 1. The wash station will be more fully described with respect to FIGS. 30–32 of the drawings. The timing and relative interaction of the various robotic assemblies and devices is determined by a programmable logic controller located in control means 5, symbolically illustrated in FIG. 3.

FIG. 3 is an elevation view of the hydration apparatus 10 which illustrates in diagrammatic form, some, but not all of the major components of the present invention. As illustrated in FIG. 3, the first robotic assembly, generally indicated at 12 carries a plurality of contact lens molds and contact lenses from the production line conveyor 11 to the assembly staging area 24. The robotic assembly device 14 provides the lens mold carrier plate and the top chamber plate that are used to create the first hydration carrier which is assembled at assembly area 24. The first hydration carrier is then rotated by the first rotary transfer device, indicated at 16a and positioned for the first pick and place robotic assembly 16, which receives the hydration carrier from the first rotary transfer device prior to insertion in the hydration tank 26. Hydration tank 26 is filled with deionized water having a small amount of surfactant therein, which is filled by means of filling assembly 43, and is kept at a constant temperature of 70°–80° C. by virtue of a thermostatically controlled heater. Tank 45 is to accumulate and pressurize deionized water for use in the hydration apparatus, which water is distributed along manifold 33 to the various station of the assembly. The deionized water is also degassed prior to use in the hydration apparatus. FIG. 3 also illustrates six extraction stations 32 which are also supplied with the deionized water from a common manifold 33. A collection sump 4 is used to collect deionized waste water from the extraction stations 32 and discharge the water through a drain pipe 4a to a floor drain. The final dis-assembly station 40 also includes a robotic dis-assembly device 34 which flushes the lenses as the top chamber plate is removed from the base carrier.

HYDRATION CARRIER ASSEMBLIES

Figure 4:
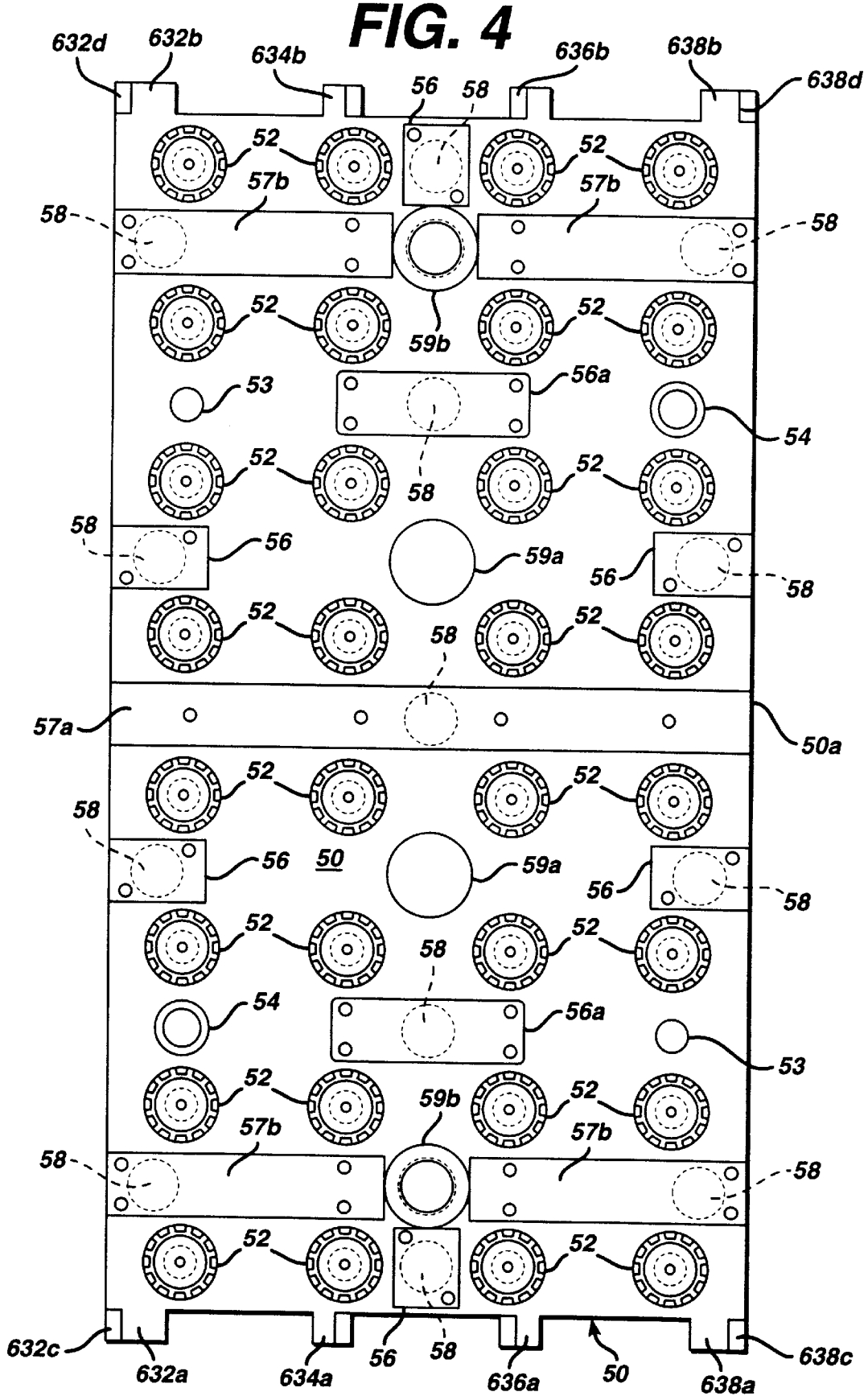
FIG. 4 is a plan view of the top chamber plate which is utilized as a lens transfer device in the present invention.
Figure 5:
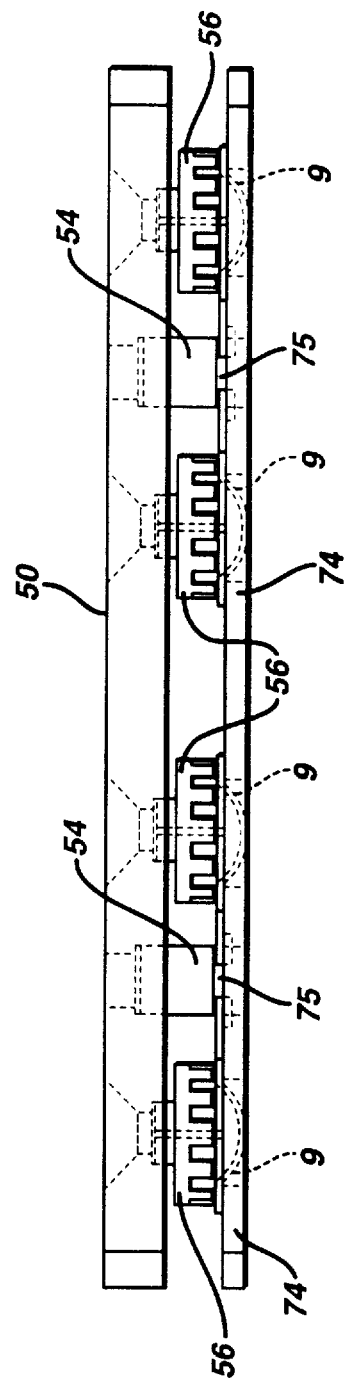
FIG. 5 is an end view of the top chamber plate illustrated in FIG. 4 attached to a lens mold carrier to form a first hydration assembly.
Figure 7:
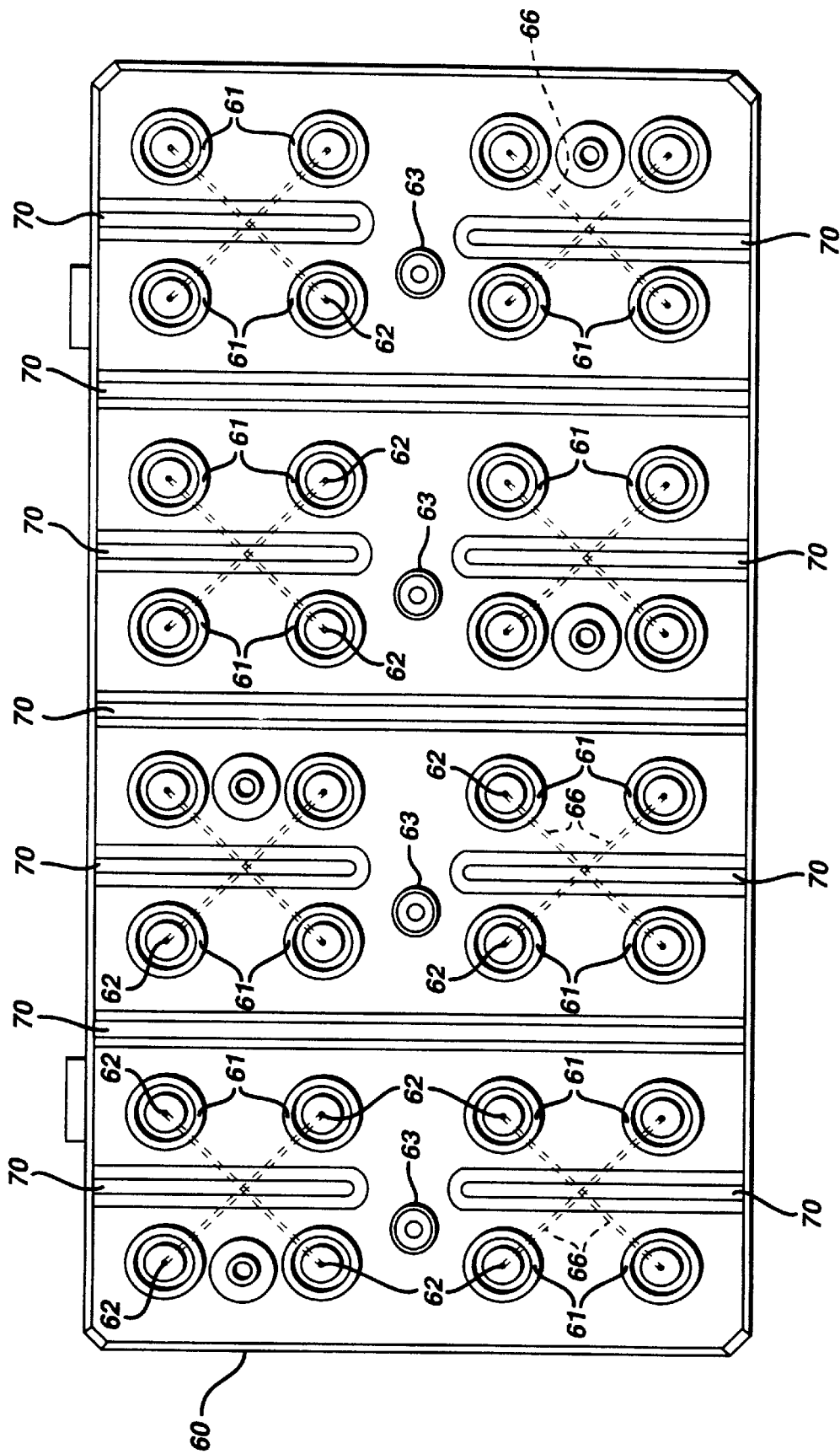
FIG. 7 is a top or plan view of the hydration base carrier illustrated in FIG. 6.
Figure 8:
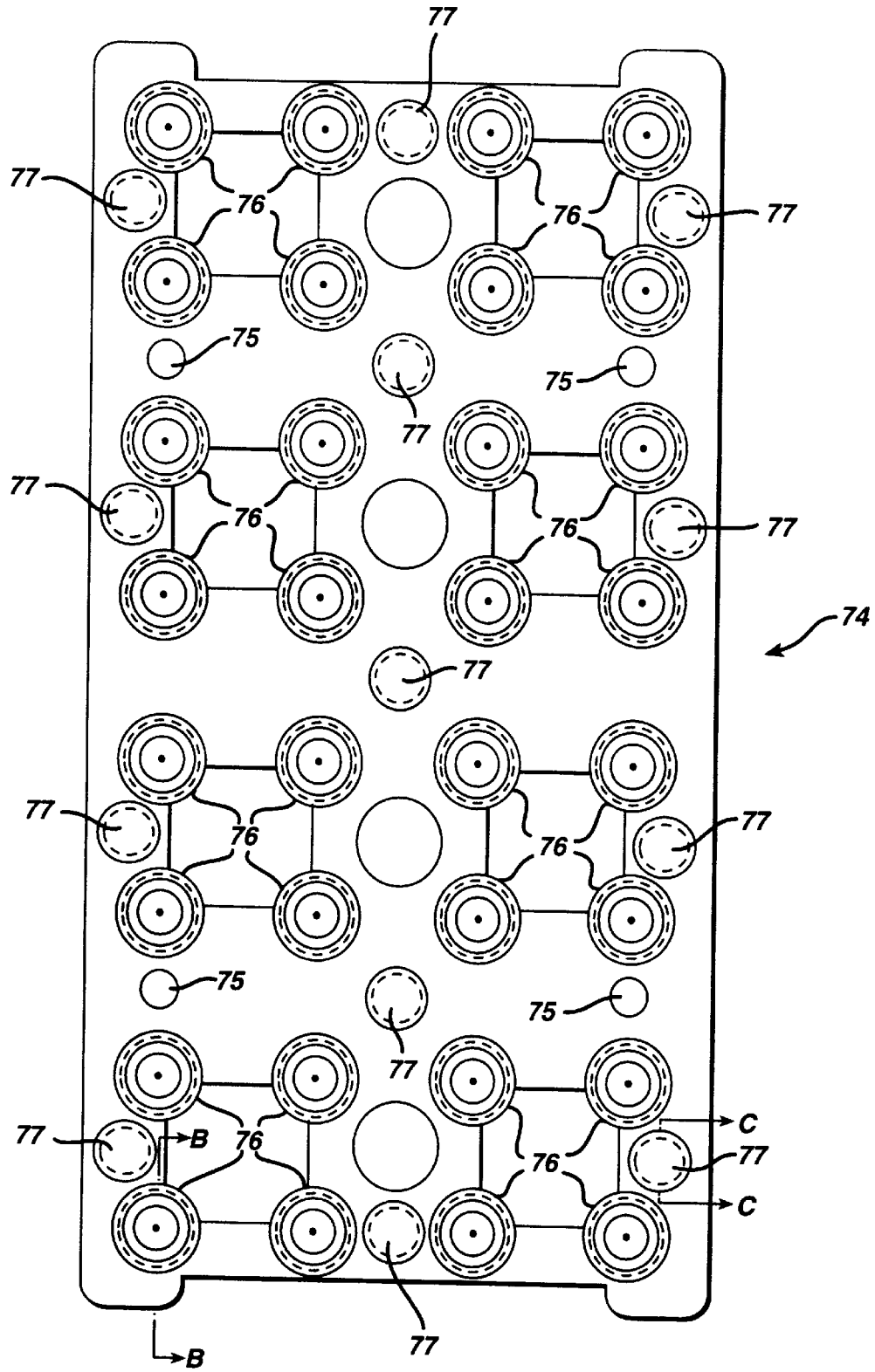
FIG. 8 is a top plan view of a lens mold carrier which may be used to receive the contact lens molds and lenses from the automated production line.

The first and second hydration carriers are illustrated in FIGS. 4–10 in which FIG. 4 is a top or plan view of the top chamber plate, and FIG. 8 is a plan view of the lens mold carrier plate, which when a top mated together as illustrated in FIG. 5 form the first hydration carrier assembly.

Figure 9:
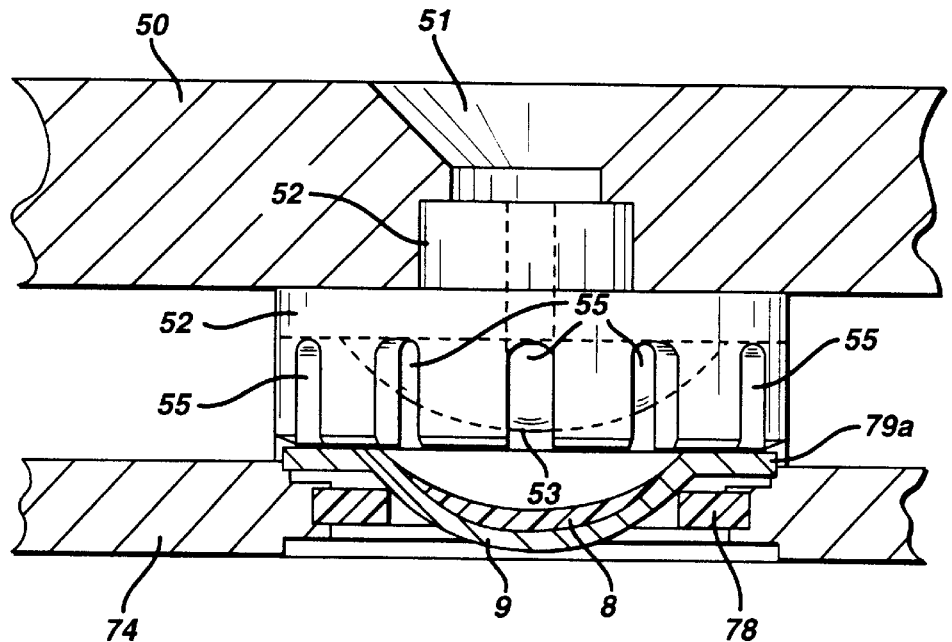
FIG. 9 is a partially cross-sectioned elevation view of a single lens transport means of the first hydration carrier, formed by the top chamber plate of FIG. 4, a contact lens mold and contact lens secured therein and the lens mold carrier of FIG. 8 which are assembled for transport through a hydration bath.
Figure 10:
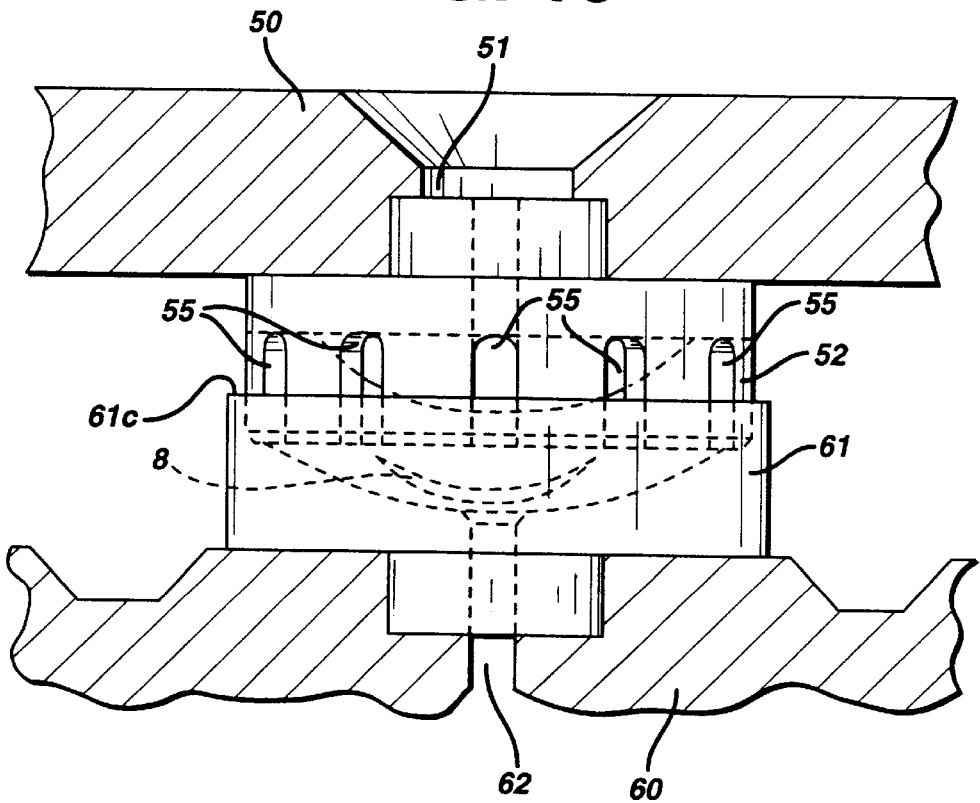
FIG. 10 is a partially cross-sectioned and elevation or side view of a single lens transport means of the second hydration carrier formed when the top chamber plate of FIG. 4 is combined with the hydration base carrier of FIGS. 6 and 7.

FIGS. 6 and 7 illustrate the base carrier, which when combined with the top chamber plate of FIG. 4 forms the second hydration carrier. Detailed cross-sections of each of the hydration carriers are illustrated in FIGS. 9 and 10, wherein FIG. 9 is a cross-section detail of a single hydration chamber of the first hydration assembly, and FIG. 10 is a cross-section detail of a single hydration chamber of the second hydration assembly.

Figure 4A:
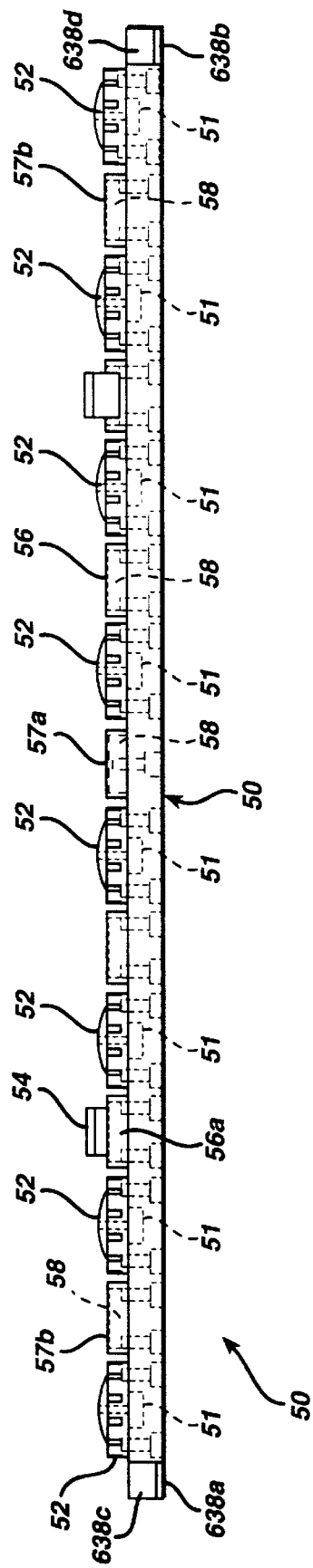
FIG. 4(a) is a side elevation view of the top chamber plate illustrated in FIG. 4.

As illustrated in FIGS. 4 and 4(a), the top chamber plate is illustrated in a plan and elevation view to facilitate the explanation thereof, while in FIG. 5, it is combined with the lens mold carrier plate in an assembled view. The top chamber plate 50 may be formed as metal such as hard coat aluminum, or plastic such as delrin or polycarbonate. The top chamber plate 50 includes a plurality of orifices 51 which are illustrated in FIG. 4(a). Each of the orifices 51 receives a single contact lens transfer means 52, thirty-two of which are illustrated in a 4×8 array in FIG. 4. The top chamber plate 50 also includes four drilled openings 53, two of which receive two registration pins 54 spaced diagonally on the plate. While four pins could be used, it has been found that two provide satisfactory results. The use of 2 pins, mounted diagonally in the 4 holes, enables symmetric use of the mold carrier plate, which has 4 matching drilled openings. Symmetric use is desirable since the mold carrier plate is flipped once in each cycle of operation.

The top chamber plate is secured to the lens mold carrier 74 by a plurality of magnets 58, thirteen of which are illustrated in FIG. 4. The magnets 58 are secured to the top chamber plate 50 by means of magnet holders 56, 56(a), 57, 57(a) and (57(b). These magnets are aligned with magnet steel buttons in the lens mold carrier as will be hereinafter explained in greater detail. While magnets have been used in the embodiment of the invention, it should be understood that a variety of quick release gripping means could be utilized such as polycarbonate or liquid crystalline polymer grips similar to the grip mechanism illustrated in the parent application U.S. Ser. No. 08/258,556 entitled Automated Method and Apparatus For Hydrating Soft Contact Lenses.

Figure 8A:
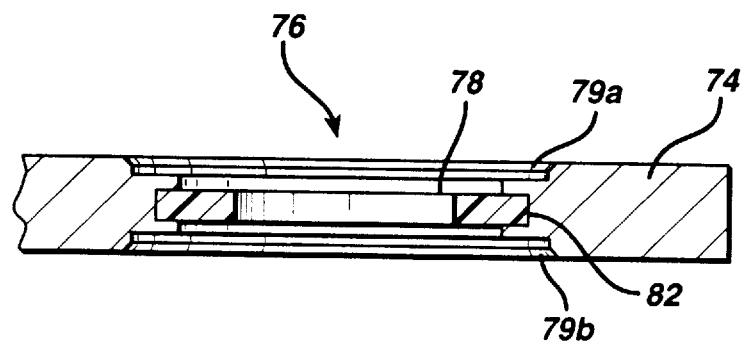
FIG. 8(a) is a cross-section detail taken along sectioned line B—B of FIG. 8.
Figure 8B:
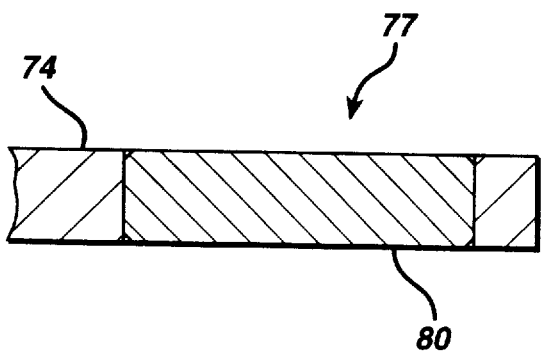
FIG. 8(b) is a cross-section detail taken along section line C—C of FIG. 8.

The lens mold carrier 74 is more fully described as illustrated with respect to FIGS. 8a and 8b. As illustrated in FIG. 8, the lens mold carrier plate 74 includes 32 openings 76 which are used to receive individual lens molds and the contact lens molded therein. The bowl of the contact lens mold is received within a resilient silicone rubber cushion washer 78 which centers the bowl and provides a resilient cupping between the plate and the mold when the mold is contacted by the lens receiving means 52 of the top chamber plate, as will be hereinafter described with respect to FIG. 9.

As illustrated in FIG. 8a, the cushioning washer 78 is centered within the lens mold carrier 74 and mounted within an annular O ring groove 82 formed in the center of opening 76. The operative faces of cushioning washer 78 are symmetrical on opposite sides of plate 74. This enables either side of the lens mold carrier 74 to receive the lens molds at the time the first hydration carrier is assembled.

As illustrated in FIG. 8b, a magnet steel 80 is secured within recesses 77 by press fitting the magnet steel into mold carrier plate 74. The magnet steel being is of 17-4 ph stainless steel which prevent oxidation or other reactions under normal process conditions. The magnet steel members 80 cooperate with the magnets 58 secured in the top chamber plate 50 to hold the two in a single assembly as illustrated in FIG. 5 as the first hydration carrier. Registration pins 54 engage two of the registration opening 75 defined in the lens mold carrier plate 74.

One optional form of construction is to form the mold carrier plate 74 in two planar parts, and sandwich the cushioning washers 78 and the magnet steels therebetween at the time of assembly.

Figure 5A:
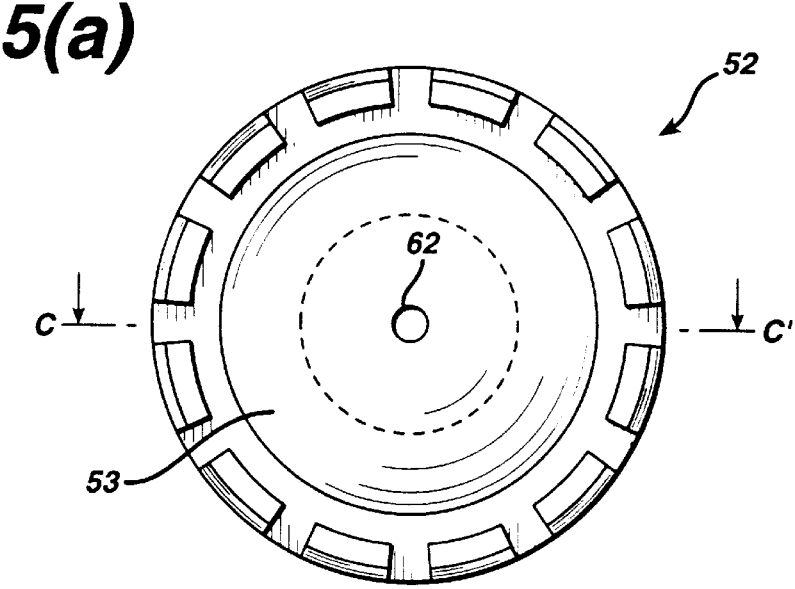
FIG. 5(a) is a plan view of a single lens transfer element utilized in the present invention.
Figure 5B:
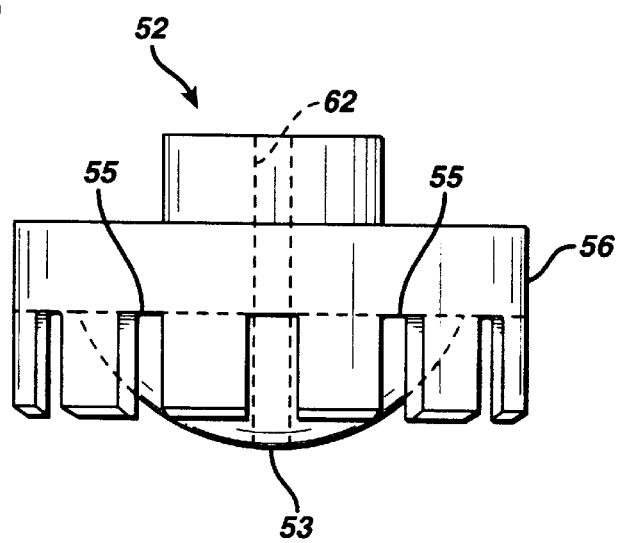
FIG. 5(b) is a side elevation view of the lens transfer element illustrated in FIG. 5(a).
Figure 5C:
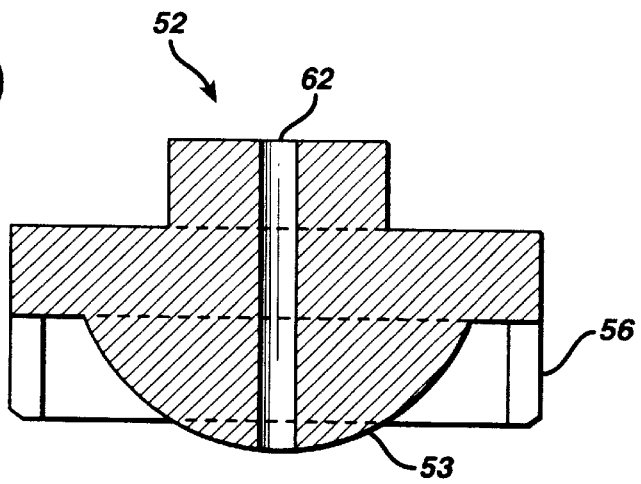
FIG. 5(c) is a cross-sectioned elevation view of the lens transfer element taken along section line C—C' of FIG. 5(a).

The convex lens transfer elements used in the present invention are illustrated in FIGS. 5(a)–(c) in which the convex surface 53 is molded to receive a soft contact lens, and to retain the lens with surface tension during transfer of the lens from one station to the next. The element is preferably molded of polyetheretherkentone (PEEK) which provides the desired surface finish and surface energy levels with a long production life under the process conditions of the present invention. A central orifice 62 is provided to provide a fluid flow to unseat a contact lens carried by the convex surface 53. An annular wall 56 surrounds the convex surface to prevent the loss of lenses that may not be correctly centered during transfer. A plurality of openings 55 are formed in the annular sidewall 56 to allow flushing fluids to escape when the contact lens is flushed with a continuous stream of de-ionized water, as for example, during flushing of the hydration chamber, when the convex surface is mated to a concave surface, as illustrated in FIG. 10.

The hydration base member 60, used to form the second hydration carrier, is more fully described and illustrated with respect to FIGS. 6 and 7 which illustrates a multi level carrier having a plurality of concave lens holding means 61 mounted thereon. The layers may be formed of metal, such as aluminum, or plastic such as polycarbonate, or a mixture thereof. In the preferred embodiment the upper layer is formed of aluminum, the inner manifold layers are formed of polycarbonate, the base member is formed of stainless steel with small protrusions to provide a desired spacing between carriers and the bottom layer is formed of Delrin to reduce friction. Each of the concave lens holding means 61 includes a central fluid orifice 62 for introducing a fluid between the contact lens holding means and a contact lens contained therein. As will be hereinafter described, this fluid may be air or water. Each of the fluid ports 62 is connected by a plurality of fluid passage ways which extend through each layer of the manifold to four upwardly extending fluid coupling members 63 illustrated in FIG. 6. Fluid introduced through these fluid coupling ports 63 travels through the coupling to four V shaped conduits defined in plate layer 65 to a series of cross over manifolds 66. The cross over manifolds 66 are defined in manifold layer 67 and feed directly to the fluid ports 62 defined in each of the concave lens holding means 61. In between each row of concave lens holding means 61 is a drain channel 70 which extends outwardly to drain liquid flowing from the hydration chambers defined by the concave lens holding means 61 to a collection sump tank 4 located below the extraction stations for collection and drainage. Sump tank 4 is diagrammatically illustrated in FIGS. 3 and 23.

As illustrated in FIG. 10, the hydration base illustrated in FIG. 6 and 7 is combined with the top chamber plate 50 illustrated in FIG. 4 to form the second hydration carrier having a plurality of hydration chambers therein. In the embodiments illustrated with the top chamber plate of FIG. 4 and the hydration base of FIG. 6 and 7, thirty-two separate hydration chambers are formed between the contact lens transfer surface 53 and each of the concave lens holding means 61. When the top chamber plate 50 is lowered into engagement with hydration base 60, the upwardly extending couplings 63 pass through the registration openings 59(a), 59(b) defined in the top chamber plate 50 to align and register the convex lens transfer surfaces with the concave lens holding means to form the plurality of hydration chambers. A plurality of openings 55 formed in a circumferential wall 56 of the contact lens transfer element 52 provides a plurality of fluid discharge openings for fluids introduced through fluid port 62 of the concave lens holding means, and port 51 of the top chamber plate 50. Thus, fluid may be introduced into the hydration chamber from either side of the contact lens during flushing of the hydration chamber, and will remain in the convex lens holding means 61 after flushing by virtue of fluid equilibrium which is established by rim 61c of the concave lens holding means. This residual fluid is used for extraction between flush cycles.

The first hydration assembly is illustrated in FIGS. 5 and 9 wherein FIG. 5 represents an end view of the top chamber plate 50 illustrated in FIG. 4, and FIG. 9 is an enlarged cross-section illustration of a single hydration chamber formed therein. The front curve lens mold 9 is secured within the lens carrier plate 74 and is centered within the rubber cushioning washer 78 with the annular flange of the lens mold centered within annular recess 79a. When the top chamber plate 50, lens mold 9 and the lens mold carrier 74 are assembled, the contact lens 8 is still adhered to the lens mold 9. During the hydration thereof, the assembly illustrated in FIG. 9 is inverted when placed in the hydration tank 26 and as the lens hydrates, it breaks free of the lens mold 9 and is transferred to the convex lens transfer means 53 by gravity. Thereafter, when the first hydration carrier is removed from the hydration bath, the contact lens 8 is secured to the convex lens transfer surface 53 by surface tension.

HYDRATION STAGING AND ASSEMBLY

The first and second robotic assemblies, the first and second rotary transfer devices, and the first assembly device are illustrated in FIGS. 11–19. These areas correspond to dotted line boxes 12, 14 and 16 of FIG. 1.

Figure 11:
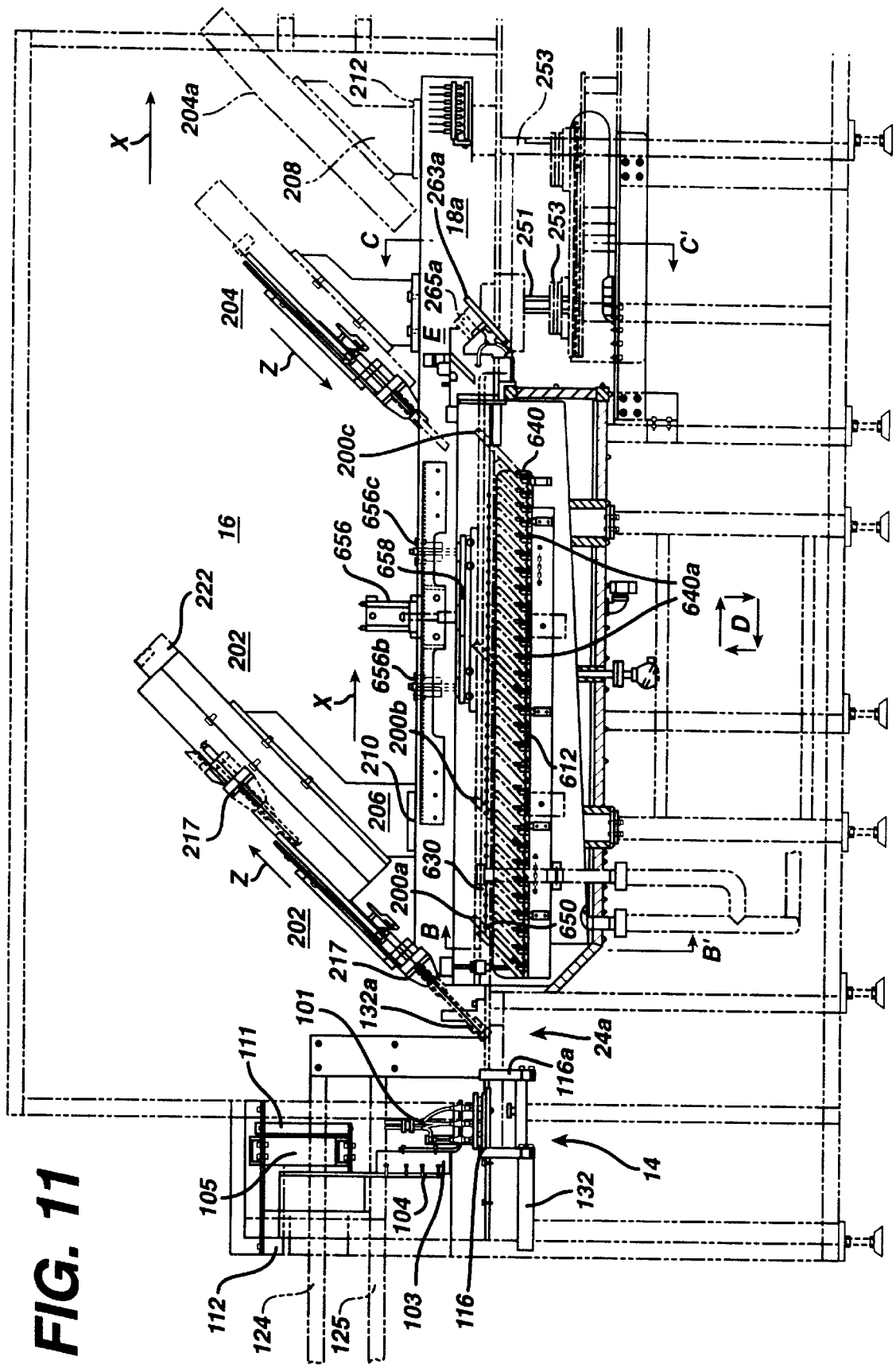
FIG. 11 is a partially cross-sectioned side view of the hydration tank of the present invention illustrating in elevation, portions of the first assembly device, the first rotary transfer device, and the first and second pick and place units of the second robotic assembly which transport the first hydration carrier through the hydration tank of the present invention.
Figure 12:
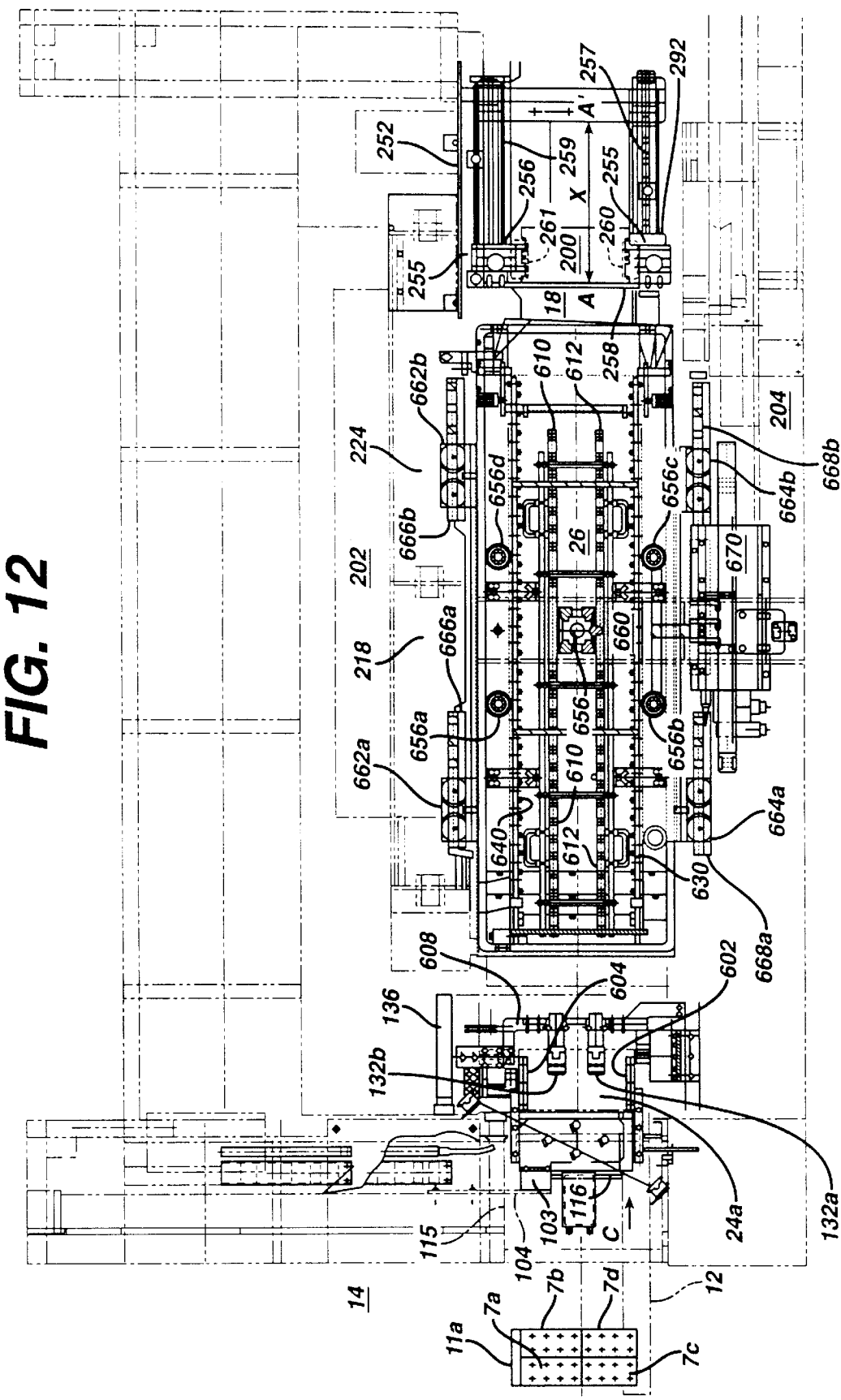
FIG. 12 is a top plan view of the portion of the hydration device illustrated in FIG. 11.
Figure 13:
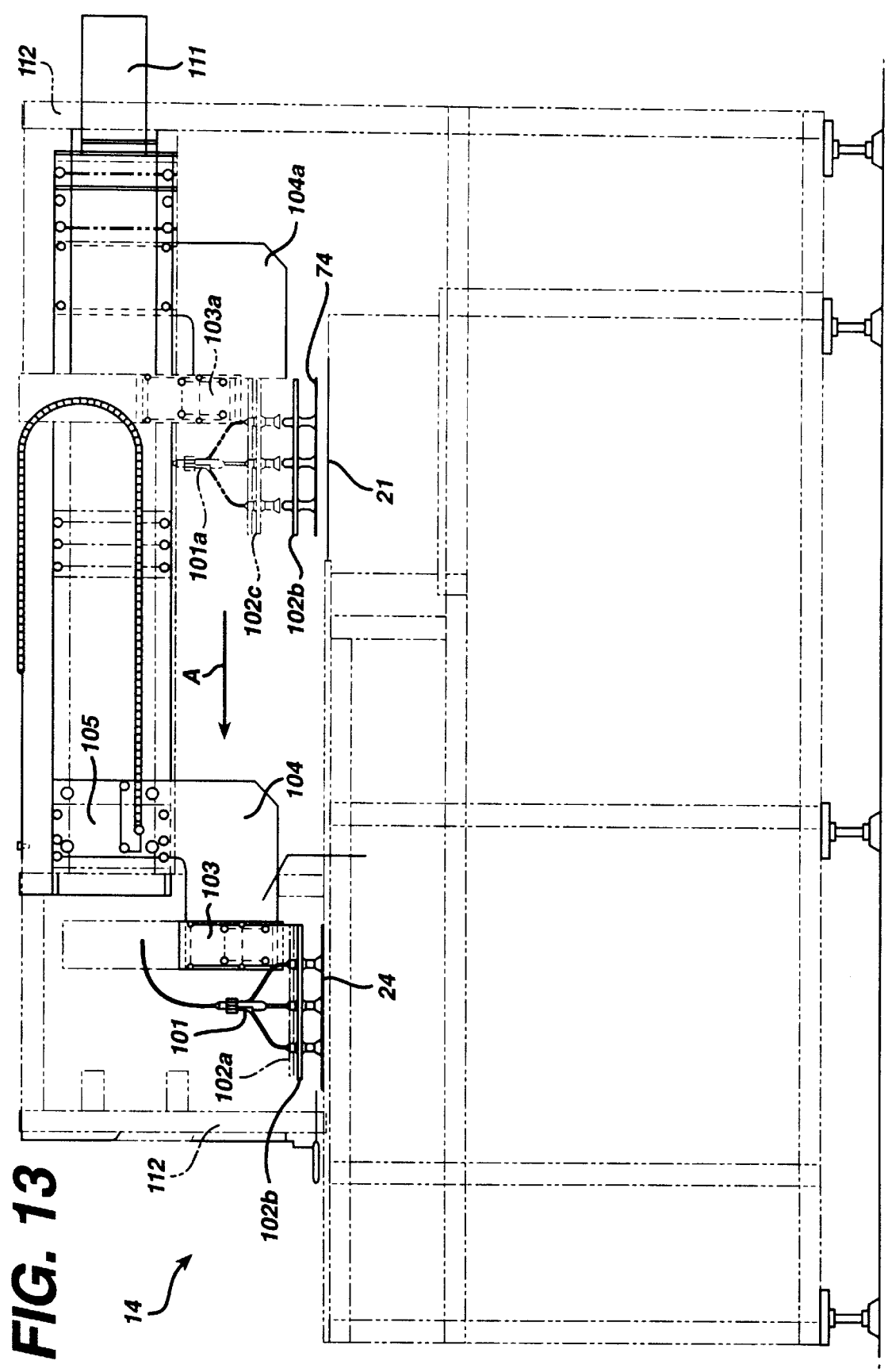
FIG. 13 is an elevation and diagrammatic end view of the first assembly device illustrated in FIG. 11 and 12.

The first assembly device illustrated in FIGS. 11–13 initiates the first cycle of operation for the apparatus by placing the lens mold carrier plate at the assembly station 24.

FIRST ASSEMBLY DEVICE

The first assembly device is contained within the dotted line box 14 of FIG. 1, and is illustrated in an elevation view in FIG. 11, a plan view of FIG. 12, and a side elevation view in FIG. 13. This device includes a reciprocating set of four vacuum grips 101 which reciprocate back and forth between the return conveyor 21 and the assembly 24. The vacuum grip assembly 101 is mounted for reciprocation in the Z axis on reciprocating frame 102 and for reciprocation in the Y axis (of FIG. 1) on carriage member 104 as illustrated in FIG. 13. Carriage member 104 reciprocates to the position 104a along a IKO ball screw drive which is illustrated in cross section in FIG. 17. Carriage member 104 is mounted to the ball screw drive 105 which is reciprocated along the Y axis by means of a rotating threaded rod 106. It is supported for reciprocation on linear guides 107, 108 by means of bearing members 109, 110. The linear guides 107, 108 are supported by plate member 111 which is fixably attached to the frame 112 of the hydration apparatus. Another IKO drive 103 is used to reciprocate the frame member 102 with respect to the carriage 104 and provides for multi level operation for the vacuum gripping assembly.

Referring to FIG. 13, in operation, a lens mold carrier plate 74 is returned to the assembly station by return conveyor 21 and lifted by the vacuum gripping assembly 101(a) to the position 102b illustrated in FIG. 13. The carriage 104 is the reciprocated in the Z axis of FIG. 1 while in the position illustrated at 104a. After vertical clearance is achieved the carriage 104 is reciprocated in the Y axis to the position illustrated at 104, whereupon the frame member 102 reciprocates from the position 102a to the position 102b for release of the lens mold carrier plate at the assembly area 24.

Figure 16:
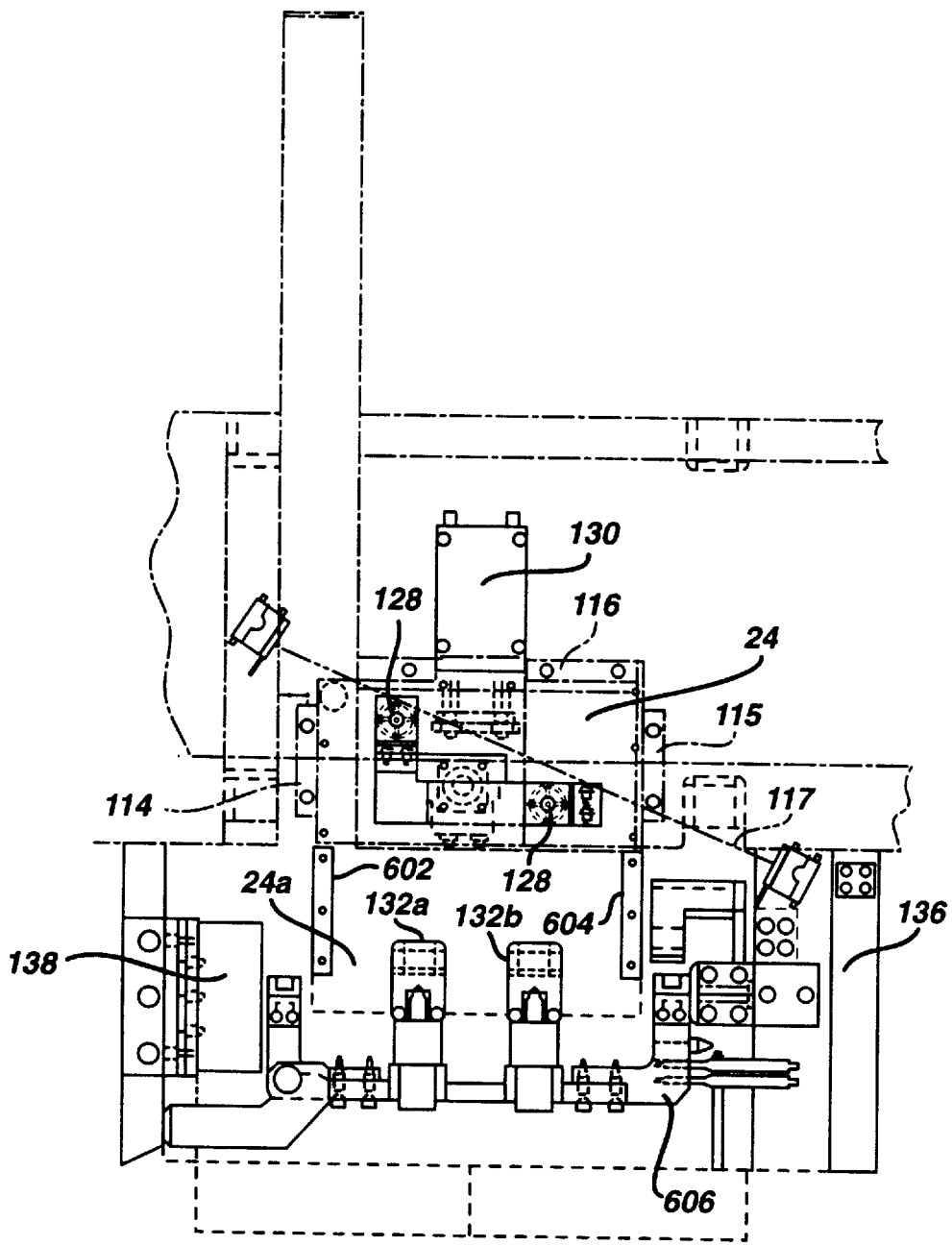
FIG. 16 is a detailed top plan view of the assembly station used to assemble the first hydration carrier.
Figure 17:
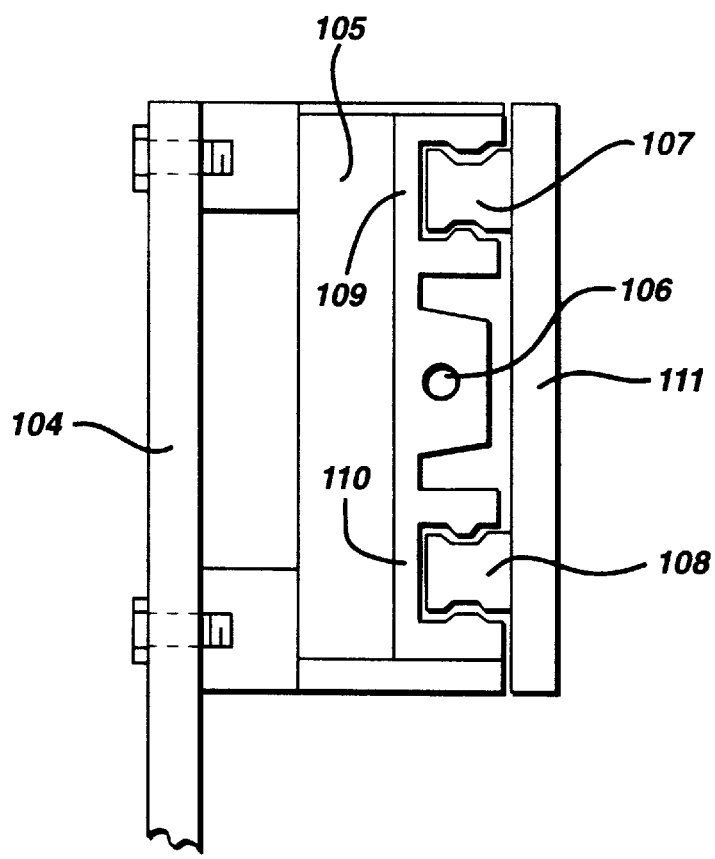
FIG. 17 is a cross-section detail of a typical transport arm for the robotic assemblies used in the present invention.

As illustrated in FIG. 16, the lens mold carrier plate 74 is deposited in the assembly area 24 in registration with a pair of reciprocal pins 128 which are used to align and register the carrier plate for subsequent assembly operations. Registration is further facilitated by means of fixed guides 114, 115 and a moveable guide 116, the operation of which will be hereinafter further described with respect to FIG. 11. An infra red beam is transmitted along optical path 117 to shut down the operation of the station if a plate or carrier is mis-aligned or improperly seated.

Referring to FIG. 13, the vacuum grips 101 and the frame member 102 are raised to the position illustrated at 102a, and reciprocated back to the return conveyor 21. As they are reciprocated back, the vacuum grips are further raised in the Z axis to the position illustrated at 101a and 102c. Two levels of reciprocation are necessary inasmuch as the two elements of the first hydration carrier, the mold carrier plate 74 and the top chamber plate 50 are of different height. After the mold carrier plate 74 has been placed at position 24, and before the top chamber plate 50 is aligned therewith, the first robotic assembly delivers a plurality of contact lens molds from the production line 11 to the lens mold carrier plate 74.

FIRST ROBOTIC ASSEMBLY

Figure 14:
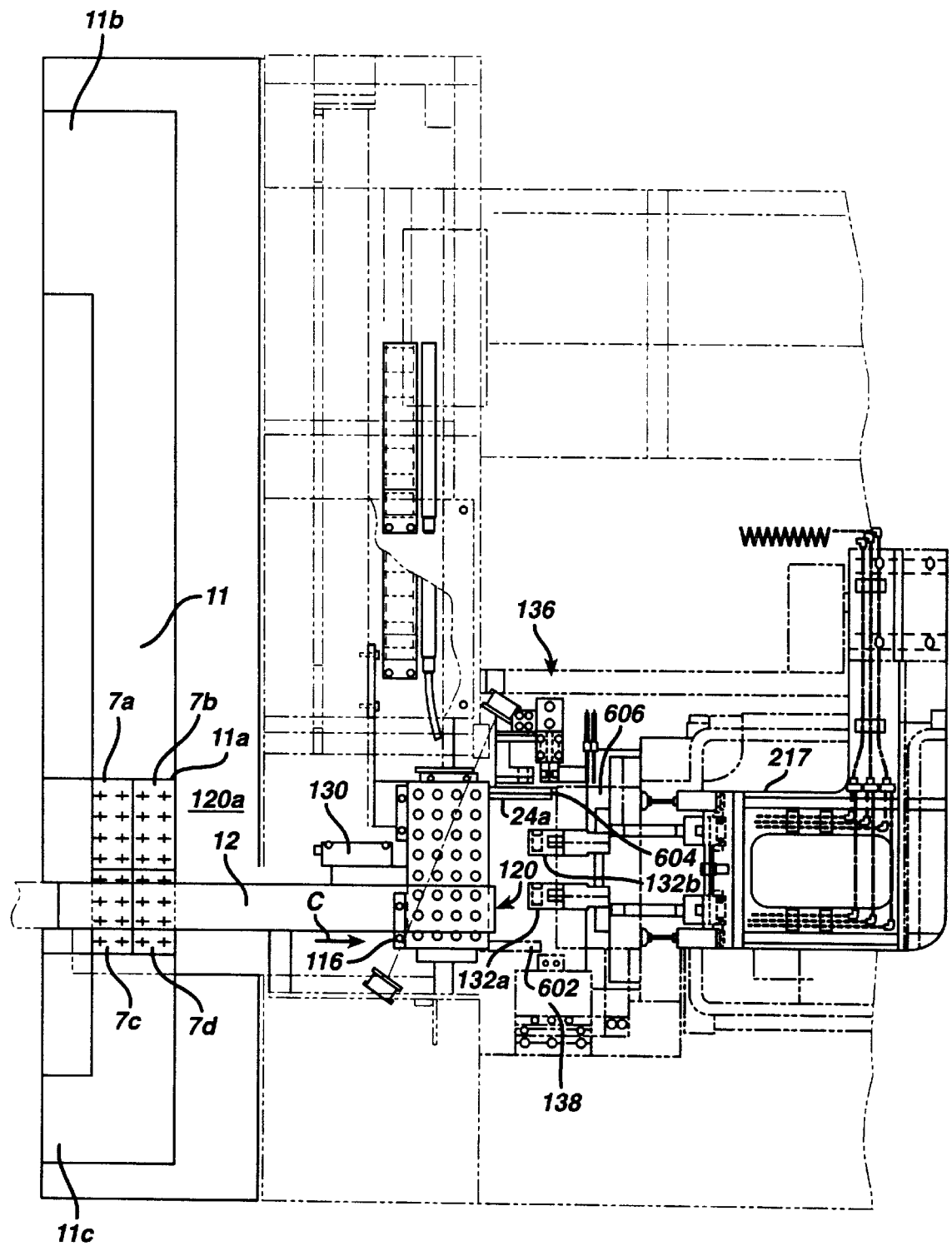
FIG. 14 is a top plan view of the first robotic assembly device, the first assembly device, the first rotary transfer device and the first assembly area.
Figure 15:
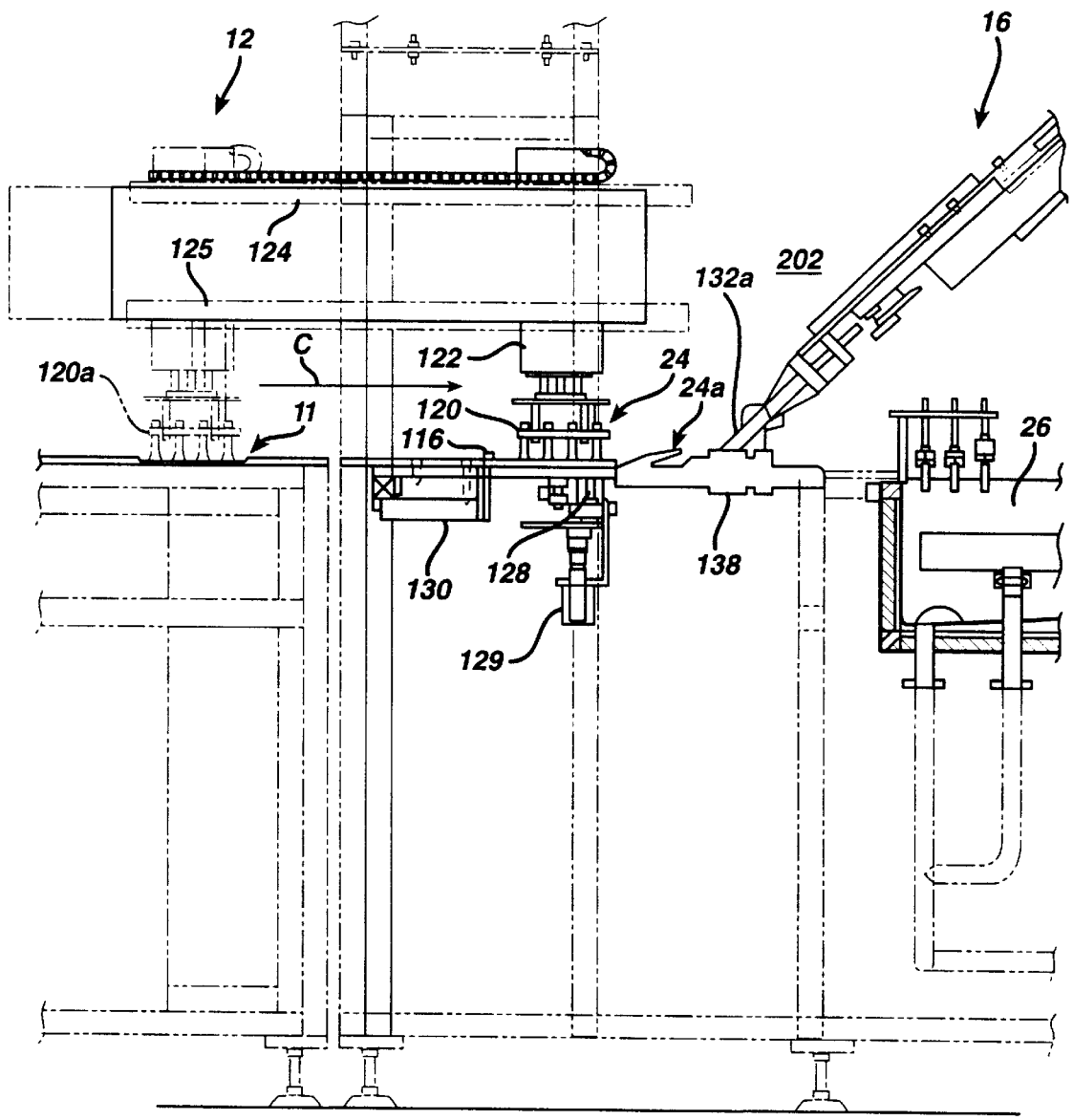
FIG. 15 is a side elevation view of a portion of the hydration apparatus illustrated in FIG. 13.

The first robotic assembly is more fully illustrated in FIGS. 14 and 15 wherein FIG. 14 is a plan view of the area delineated by dotted line box 12 of FIG. 1, and FIG. 15 is an elevation view thereof. As illustrated in FIG. 14, in the preferred embodiment of the invention, 32 contact lens molds are transferred in a single step from the production line conveyor 11 to the first assembly area 24. These contact lens molds are carried in four production line pallets 7a, 7b, 7c and 7d and are held on the production conveyor 11 by means of a moveable stop 11a. A vacuum gripping assembly illustrated in FIG. 15 as 120 moves from the position 120a over the production line conveyor to the position 120 in the direction of arrow c in FIG. 15. The vacuum head assembly 120 includes 32 individual vacuum gripping cups which grip the front curve lens mold around the annular flange thereof for transport between the production line conveyor and the first assembly area 24.

The vacuum head assembly 120 illustrated in FIG. 15 reciprocates along the Z axis by virtue of pneumatic cylinder in carriage 122. Likewise, the carriage 122 reciprocates in the X axis by virtue of an IKO ball screw mechanism previously described with respect to FIG. 17 wherein the fixed or stationary support member is fixably attached to frame members 124, 125 which span the distance between the production line conveyor 11 and the assembly staging area 24. Pressure monitoring sensors are provided for the vacuum source for each of these suction heads carried by vacuum assembly 120. In the event of a missing or mis-registered lens mold, a defect signal is passed to a programmable logic controller which controls the operation of the hydration apparatus 10, and the synchronization of the various robotic elements within the apparatus. While four vacuum grippers are illustrated in the end view of FIG. 15, it is understood that 32 grippers are provided in the matrix array illustrated in FIG. 14 for the pallets 7a–7d and the lens mold carrier plate 74.

The lens mold carrier plate 74, illustrated in FIG. 14, is registered in position by virtue of tapered registration pins 128 illustrated in FIG. 16, which are reciprocated upwardly for initial engagement of the lens mold carrier by a pneumatic cylinder 129 as illustrated in FIG. 15. The registration pins engage two of the registration openings 75 illustrated in FIG. 8. In the preferred embodiment of the invention two reciprocating pins 128 are provided to securely position the lens mold carrier 74 against movement in both the X and Y axis. One or more magnets may be provided to cooperate with the magnet steel buttons 80 to hold the lens mold carrier plate in the Z axis. This prevents the plate from jumping in the Z axis when the top chamber plate (having a magnet therein) is lowered into position.

After the lens mold carrier 74 has been secured and registered, as illustrated in FIG. 14, the contact lens molds are transferred by the vacuum assembly 120 from the position illustrated at 120a in FIG. 15 to the position illustrated at 120. Each of the lens molds, and contact lenses, are then deposited in the lens mold carrier 74 as was previously described with respect to FIG. 9. While the first robotic assembly is reciprocating in the direction of arrow C, the moveable stop 11a is lowered, and the pallets 7a–7d are then conveyed along the production line conveyor 11 to the pallet return conveyor 11b and a new set of pallets is assembled from the incoming production line conveyor at 11c. Stop 11a is again raised, and a new matrix is assembled as illustrated in FIG. 14.

After the lens molds have been deposited in the lens mold carrier plate 74, the first robotic assembly reciprocates in the direction opposite the arrow C to pick up the new lens molds, while the first assembly device, illustrated in FIG. 13, picks up a top chamber plate from the return conveyor 21, and carries it along the Y axis to the assembly position 24 as illustrated in FIG. 11 and 13. The top chamber plate 50 is then lowered in the Z axis to be deposited on the lens mold carrier 74 and on the contact lens molds therein to form the first hydration assembly illustrated in FIG. 5. The first assembly device then retracts the vacuum gripper assembly 101, first in the Z axis, and then in the direction opposite the arrow A to pick up a new lens mold carrier and to initiate another start cycle for the hydration apparatus.

FIRST ROTARY TRANSFER DEVICE

The operation of the first rotary transfer device, generally indicated at 16a is described in FIGS. 11, 12, 15 and 16. After assembly of the first hydration carrier is completed, the registration pins 128 are withdrawn from the lens mold carrier by pneumatic cylinder 129. Pneumatic cylinder 130 then reciprocates moveable alignment guide 116 in the X axis, as illustrated by arrow c in FIG. 15 in order to slide the first hydration carrier along rails between the jaws 132a, 132b of the first rotary transfer device. Jaws 132a, 132b are opened and closed by air hands and are mounted for rotation about axis 136 by virtue of a rotary air cylinder 138 as illustrated in FIGS. 12 and 16. This placement stroke transports the assembled hydration carrier from position 24 to 24(a) as illustrated by the arrow A in FIG. 16. The first hydration carrier is guided initially by alignment guides 114, 115 but then slides on top of a pair of rails 602,604 as it is advanced by push plate 116 into the jaws 132(a),132(b) of the first rotary transfer device at position 24(a). The stroke of cylinder 130 has been lengthened, and the turning axis 136 has been moved, to enable the rotary movement from the position 24(a) marked by dotted lines in FIG. 16, to be carried out simultaneously with the assembly operation at 24, thereby compressing the cycle time of the assembly with respect to the apparatus illustrated in the parent applications. The jaws 132(a),132(b) are supported for rotation on crank shaft 606, the throw of which provides a mechanical advantage for rotating the assembled hydration carrier about axis 136. Once the hydration carrier has been received by the first rotary transfer device, the jaws and the first hydration carrier are rotated in a clockwise manner through 1350 of rotation as illustrated at 16a in FIG. 2, to the dotted line illustrated in FIGS. 11 and 15, for hand off to the pick and place robotic assembly 202.

PICK AND PLACE ROBOTIC ASSEMBLIES

Figure 11A:
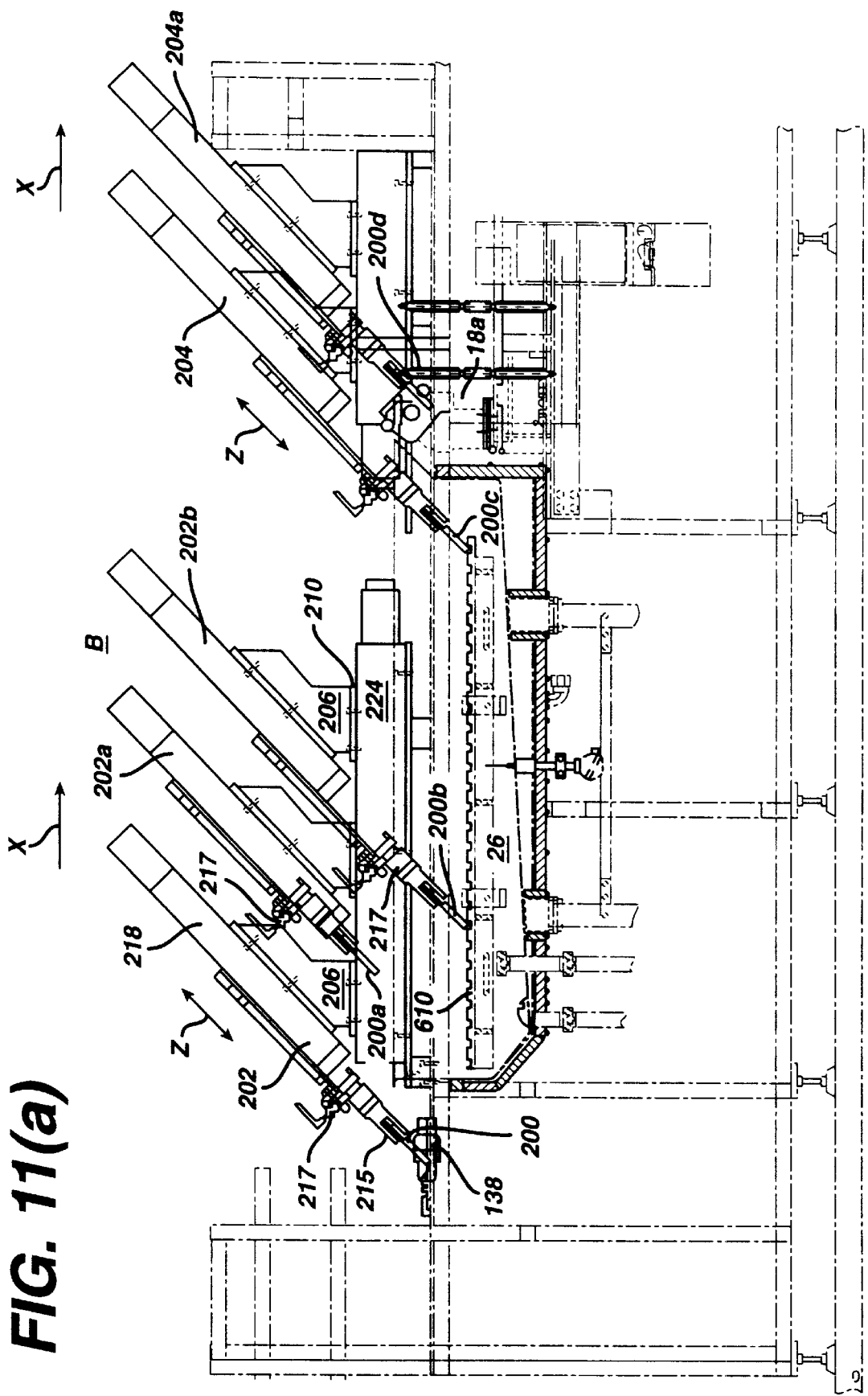
FIG. 11(a) is a partially cross-sectioned side view of the hydration tank of the present invention which schematically illustrates the operation of the first and second pick and place robotic assemblies.
Figure 19:
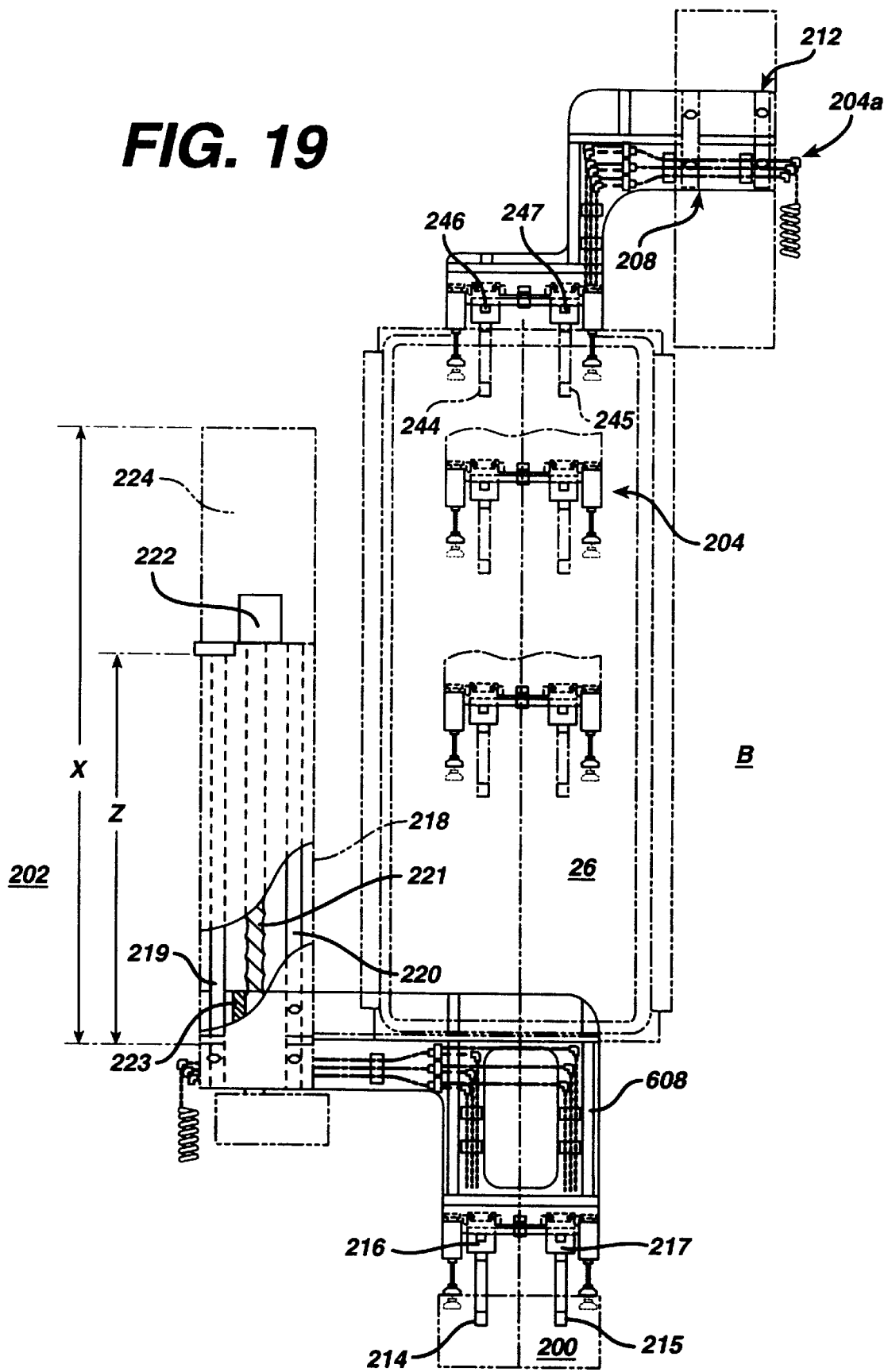
FIG. 19 is a diagrammatic plan view of the pick and place robotics used in the second robotic assembly illustrated in FIGS. 11—12.

The pick and place robotic assemblies (which collectively may be termed the second robotic assembly) include the motions depicted in box 16 of FIG. 2 and include the first and second pick and place robotic units 202, 204 described with respect to FIGS. 11, 11(a) and 19.

As illustrated in FIG. 11, the two pick and place robotic assemblies 202, 204 are mounted for diagonal Z axis reciprocation on angled brackets 206, 208, and mounted for linear X axis reciprocation on carriages 210, 212. FIG. 19 illustrates a drive mechanism for the first pick and place robotic assembly 202. The second pick and place robotic assembly 204 uses substantially the same drive mechanisms, but from the opposite side of hydration tank 26. Each pick and place robotic unit includes a pair of gripping jaws 214, 215 which grip the first hydration carrier 200 as illustrated in FIGS. 11(a) and 19. The gripping jaws 214, 215 are actuated by pneumatic motors 216, 217 which are fixably mounted to a carriage member 206 via an offset bracket 608 which reciprocates along the diagonal Z axis by virtue of an IKO ball screw drive 221 mounted in housing 218. Within the housing are guide rails 219, 220 and a rotating screw drive 221 which is driven by motor 222. Nut member 223 is fixably attached to robotic member 202 and draws the member 202 along the guide rails 219, 220 as motor 222 is rotated. The pick and place robot 202 reciprocates not only, along the range of motion illustrated in FIGS. 11(a) and 19 by the arrow "Z", but also reciprocates along the X axis of FIG. 1 as delineated by the arrow X of FIG. 19 to the position B illustrated in FIGS. 11(a) and 19. The lower drive unit 224 drives the carriage member 210 which is secured to the underside of bracket 206 as illustrated in FIG. 11 and 11(a). The lower drive 224 is also an IKO ball screw mechanism and its operation is essentially identical to that previously described with respect to IKO drive 218.

Pick and place unit 202 reciprocates diagonally downward in the Z axis as illustrated in FIG. 11 and 11(a) to engage a first hydration carrier 200 which has been rotated by the rotary cylinder 138 of the first rotary transfer device to the position illustrated in FIGS. 11 and 11(a). As pneumatic motors 216 and 217 are actuated, the air hands are released thereby opening the rotary transfer device jaws 132(a), 132(b). The first pick and place robotic assembly 202 then reciprocates upwardly in the direction of arrow Z in FIG. 11 and 11a until the first hydration assembly 200 has cleared hydration tank 26. When sufficient vertical clearance is secured, drive 224 is actuated, drawing carriage 210 and the first pick and place unit 202 in the X axis as illustrated by the arrow X in FIG. 11. The first pick and place robotic unit 202 receives each of the first hydration carriers from the first rotary transfer unit and places each of them in the first open slot of a walking beam assembly mounted in hydration tank 26. As illustrated in FIG. 11 on at position B, the first hydration assembly 200 is reciprocated back downwardly in the direction of the Z axis until the first hydration carrier 200 is securely positioned within walking beam assembly on lower rail member 610. The pneumatic cylinders 216, 217 are then actuated to open the clamping jaws 214, 215, and allow the first hydration assembly to rest within the hydration tank 26. The first pick and place robotic unit 202 then returns along the Z axis in the opposite direction to achieve vertical clearance and then back along the X axis to receive the next first hydration assembly from the first rotary transfer unit.

During each cycle of operation, the second pick and place robotic unit 204 begins travels in the Z axis at the end of the hydration tank 26. The second pick and place robotic unit 204 is reciprocated downwardly along the Z axis in FIG. 11 and 11(a) until it reaches the last hydration assembly 200 in the walking beam assembly of hydration tank 26. The jaw members 244, 245 of the second hydration assembly 204 are then actuated by pneumatic cylinders 246, 247 to engage the first hydration assembly 200 for withdrawal from the hydration tank. The upper carriage member is then reciprocated upwardly along the Z axis to withdraw the first hydration assembly 200 from the hydration tank 26. After clearing the hydration tank 26, the second pick and place unit 204 is then reciprocated in the X axis in the direction of arrow B until it reaches the position 204a illustrated in FIG. 11 and 11(a). The carriage 212 of the second pick and place robot 204 is then reciprocated downwardly in the Z axis to deposit the first hydration carrier with the second rotary transfer device generally indicated by the numeral 18a in FIGS. 11 and 12. As will hereinafter be explained in greater detail with respect to the second rotary transfer unit, the unit holds the first hydration carrier, and rotates it through 45° of motion as illustrated in Box 18b of FIG. 2 and then translates it in the X axis to enable transfer of the first hydration carrier to the first disassembly station and the third robotic assembly illustrated and described with respect to FIGS. 20–22.

HYDRATION

As illustrated in FIGS. 11–12, the hydration tank 26 provides for full and complete immersion of the first hydration carrier 200 in a deionized water solution, wherein the solution contains a small amount of surfactant, typically on the order to 0.005% to 5% by volume. Suitable surfactants include the family of polymeric surfactants, in this instance, preferably a polyethylene oxide sorbitan mono-oleate, commercially sold under the tradename "Tween 80".

This solution differs substantially from the hydration solution used in the prior art processes typified in U.S. Pat. No. 4,495,313 to Larsen inasmuch as the time consuming ionic neutralization of the polymer from which the lens blank may be made does not have to occur during the hydration process. When deionized water is used in the hydration process, a buffered saline solution is added to the final packaging of the lens so that the final lens equilibrium (ionic neutralization, final hydration and final lens dimensioning) is accomplished in the package at room temperature or during the sterilization process. That neutralization creates temporary destabilization of the dimension of the lens, and requires an extended period of time to complete, which results in an undesirable large batch operation when placed in an automated production line having a serial molding input and serial package output.

The transit time in the hydration tank 26 is to some extent dependent upon the temperature of the hydration bath. For a deionized water hydration bath with a 0.05% surfactant, the desired residence time for a HEMA soft contact lens varies from 3 to 10 minutes at temperatures of 55° C. to 90° C. In the preferred embodiment, a five minute residence time has been found advantageous when the hydration bath temperature is maintained at 70° C. plus or minus 5 degrees.

It is noted that during the residence time in the hydration tank, the contact lens 8 hydrates and swells, thereby breaking free of the front curve mold half 9. Since the top chamber plate 50 and the front curve mold half 9 and the mold carrier plate 74 have been inverted by the first rotary transfer device at 16a, the lens is subjected to gravity as soon as it breaks free of mold half 9. While movement of the first hydration carrier 200 may move the lens about in the defined hydration chamber (illustrated in FIG. 9) that lens will settle on the convex lens transfer surface 53 as the first hydration carrier 200 is lifted free of the hydration bath 26 by pick and place robotic unit 204.

The velocity or speed of movement for the first and second pick and place robotic units 202, 204 is varied significantly as the first hydration carrier is inserted or removed from the hydration tank 26. When pick and place unit 202 has reached the hydration tank entry point, the drive motor 222 is slowed significantly and entry into the hydration tank continues at a rate not exceeding 40 mm per second. It has been found that if the rate of entry into the tank exceeds 40 mm per second, bubbles of air can be trapped in the hydration chamber formed between the convex lens carrying surface 53 and the contact lens mold 9, and may subsequently interfere with the transfer of the lens 8 from the mold 9 to the first convex lens carrier surface 53. Subsequent handling of the lens by the lens transfer means and convex carrier surface 53 is via surface tension and gravity while immersed in the hydration tank and air bubbles trapped between the lens and the convex lens carrier element will impair the lens handling ability of the transfer means.

Similarly, when the second pick and place robotic unit 204 removes the first hydration carrier 200 from the hydration tank, the velocity of the carrier, while immersed in the hydration tank, is limited to 24 mm/seconds. After the hydration carrier 200 has cleared the hydration bath, the upward movement is accelerated as the robotic unit 202 moves the carrier for handoff to the second rotary transfer unit.

HYDRATION TANK TRANSPORT

As described earlier, the first pick and place robotic assembly deposits a first hydration carrier 200 at the front end of the hydration tank 26, and the second robotic pick and place unit removes the first hydration carrier 200 from the end of the hydration tank. Transport from the front to the end of the hydration tank is accomplished by a walking beam assembly which will be described with respect to FIGS. 4 and 11–12.

The walking beam assembly includes two fixed supports for each hydration carrier 200 present in the hydration tank, and two movable support members for each hydration carrier in the hydration tank. The movable supports begin the cycle by moving vertically to engage each of the hydration carriers, and to lift them off the fixed supports. The movable supports then translate each of the hydration carriers in the tank, en masse, one position toward the rear of the tank. The movable supports are then lowered, lowering the hydration carriers back to the fixed supports, and in the final return stroke, the movable carriers are returned to their original position. Thus, in each cycle of operation each of the individual first hydration carriers 200 is advanced one slot through the hydration tank from beginning to end.

Figure 11B:
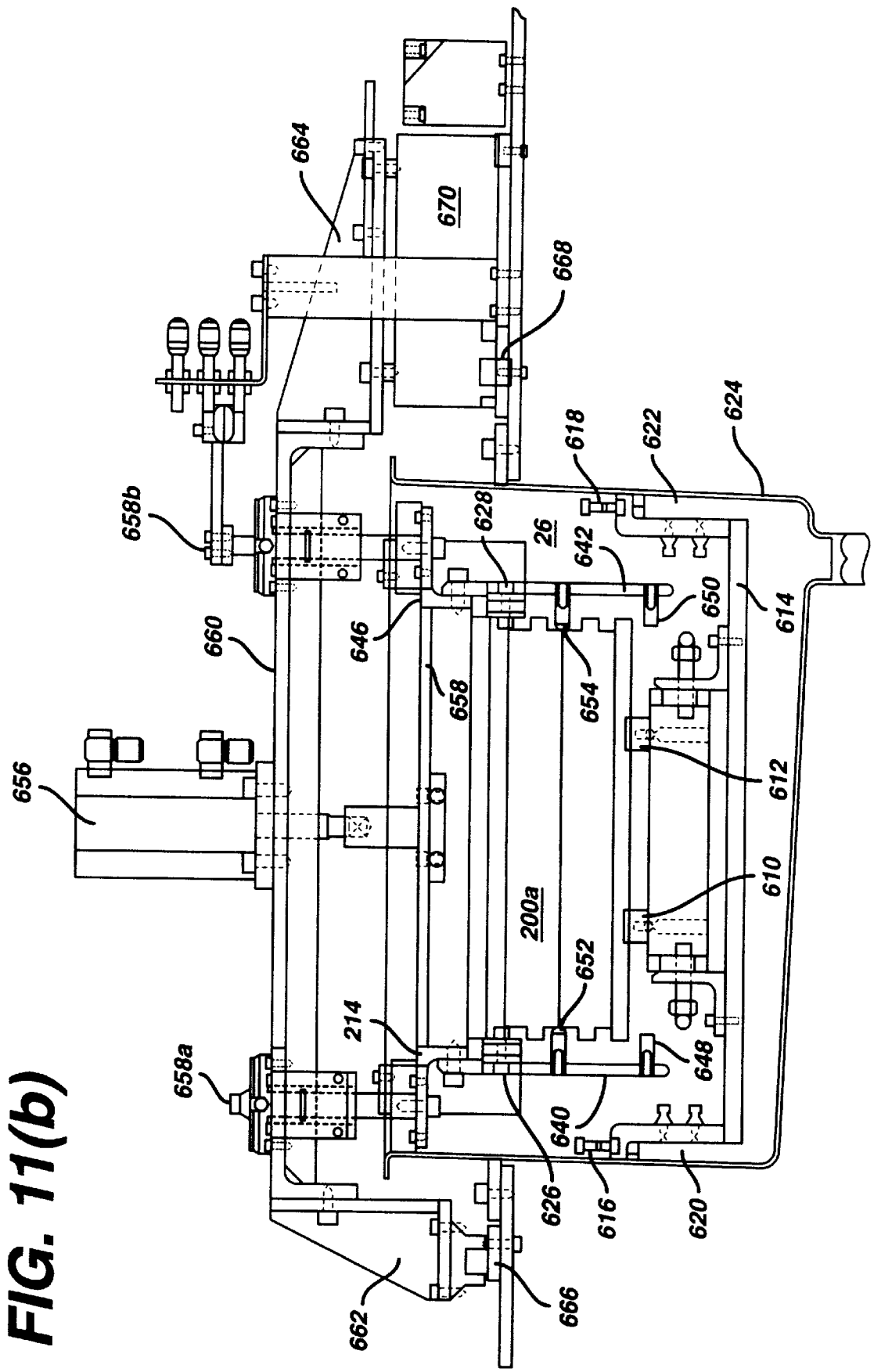
FIG. 11(b) is a partially cross-sectioned end view of the hydration tank of the present invention to illustrate the walking beam mechanism, and is taken along section line B—B' of FIG. 11.

As illustrated in FIGS. 11(b) and 12, a pair of elongate rails 610,612 are spaced in parallel along the length of the tank and elevated slightly above the bottom of the tank by a support bracket 614 which is adjustably mounted via adjusting screws 616,618 to a pair of side blocks 620,622, mounted on the interior of the tank wall 624. Each of the elongate rails 610,612 include a plurality of notches which can be seen in FIG. 12, which receive a hydration carrier at each notched position along the transport path. As illustrated in FIG. 11(b) and FIG. 12, there are a plurality of fixed support pins, two of which are illustrated as 626, 628 in FIG. 11(b), and a row of which are illustrated as fixably attached to an elongate bracket member 630 in FIG. 11. As illustrated in FIG. 11, there are four first hydration carriers, three of which are enumerated as 200a, 200b and 200c, with 200a being positioned in the first slot in the tank and 200c being positioned in the last slot in the tank. As illustrated in FIG. 11 and 11(b), the hydration carriers 200 are positioned on the fixed supports with their lowermost edges resting on the elongate support rail 610,612, and their uppermost flanges resting on the fixed support pins similar to 626 and 628 of FIG. 11(b).

Referring to FIG. 4, it can be seen that there are four tabs 632a,b, 634a,b, 636a,b and 638a,b which extend outwardly from either side of the top chamber plate 50. The tabs are spaced symmetrically about the first hydration carrier to enable symmetrical operation of the device without regard to the orientation of the first hydration carrier 200. As can be noted in the end tab 632a,b and 638a,b there are a plurality of notches c,d which are used to engage correspondingly-formed protrusions on the engagement surfaces of the movable support members which transport the hydration carriers through the tank.

When the first pick and place robotic assembly deposits a first hydration carrier in the hydration tank 26, the lowermost longitudinal edge (illustrated as 50a in FIG. 4) is laid to rest on the elongate support rails 610,612 and as the gripping jaws 215 are opened, the hydration carrier is allowed to relax with the upper tabs 632a,b coming to rest on the fixed pins 626,628 as described previously. When the movable support members engage the first hydration carrier 200, they will engage the lowermost tabs 638a,b and the tabs 634a,b positioned approximately three-fourths of the way along the height of the hydration carrier. The movable support members are mounted on a pair of elongate support plates 640,642 which are parallel to the sidewalls of hydration tank 26 and supported by a pair of elongate beams 644,646 which also extend the length of the hydration tank. One of the plates 640 is illustrated in FIG. 11 having a plurality of circular apertures drilled therein to reduce the weight of the assembly, and a plurality of slots machined therein, illustrated as 640a in several locations. Each of the plates 640,642 has multiple slots machined therein wherein each slot receives a pair of engageable support pins as illustrated in FIG. 11(b). The lowermost pins 648,650 engage the lowermost tabs 638a,b of the first hydration carrier while the second set of pins 652,654 engage tabs 634a,b. In the position illustrated in FIG. 11(b), the hydration carrier 200a is at rest in the fixed position with the movable pins mounted on plates 640,642 positioned below the engagement tabs 634a,b and 638a,b. While four pins 648–654 have been illustrated in FIG. 11(b), it is understood that there are four pins for each plate, with two pins mounted in each slot 640a of movable support plates 640 and corresponding pins mounted in the slots formed in plate 642 (not shown). The movable plates 640,642 and the movable support pins generically illustrated at 648–654, move in a circular box as illustrated by the arrow box D in FIG. 11 with the first stroke a vertical stroke to lift the hydration carriers from the support rails 610,612 and to carry the tab members 632a,b above the fixed support pins 626,628. After the vertical clearance has been achieved, the entire mechanism is reciprocated along the X-axis until each of the hydration carriers has been advanced one slot through the apparatus. The entire mechanism is then lowered along the vertical axis until each of the hydration carriers again come to rest on the horizontal support rail 610,612. The movable members continue their downward descent until the movable pins are below the tabs formed on the top chamber plate of the first hydration carrier. When they have reached the lowermost portion of the descent, they are reciprocated along the X-axis back towards the front of the machine to begin the cycle anew.

Movement along the vertical axis is accomplished by a pneumatic cylinder 656 which is centered above the tank and connected to a yoke assembly 658 which supports frame members 644,646 and the horizontal side plate 640,642. There are four guide bearings 658a–d which are used to damp isolation and to guide the reciprocal assembly in the vertical direction during the Z-axis stroke. The pneumatic cylinder 656 is movably mounted for reciprocation in the X-axis on a support bracket 660 which is supported by a pair of rolling truss supports 662,664 for reciprocation along track members 666a,b 668a,b once the pneumatic drive cylinder 656 has lifted all of the first hydration carriers in the hydration tank from the longitudinal support rail 610,612. A linear drive motor 670 translates the entire assembly along the tracks 666a,b and 668a,b for the distance of approximately one slot. After reaching the new X-axis orientation, the pneumatic cylinder 656 lowers the first hydration carriers back into position on the fixed support rail 610,612. As the movable pins 648,654 continue their downward descent, the uppermost portions of the hydration carriers 632a,b come to rest on the fixed support pins 626,628.

The cycle time of the apparatus may be varied, but is dependent to some extent on the cycle rate of the production line as a whole. Hydration at the aforesaid temperature may last from 3 to 8 minutes, and preferably 5 minutes and it is therefore desirable to have sufficient slots in the hydration tank to accept the entire output of the line for the hydration period selected, as divided by the cycle rate of the production line as a whole.

SECOND ROTARY TRANSFER DEVICE

Figure 11C:
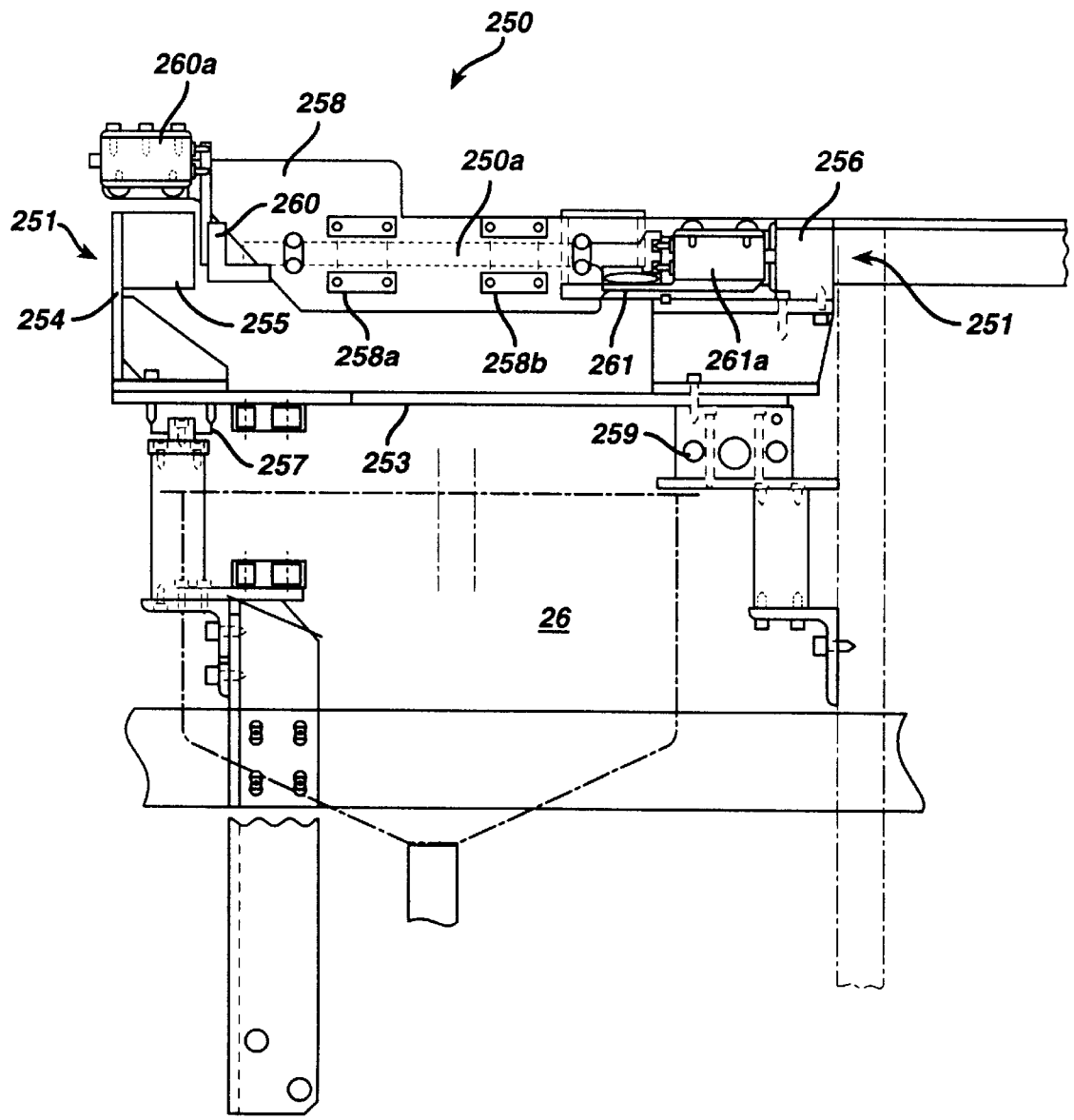
FIG. 11(c) is a partially cross sectioned end view of the second rotary transfer device taken along section lines C—C' of FIG. 11.

The operation of the second rotary transfer device will be hereinafter explained with reference to FIGS. 11, 11c and 12 in which the rotary device receives the first hydration carrier 200 and rotates it through 45° of arc as illustrated in Box 18b of FIG. 2. The second rotary device of the present invention may be distinguished from the same device described in the parent applications in that some of the functions previously described in the third robotic assembly has been assumed by the second rotary device, as will hereinafter be explained in detail.

As illustrated in FIG. 11, a second rotary transfer device includes a rotary frame 250 which pivots about axis 251 in response to the rotation of rotary cylinder 255 which is fixably secured to a reciprocating frame 253 by bracket member 254. The rotary cylinder 255 drives the rotary frame 250 through 450 of rotation from the position illustrated in FIG. 11 to the horizontal position illustrated in FIGS. 12 and 11c. The rotary frame 250 is journaled for rotation on shaft 250(a), about axis 251 by rotary cylinder 255 and journaled bearing 256, both of which are bracket mounted to reciprocating frame 253. Reciprocating frame 253 is supported on one side by a roller and track mechanism 257, and on the other by a pneumatic cylinder drive mechanism 259 for reciprocation along the X axis. The pivotable frame 250 includes a pair of L-shaped support rails 260, 261 and a back plate 258 which receive the first hydration carrier from the second pick and place robotic assembly and carry it during transport. The L-shaped support rails are slidably mounted on shaft 250(a) and are reciprocated into and out of engagement with the first hydration carrier by pneumatic cylinders 260(a) and 261(a). When the second pick and place unit 204 begins its downward Z axis descent from the position illustrated in 204a, the second rotary transfer device is rotated counterclockwise 45° to the position illustrated at E in FIG. 11, with L-shape side rails angled upward and open to receive the first hydration carrier 200. As the hydration carrier is released by the second pick and place robotic assembly, the hydration carrier comes to rest against the stop plate 258, between registration blocks 258(a), 258(b). The pneumatic cylinders 260(a), 261(a) then close the L-shaped rails 260,261 to grip the hydration carrier therebetween. The second rotary transfer device is then rotated to the solid line position illustrated in FIGS. 11c and 12. Rotation is accomplished by rotary cylinder 255 which rotates frame 250 about axis 251 as illustrated in FIG. 11c. Pneumatic drive 259 is then actuated to transport the hydration carrier in the x axis for transport to the first disassembly area and handoff to the third robotic assembly.

THIRD ROBOTIC ASSEMBLY

Figure 20:
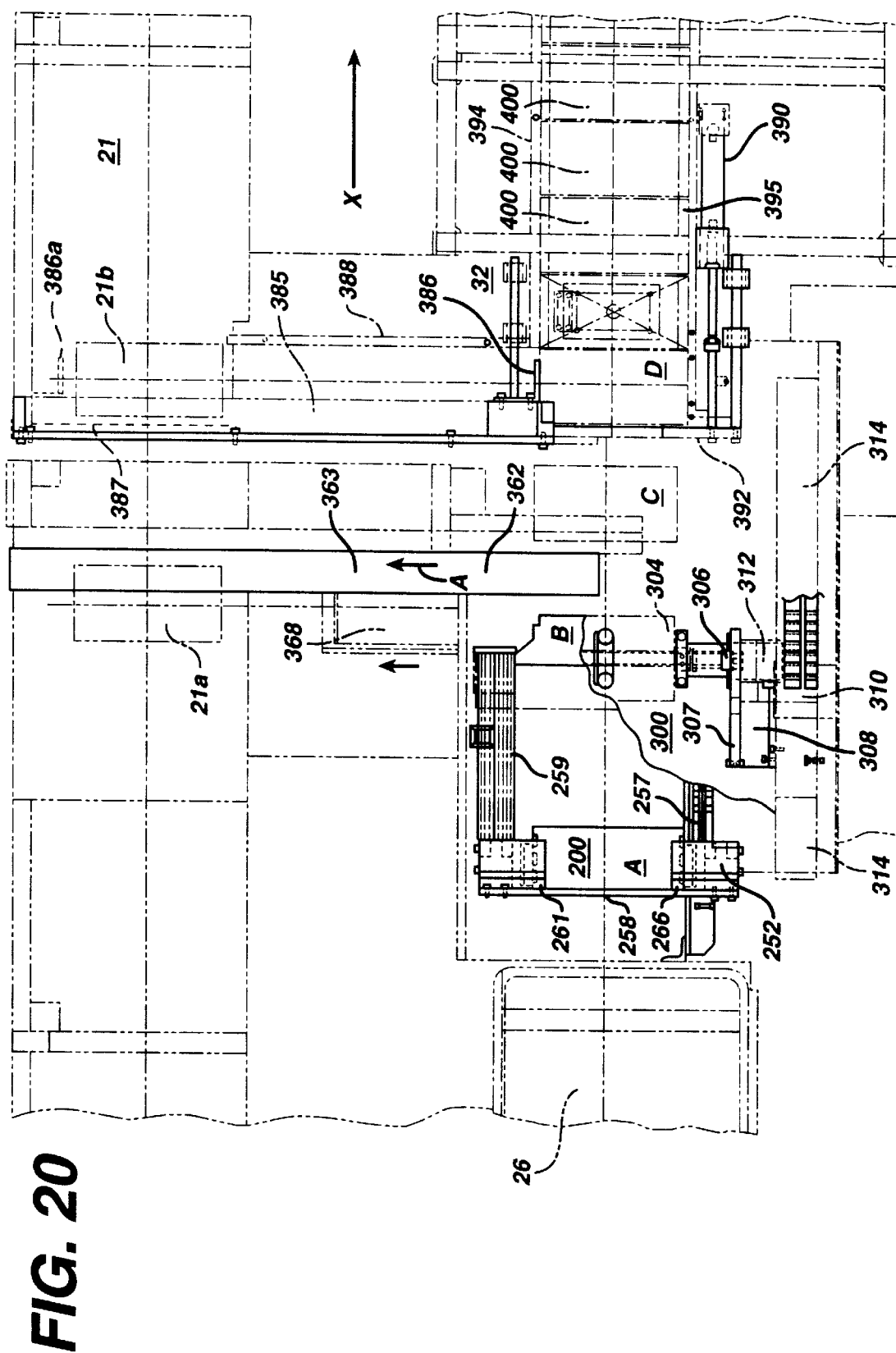
FIG. 20 is a top plan view of a second portion of the hydration apparatus for the present invention illustrating the second rotary transfer device, the third robotic assembly, the flushing station and the assembly station used to form the second hydration carrier.
Figure 21:
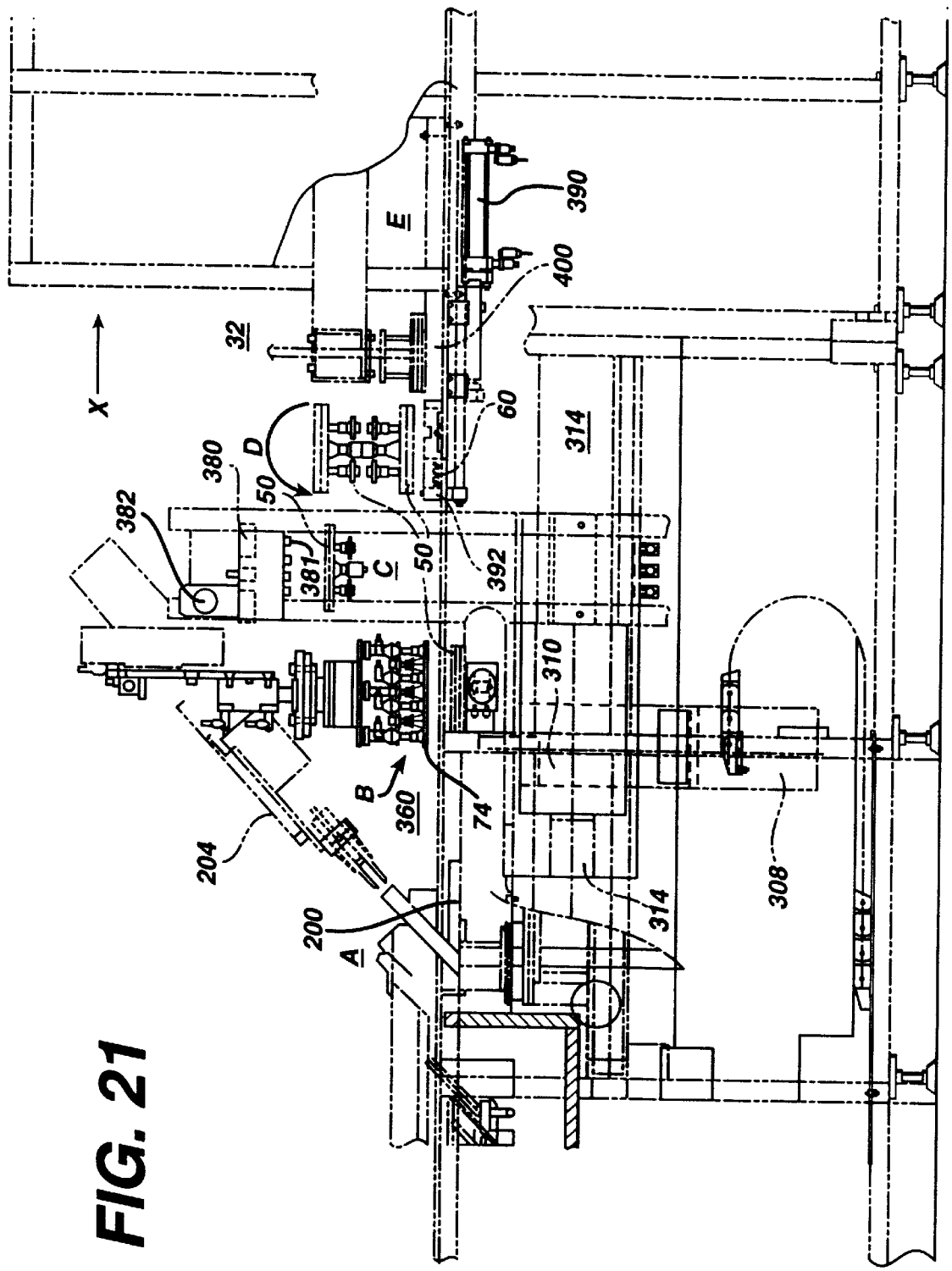
FIG. 21 is an elevation side view of the portion of the apparatus illustrated in FIG. 20.
Figure 22:
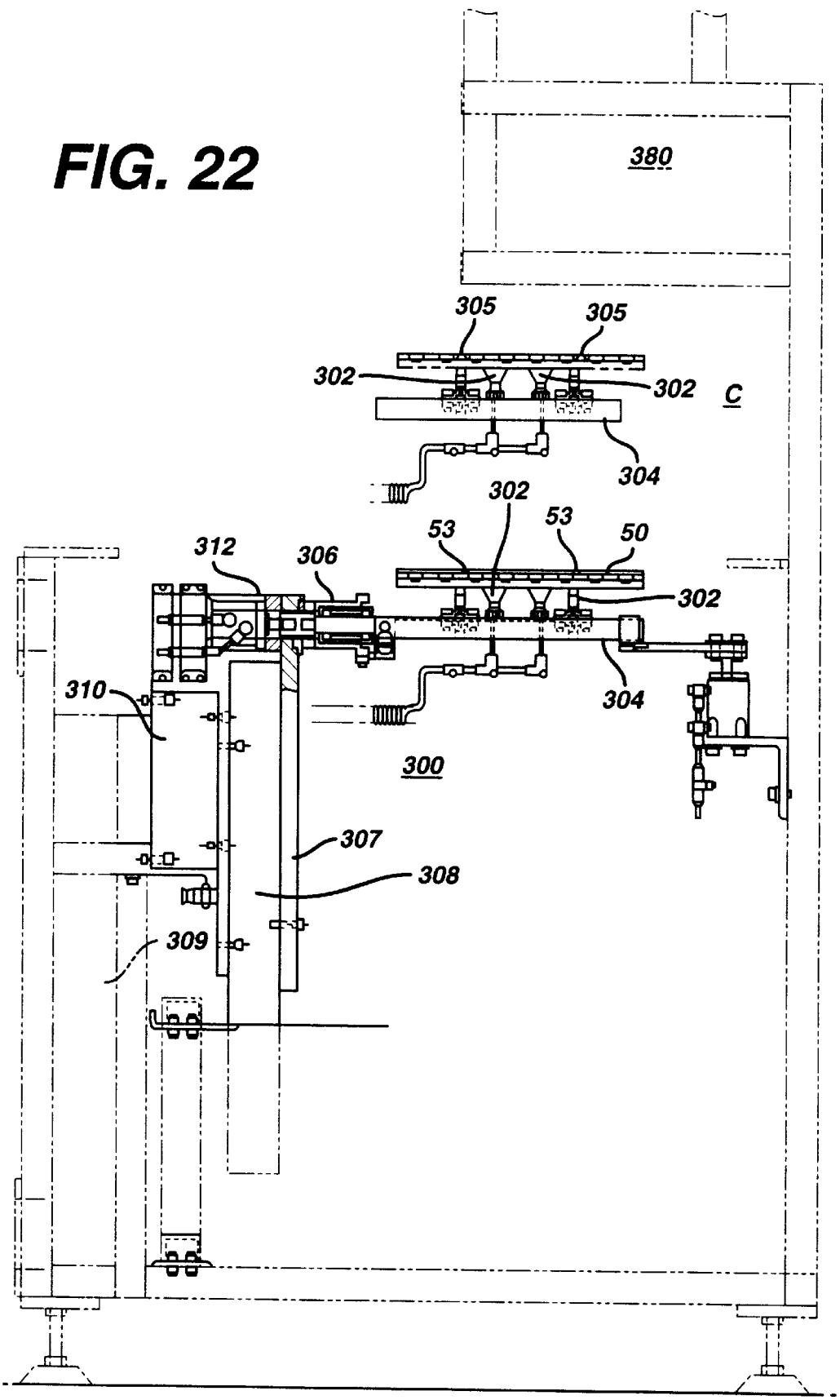
FIG. 22 is a partially cross-sectioned elevation end view of the third robotic apparatus illustrated in FIGS. 20 and 21.

As illustrated in FIG. 12 and particularly FIG. 20 at position A, the second rotary assembly has received the first hydration carrier 200 from the second pick and place robotic assembly. It then transports the hydration carrier to the first disassembly station generally indicated at B. The third robotic assembly also moves to position B and positions itself under the hydration carrier 200, which is still supported by the side rails 260, 261 and back plate 258 of the second rotary device. As indicated previously, this transport is accomplished with IKO linear drive 259. The third robotic assembly includes a pair of tapered registration pins 305, one of which is illustrated in enlarged detail in FIG. 18(b). The registration pins penetrate the openings 59 in the top chamber plate 50 while a pair of female sockets 301 are descending through the opening 53 formed in the mold carrier plate 74. When the registration pin 305 is mated to the female socket 301, the three robotic assemblies are registered in alignment. A compliant coupling 365, illustrated in FIG. 18a enables registration compliance for the first robotic disassembly device. At position B, the first robotic disassembly device 360 removes the individual front curve molds and the mold carrier plate from the first hydration carrier, leaving the top chamber plate 50, the associated contact lens transfer devices, and the contact lenses mounted thereon positioned upwardly as will be hereinafter described with respect to FIG. 18–20. The first disassembly device 360 includes a plurality of individual vacuum grips 370, one for each mold half, which engage the mold halves for removal. The device also includes vacuum grips 372 which engage the mold carrier plate as will hereinafter be described in greater detail. After lifting the mold halves and the mold carrier plate from the hydraulic assembly, the device discards the lens mold halves in a collection bin, and returns the lens mold carrier plate to the return conveyor 21 for return to the first assembly device. After the first hydration carrier has been disassembled, the third robotic device grips the top chamber plate 50 and moves to the position illustrated at letter C wherein the carrier is reciprocated upwardly along the Z axis to the flushing station 380 while the contact lenses remain secured to the convex surface 53 of the lens carrier means illustrated in FIG. 9. The lenses are flushed, partially to cool the lenses from the temperature of the hydration bath, partially to flush away any residual aqueous solution remaining on the lenses from the hydration bath, and partially to ensure adequate hydration of the lenses while in an atmospheric environment. This flushing step may be skipped if there is an open hydration base unit available in order to reduce cycle time. After flushing, the third robotic assembly moves to position D where it is rotated 180°. While the top chamber plate 50 is being transported from the second rotary transfer device, a hydration base unit 60 has been advanced into position, as will be hereinafter explained with respect to FIG. 20, to receive the top chamber plate 50. The final motion of the third robotic assembly is downward in the Z axis to mate the hydration base 60 with the top chamber plate 50 whereupon a short stroke conveying apparatus generally indicated at 390 advances the second hydration carrier in the direction of arrow E to be positioned under a first flushing station 400. The third robotic assembly is illustrated in FIGS. 20, 21 and 22 wherein FIG. 22 represents an enlarged end view of the third robotic assembly 300. The range of motions of the third robotic assembly, and its interaction with other devices in the hydration apparatus is complex, and is summarized in FIGS. 18a and 18b of FIG. 2.

The apparatus of the third robotic assembly is best illustrated in FIG. 22 in which the assembly includes a plurality of suction gripping means 301, 302 attached to a rotating plate 304. The suction gripping means 302 include registration pins 305 for alignment with openings 53 defined in the top chamber plate 50. The rotary plate 304 is journaled for rotation in bearing assembly 306 which is fixably secured to plate member 307. Plate member 307 reciprocates vertically via an IKO ball screw drive 308 with respect to the stationary frame 309 and horizontally along the X axis via IKO carriage 310. The rotary plate 304 is rotated by means of a drive cylinder 312. The relative interaction of the two IKO drive assemblies is illustrated in FIG. 21 wherein the vertical drive assembly 308 is carried on a driven horizontal member 310 which reciprocates along the X axis by virtue of an IKO ball screw drive 314.

Figure 18A:
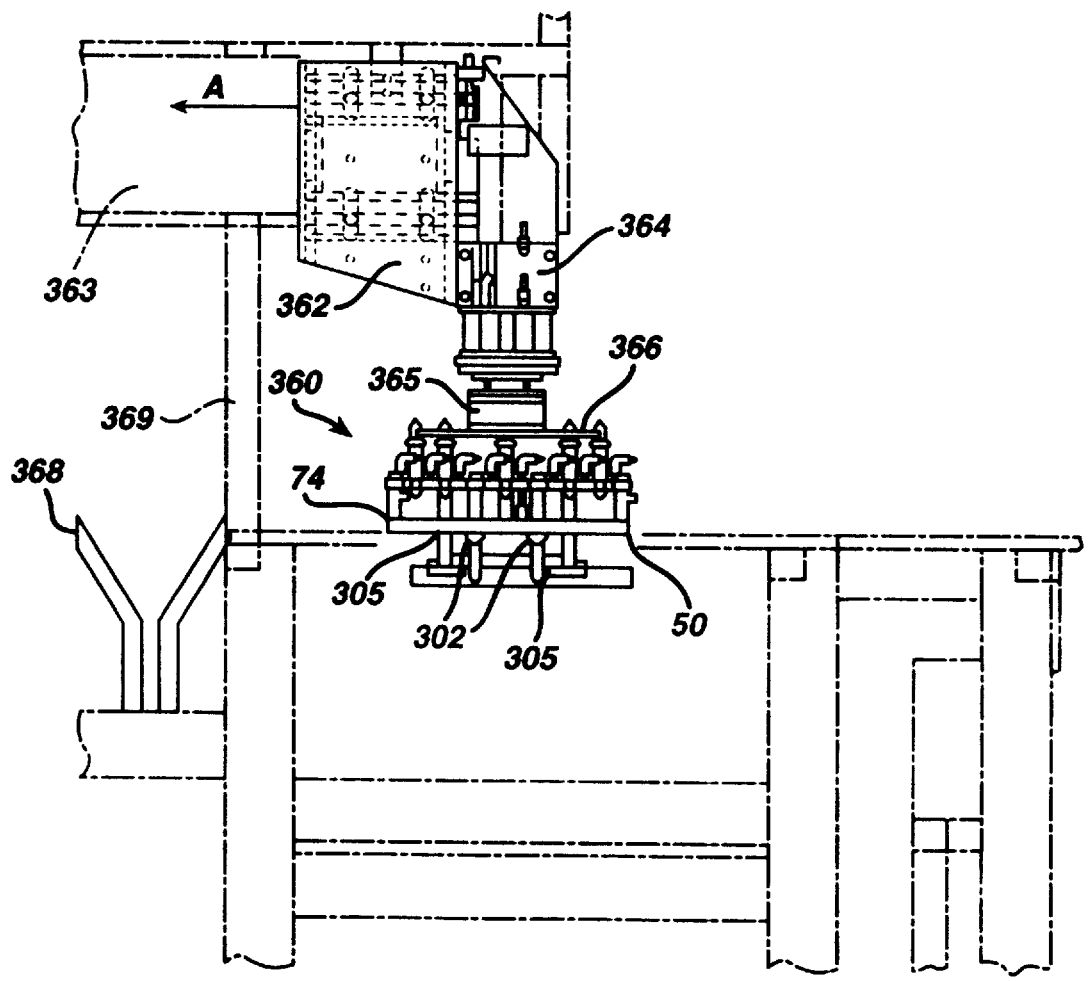
FIG. 18(a) is an end elevation view of the first robotic dis-assembly device of the present invention.

The first robotic dis-assembly device 360 is further illustrated in FIG. 18a in which a plurality of suction grips secure both the lens molds 9 and the lens mold carrier plate 74 and lift them from the top chamber plate 50 for discharge of the used molds and transport of the carrier frame 74 back to the return conveyor 21. The disassembly apparatus 360 is mounted for vertical reciprocation in the X axis on a horizontally reciprocating carrier 362. A pneumatic cylinder 364 is fixably secured to the traveling carrier 362 and reciprocates the disassembly 360 by virtue of its connection to frame 366.

Figure 18B:
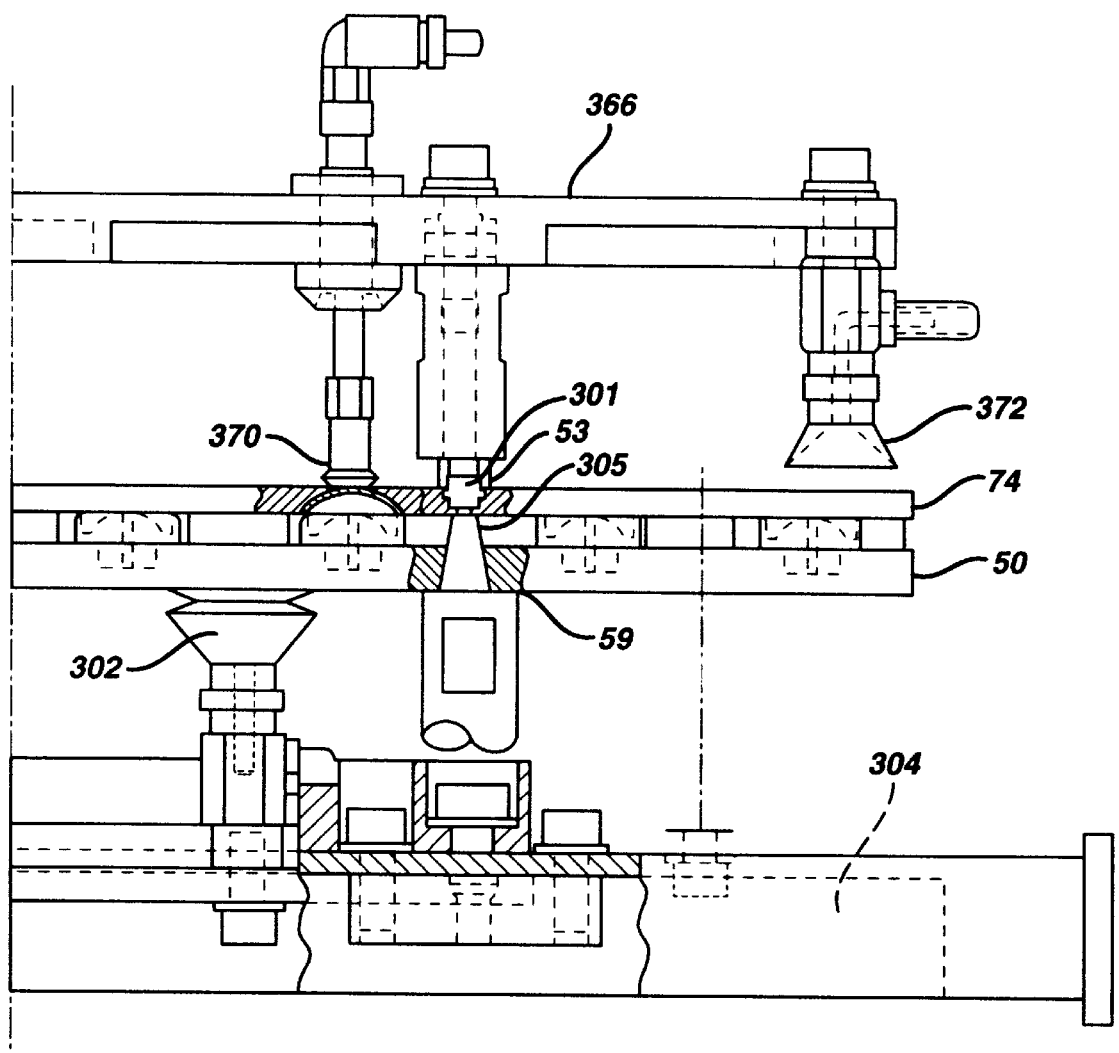
FIG. 18(b) is a partially cross-sectioned detail of a portion of the dis-assembly device illustrated in FIG. 18(a).

After the third robotic assembly has secured the top chamber plate at position B, the pneumatic cylinder 364 lowers frame 366 to bring the vacuum grips of the disassembly apparatus 360 into engagement with the individual front curve mold halves and the lens mold carrier plate as illustrated in FIG. 18b. The dis-assembly apparatus 360 includes an array of individual mold grips 370 which individually grip each mold half in the array and a plurality of carrier grips 372 which grip the lens mold carrier 74. Each grip is individually supported by the frame 366, which is fixably connected to air cylinder 364 for vertical reciprocation. In one preferred embodiment of the present invention, the dis-assembly apparatus 360 includes 4×8 array of 32 individual mold grips 370 and 8 larger carrier grips 372. A vacuum is established in each of the grips, and the pneumatic cylinder 364 lifts the lens mold carrier plate 74 and each of the lens molds 9 away from the top chamber plate 50 and begins its horizontal reciprocation in the Y axis of FIG. 1, or in the direction of arrow A of FIG. 18a. The dis-assembly apparatus pauses over collection bin 368 and the vacuum lines to each of the individual lens molds grips 370 are opened allowing the lens molds to fall into the collection receptacle 368 for grinding and recycling. An air blow is also provided to assure that molds disengage from grips 370. Carrier 362 then carries the carrier plate 74 to the return conveyor 21 to a position generally illustrated at 21a in FIG. 20. Carrier 362 and the dis-assembly apparatus 360 are transported in the direction of arrow A by an IKO ball screw drive 363 which is secured to stationary frame member 369. The construction and operation of the IKO ball screw drive 363 is essentially the same as that previously described with respect to FIGS. 17 and 19.

After the first hydration carrier has been dis-assembled, the third robotic assembly transports the top chamber plate and contact lenses in the X axis as illustrated in FIG. 1, and then raises the top chamber plate to the position C illustrated in FIG. 21 for flushing of the lenses at flush station 380. Flush station 380 includes an array of nozzles 381 which are configured in an array which matches the array of the lenses on the top chamber plate 50, and which in the preferred embodiment of the invention is a 4×8 array of thirty-two nozzles. The deionized water flushing solution is valved by a pneumatic control valve 382 and is of 0.5 to five seconds in duration. The flushing cools the lens from the approximate 70° C. temperature of the hydration path and removes any residual aqueous solution remaining on the lens from hydration. After the flushing cycle is completed, the third robotic assembly translates in the X axis of FIG. 1 and FIG. 21, rotates 180° as illustrated by the arrow D in FIG. 21, and then descends downwardly in the Z axis to meet with the hydration base 60 to form the second hydration carrier. The hydration base 60, as illustrated in FIGS. 6 and 7 has four upstanding conduits 63 which passed through the openings 59 defined in the top chamber 50 (as illustrated in FIG. 4) to register the top chamber plate with the hydration base and thereby form the individual hydration chambers illustrated in FIG. 10.

The hydration base member 60 is positioned by an air cylinder drive 385 illustrated in FIG. 20 which drives a push arm 386 from the return conveyor 21 to the position D illustrated in FIG. 20. The hydration base members, as they are returned along conveyor 21, encounter a bridge 387 which is suspended above the return conveyor 21. The top chamber plates, which are also returned along conveyor 21, are of a height that allows the top chamber plate to pass under the bridge 387 and continue on to the first assembly mechanism as previously described with respect to FIGS. 11–13. The hydration base members 60, being taller than the top chamber plates 50, encounter the bridge 387 and are held in a position illustrated at 21b in FIG. 20. Push arm 386 begins its stroke at the dotted line position 386a and returns the hydration base 60 between a pair of guides, one of which is illustrated at 388 to the assembly position B illustrated in FIG. 20.

Base members are held back by pneumatic cylinder stopper while push arm 386 is at position D so that push arm 386 can return without hitting a base member at 21b. Top chamber plates are also held back by a stopper upstream of position 21a so that top chamber and mold carrier 74 are sequenced properly.

After assembly, the second hydration carrier, is transported by an indexing conveyor. The indexing conveyor includes a pneumatic cylinder 390 which drives a linear push plate 392 in the X axis direction of FIGS. 1 and 20. The push plate 392 advances the hydration base for an index distance equal to the width of the base and then returns to the position illustrated in FIG. 20. The path of the index conveyor is defined by guides 394 and 395 which define a path width equal to the length of the second hydration carrier 400, and which support the hydration base member 60 for transport above an open collection sump 4. Three assembled second hydration carriers 400 are illustrated in FIG. 20 proceeding from the first extraction station 32. As the pneumatic cylinder is actuated, the push plate 392 advances or indexes the entire string of second hydration carriers 400 along the conveyor path defined by guides 394 and 395.

As illustrated in FIG. 3, there are six extraction stations sequentially located along the path of the extraction or index conveyor. Each of the second hydration carriers are indexed in step wise manner down the extraction conveyor path by the pneumatic cylinder drive 390. Each of the six extraction stations 32 receive the second hydration carriers and periodically flush and exchange the deionized water therein to continue to leach the by-products of hydration from the contact lenses while carried there within.

While prior art hydration baths required 120–180 minutes to achieve satisfactory results, it has been found that a five to ten minute cycle of cycled flushes and leaching will produce a lens with no detectable contaminants therein. In the preferred embodiment, a flush cycle of approximately 18 seconds (with 1–2 seconds of actual flushing in the cycle) is provided for each extraction station 32, and the extraction stations are spaced from one another a distance corresponding to the width of three of the hydration base members 60. Thus, step wise indexing of the hydration base members results in a 1–2 second flush (in a 17 second flush period) and a 68 second leach cycle to provide maximum exchange of leachable materials from the lens. This cycle is repeated six times for a total of slightly more than seven minutes, the total time for travel through the apparatus of the present invention, which, including the hydration tank time, is approximately 15 minutes.

EXTRACTION STATIONS

Figure 23:
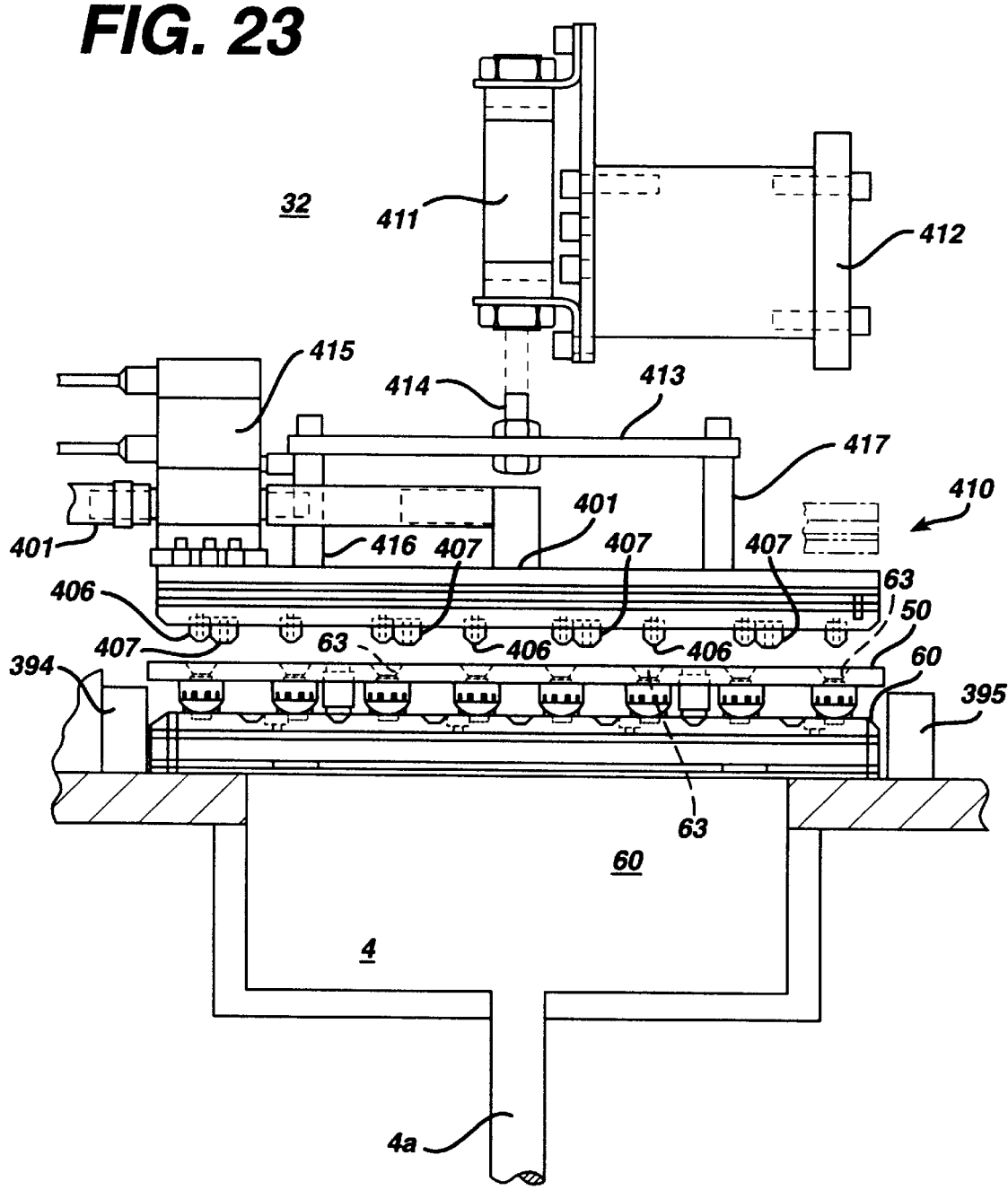
FIG. 23 is a diagrammatic elevation view of an extraction station of the present invention.
Figure 24:
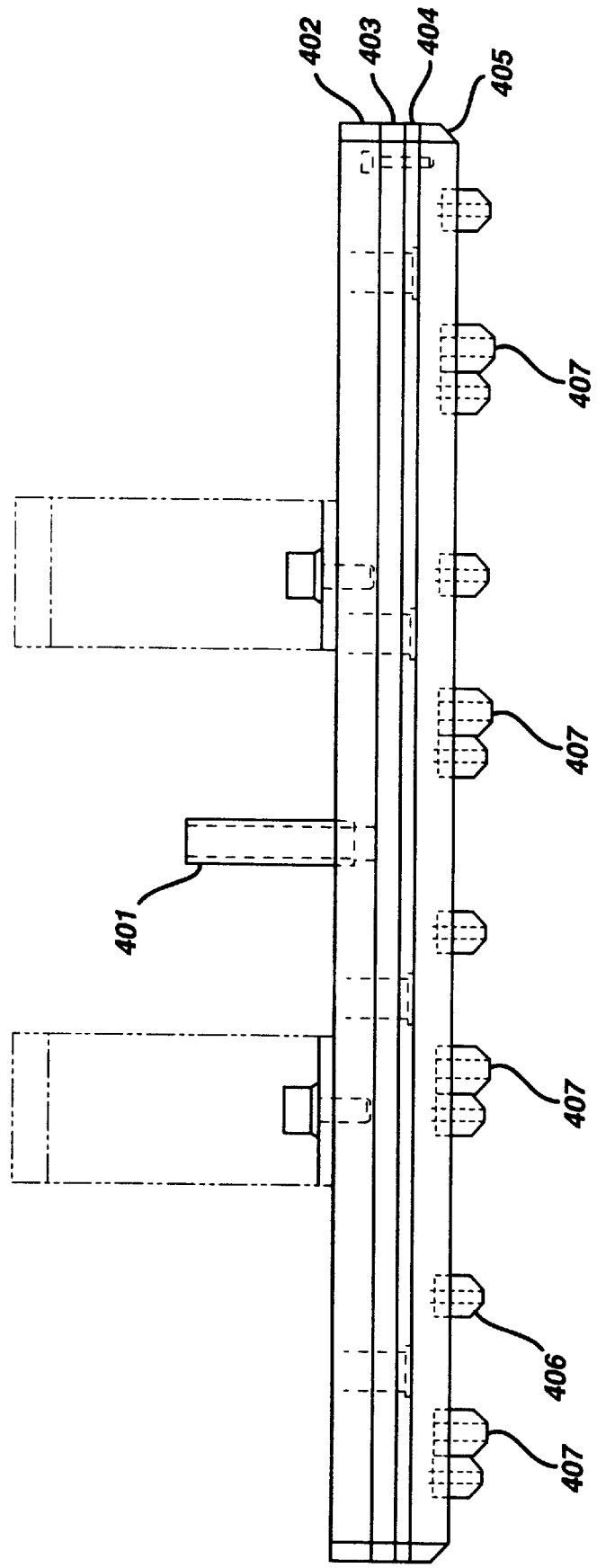
FIG. 24 is detailed and partially cross-sectioned view of the flushing head of the extraction apparatus illustrated in FIG. 23.
Figure 24A:
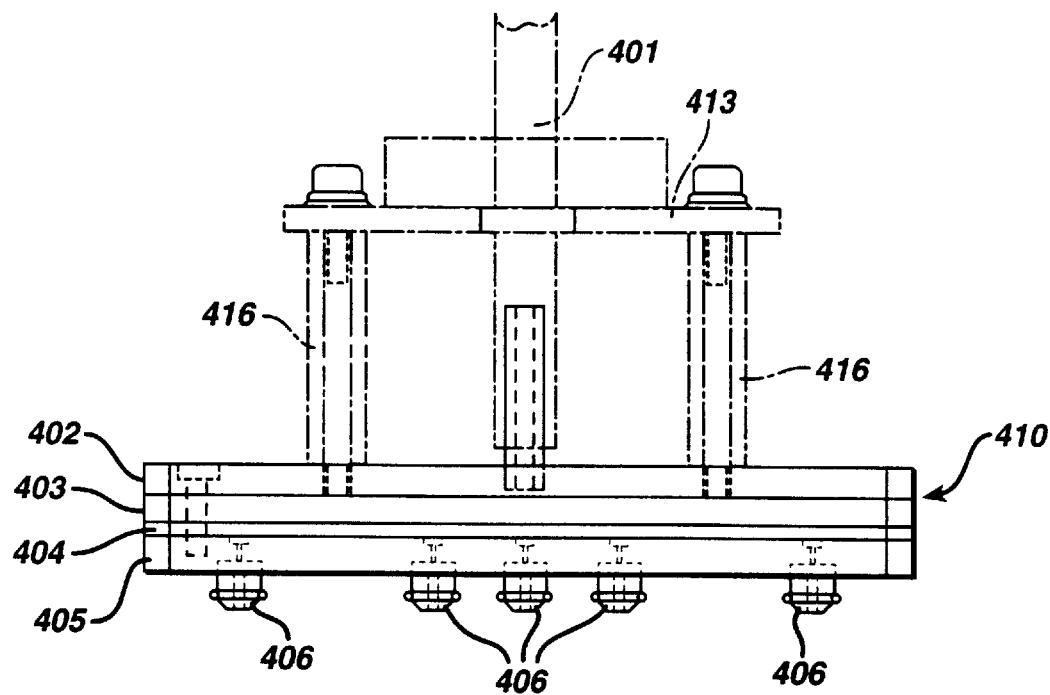
FIG. 24(a) is an end view of the flushing or extraction head illustrated in FIG. 24.
Figure 25:
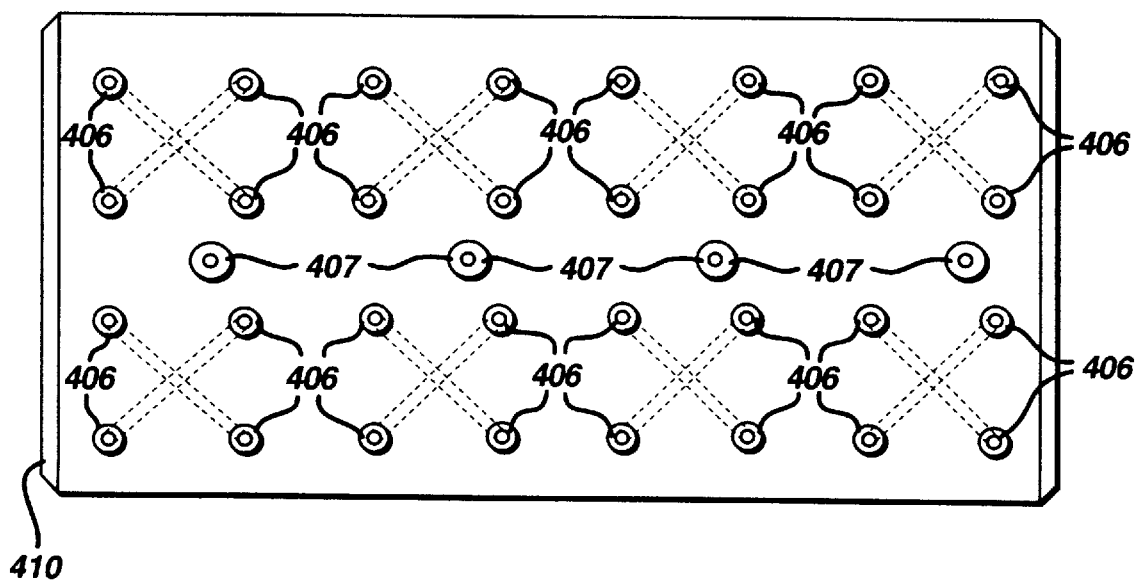
FIG. 25 is a top plan view of the underside of the lens flushing head utilized in the extraction station of the invention illustrated in FIGS. 3, 23 and 24.

A representative extraction station is illustrated in FIGS. 23–25 in which the combined top chamber plate 50 and hydration base member 60 form the second hydration carrier 400. A flush manifold 410 illustrated in FIG. 24 and 25 includes a deionized water supply conduit 401 manifold members 402, 403, 404 and 405 and a plurality of engagable nozzles. The engagable nozzles include an array of 32 direct engagement nozzle 406 and four socket couplings 407 which receive within the upstanding fluid couplings 63 which pass through the openings 59 of the top chamber plate 50. The direct engagement couplings are received within the individual openings 51 defined in the top chamber plate and illustrated in detail in FIG. 10. They provide fluid, in the form of air or deionized water to the hydration chamber illustrated in FIG. 10 through opening 51. Fluid is also supplied by the socket couplings 407 to the hydration base via the upstanding conduit couplings 63 which then convey the liquid therein through manifold passageways 64 and 66 to each of the openings 62 defined in the lens carrier assemblies. Thus, when the flushing manifold 410 is lowered into engagement with a second hydration base member, the lens is flushed from both sides for a period of 1–2 seconds duration which removes existing residual deionized water from the previous extraction cycle, and provides a fresh leach solution for the hydration chamber. The deionized water flows through the radial openings 55 in the hydration chamber and is collected by V-shaped trough 70 defined by hydration base member 60. The waste water is then conveyed to the side of the hydration base member to drain into the collection sump 4 there below. The extraction manifold 410 is vertically reciprocated by means of a pneumatic motor 411 which is fixably attached to a stationary frame 412. A carrier plate 413 is fixably attached to the drive piston of pneumatic cylinder 411 and reciprocates vertically in the Z axis in response to the PLC control instructions. A valve member 415 is also provided to regulate the flow of deionized water through the extraction manifold. Extraction manifold 410 is secured to the support plate 413 by bracket members 416, 417.

THE SEPARATION STATION

Figure 26:
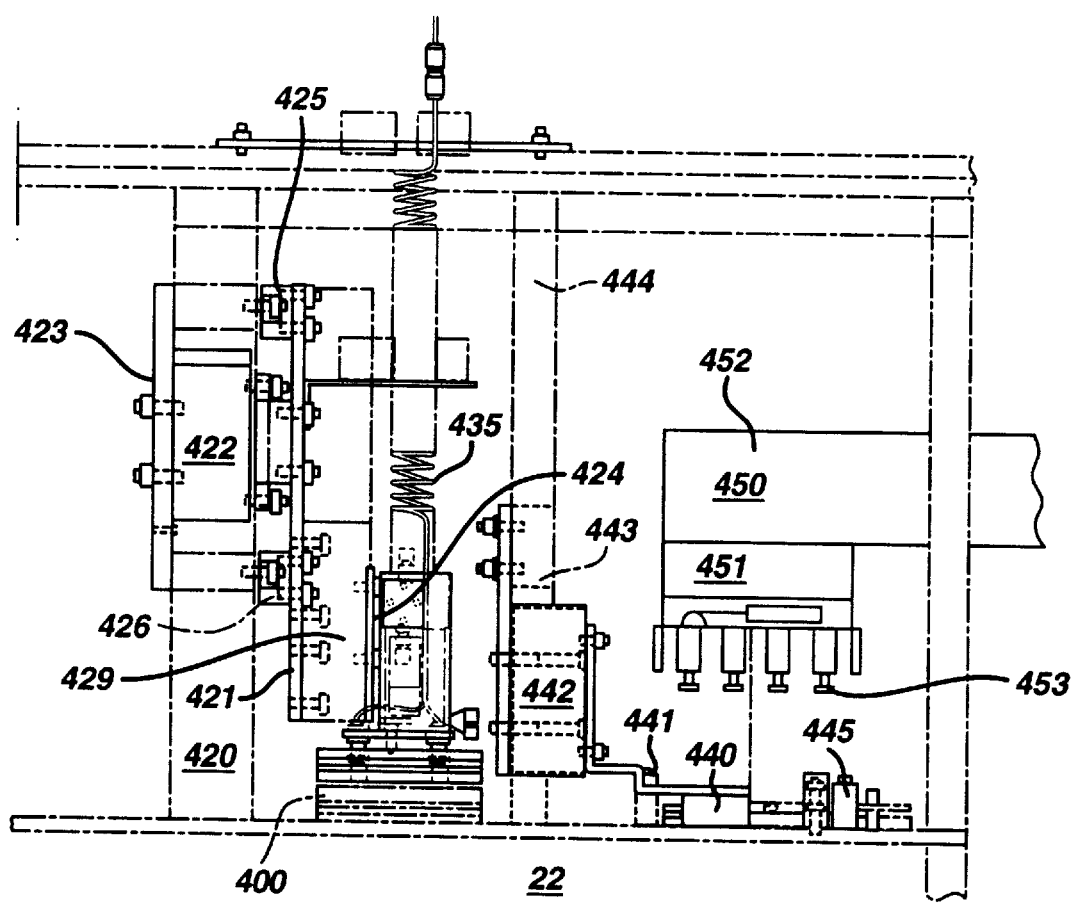
FIG. 26 is a side elevation view of the separation station utilized in the present invention.
Figure 27:
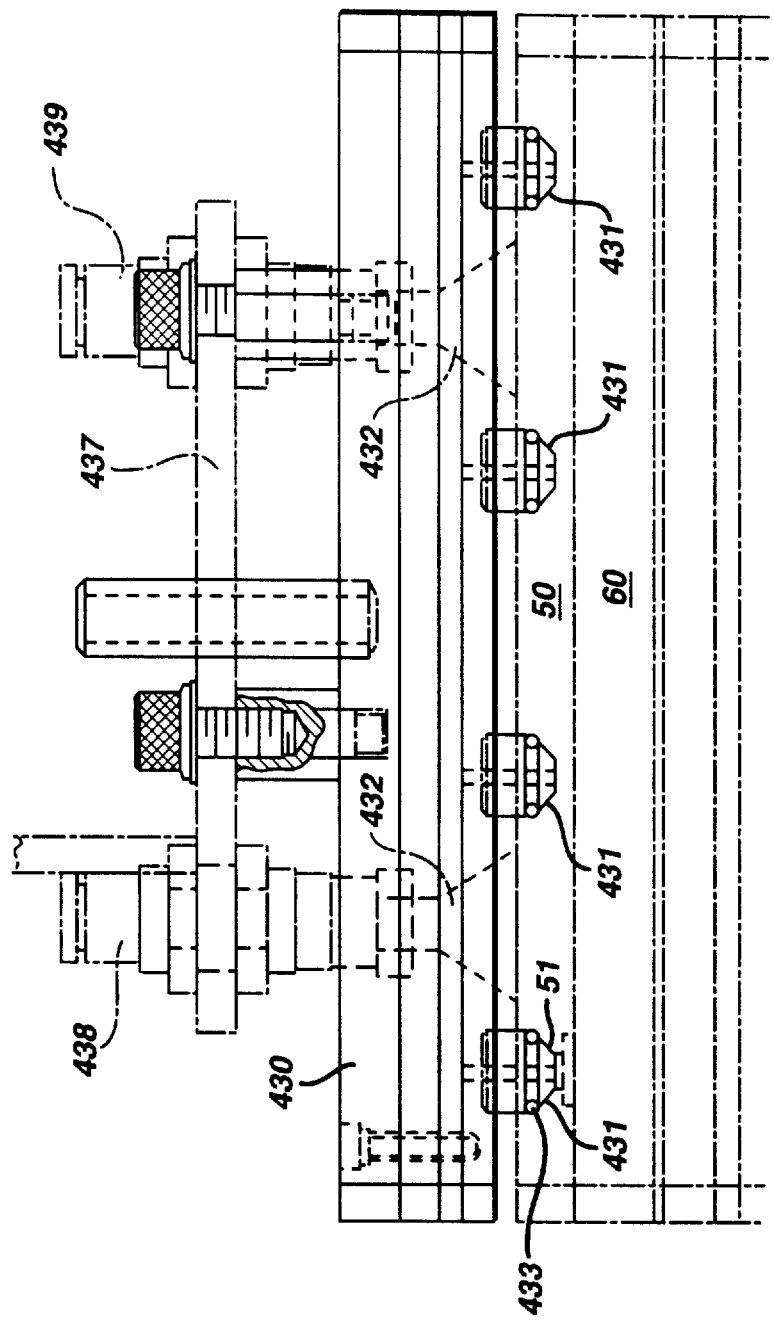
FIG. 27 is a partially cross-sectioned elevation end view of a portion of the second dis-assembly device utilized in the present invention.
Figure 28:
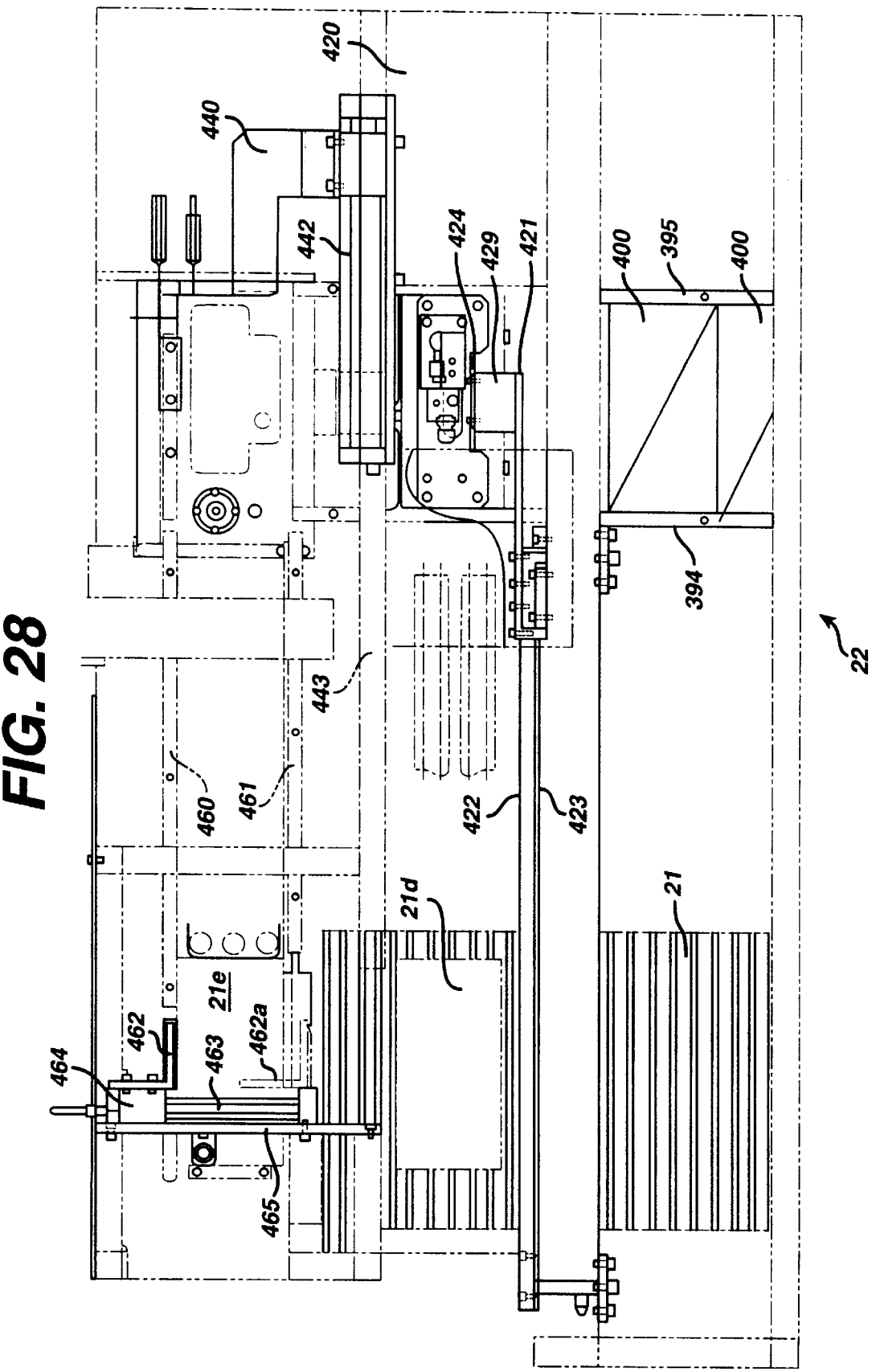
FIG. 28 is a partially cross-sectioned top plan view of the separation station used to dis-assemble the second hydration carrier.
Figure 29:
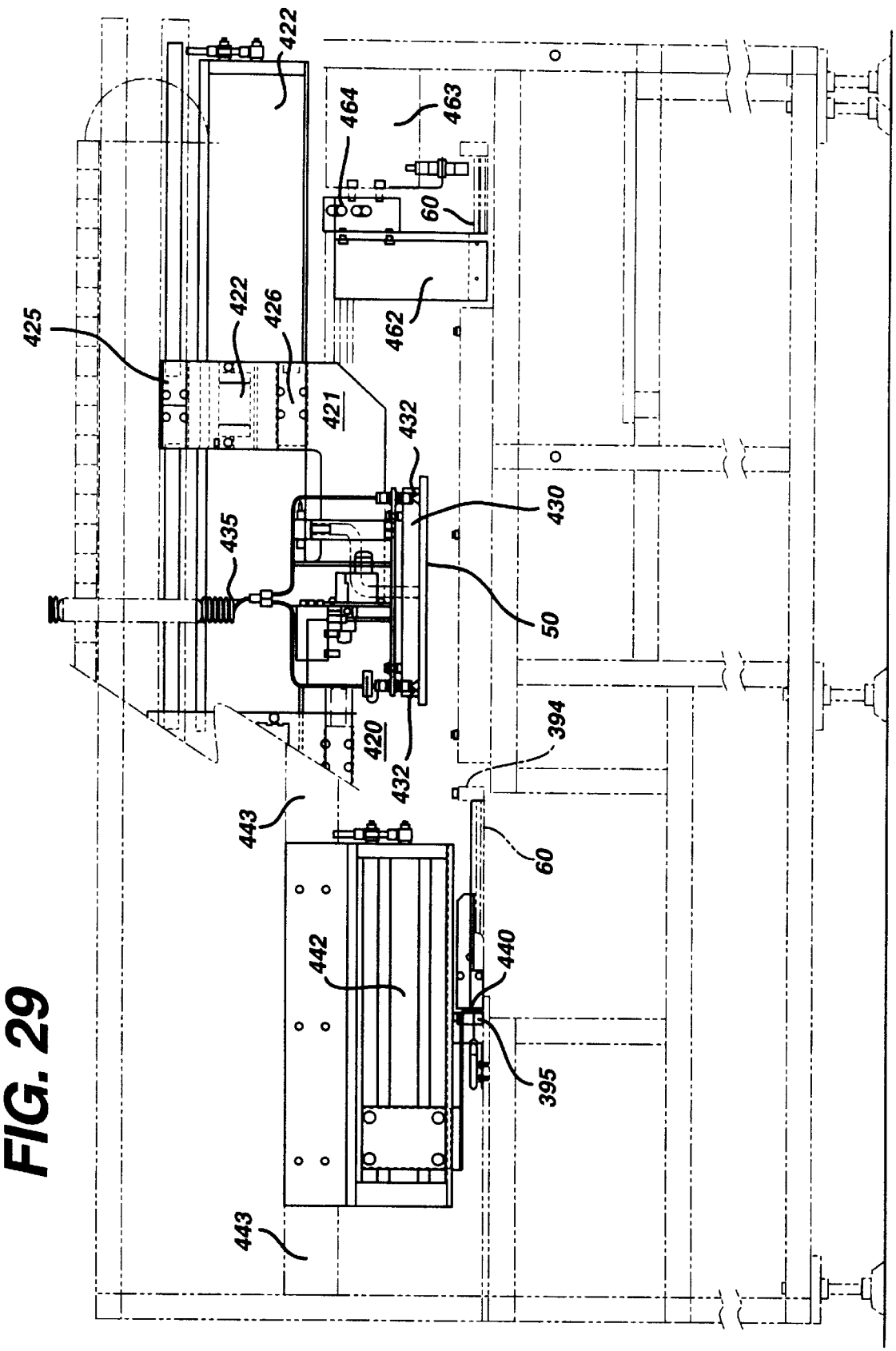
FIG. 29 is a partially cross-sectioned elevation end view of the separation station illustrated in FIGS. 26 and 28.

The separation station of the present invention which provides for separation of the top chamber plate 50 from the hydration base 70, and the transfer of contact lenses from the hydration base carrier to a lens transfer means is more fully illustrated and described with respect to FIGS. 26–29 in which FIG. 26 is an elevation end view of the separation apparatus. FIG. 27 is a partially cross-section view of the final extraction and separation apparatus, FIG. 28 is a top plan view and FIG. 29 is an end view of the entire hydration apparatus 10.

The apparatus illustrated in FIG. 26, 27, 28 and 29 is found within the dotted line box 22 of FIG. 1. The second disassembly apparatus 420 is illustrated in FIG. 26 in engaging contact with a second hydration carrier 400. The second dis-assembly device includes a vertically reciprocal carrier 421 which is fixed to an pneumatic cylinder 422 for translation in the Y axis (as illustrated in FIG. 1) from the extraction conveyor line to the return conveyor 21. The pneumatic cylinder drive is fixably supported by plate 423 which is secured by the hydration frame. The vertical reciprocation in the Z axis is accomplished with an IKO Ball Screw drive 429, which reciprocates carriage 424 along the Z axis. The horizontal translation of the second dis-assembly apparatus is supported by frame member 423 and drive rollers 425, 426. The vertically reciprocal carriage 424 reciprocates with respect to the horizontal transverse carriage 421 by means of an IKO drive contained within housing 429.

As illustrated in FIG. 27, the second dis-assembly device includes a transport head 430 which is equipped with an array of fluid injection nozzles 431 and vacuum grips 432 which are used to secure the top chamber plate 50 to the vacuum carriage 430 for transport to the return conveyor 21. Each of the individual nozzles 431 are equipped with an O ring seal which seats against the outwardly sloping opening 51 defined in the top chamber plate 50. The second disassembly apparatus 420 is supplied with vacuum for the vacuum grip means 432 and with deionized water for the nozzles 431. Both are supplied through flexible conduits 435 which travel with the second dis-assembly apparatus. In the preferred embodiment four vacuum gripping means 432 are used with two at either end of the top chamber plate. A mounting bracket means 437 secures the water manifold 430 to the second disassembly device 420 and provide couplings 438, 439 for the vacuum lines which feed vacuum grips 432. During disassembly of the second hydration carrier, deionized water is supplied through the orifice 62 in each of the convex lens transfer devices mounted in the top chamber plate 50. The deionized water is supplied while vacuum pick up is applied to grip means 432. The separation of the two occurs during water dose which ensures that the contact lenses remain in the concave holding means 61 of the hydration base.

Also illustrated in FIG. 26, in side view, is a push plate for 440 which is used to return the hydration base members to the return conveyor 21 after the lenses had been removed by a lens transfer means. Push plate 440 is connected to carriage member 442 by arm 441 which is reciprocated along the Y axis of FIG. 1 by means of a drive cylinder 443 secured to frame member 444.

Sensors 445 are used in the transfer of lenses from the hydration base 60 to the lens transfer means 450. Lens transfer means 450 includes a carriage member 451 which is mounted for both vertical and horizontal reciprocation with respect to horizontal member 452. The lens transfer device includes a 4×8 array of 32 downwardly descending fingers, each of which terminates in a convex lens attachment surface 453. The lens transfer apparatus is more completely described in co-pending application, U.S. Ser. No. 08/431, 633 entitled "Contact Lens Transfer Device", filed on May 1, 1995.

As illustrated in FIG. 28, the first disassembly apparatus 420 moves the top chamber plate 50 from the position illustrated in FIG. 28 to the position illustrated at 21*d* on return conveyor 21 as the second dis-assembly apparatus 420 traverses the pneumatic cylinder drive 422. When the second dis-assembly apparatus 420 has reached the position over 21*d*, it again reciprocates in the Z axis to lower the top chamber plate to the return conveyor 21 before vacuum grips 432 are released. After depositing top chamber plate on the return conveyor 21, the second dis-assembly apparatus 420 returns to the position illustrated in FIG. 28 to begin another cycle.

In a similar matter, after the lens transfer means 450 has removed the contact lenses from the hydration base 60, the push plate 440 translates the hydration base 60 between guide rails 460, 461 to the position 21*e* immediately adjacent to return conveyor 21. A second push plate 462, which is powered by another drive cylinder mechanism 463, is used to drive the push plate 462, along its path of travel. The drive cylinder 463 is mounted for reciprocation in the X axis of FIG. 1 along support beam 465. The drive 463 moves the push plate 462 to from the position illustrated in FIG. 28 to the position 462*a* immediately adjacent the return conveyor 21.

Thus, each of the second hydration carriers 400 is disassembled, with the top chamber plate 50 and the bottom hydration base 60 being sequentially returned along the return conveyor 21 for the next cycle of operation. While IKO ball screw drives have been used throughout the hydration apparatus for the movement of various components, it should be understood that other drive mechanisms such as rodless cylinders, pneumatic or hydraulic cylinders or mechanical screw or chain drives could be used to accomplish the same purpose.

THE WASH STATION

Figure 30:
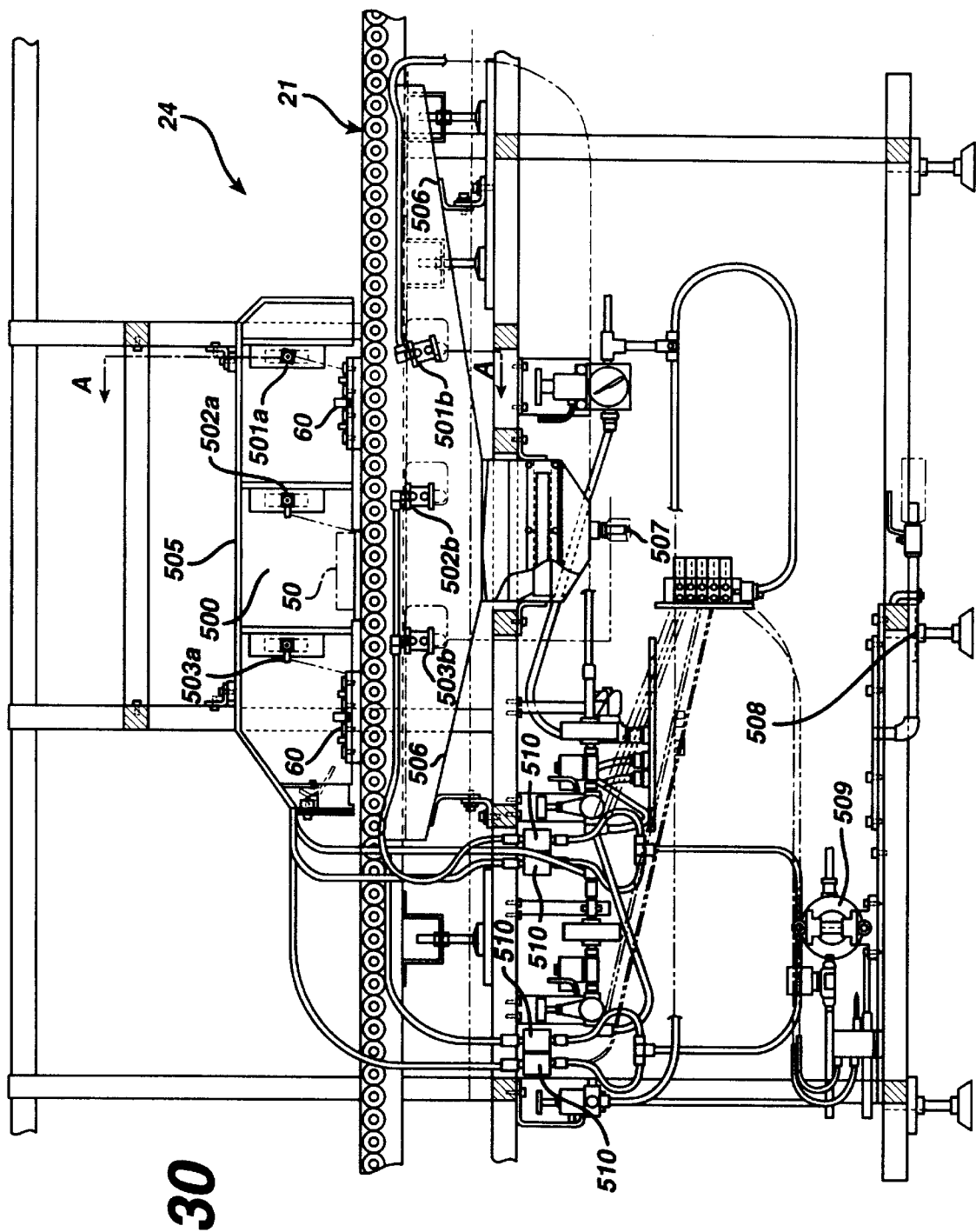
FIG. 30 is a partially cross-sectioned side elevation view of a washing station used in the present invention.
Figure 31:
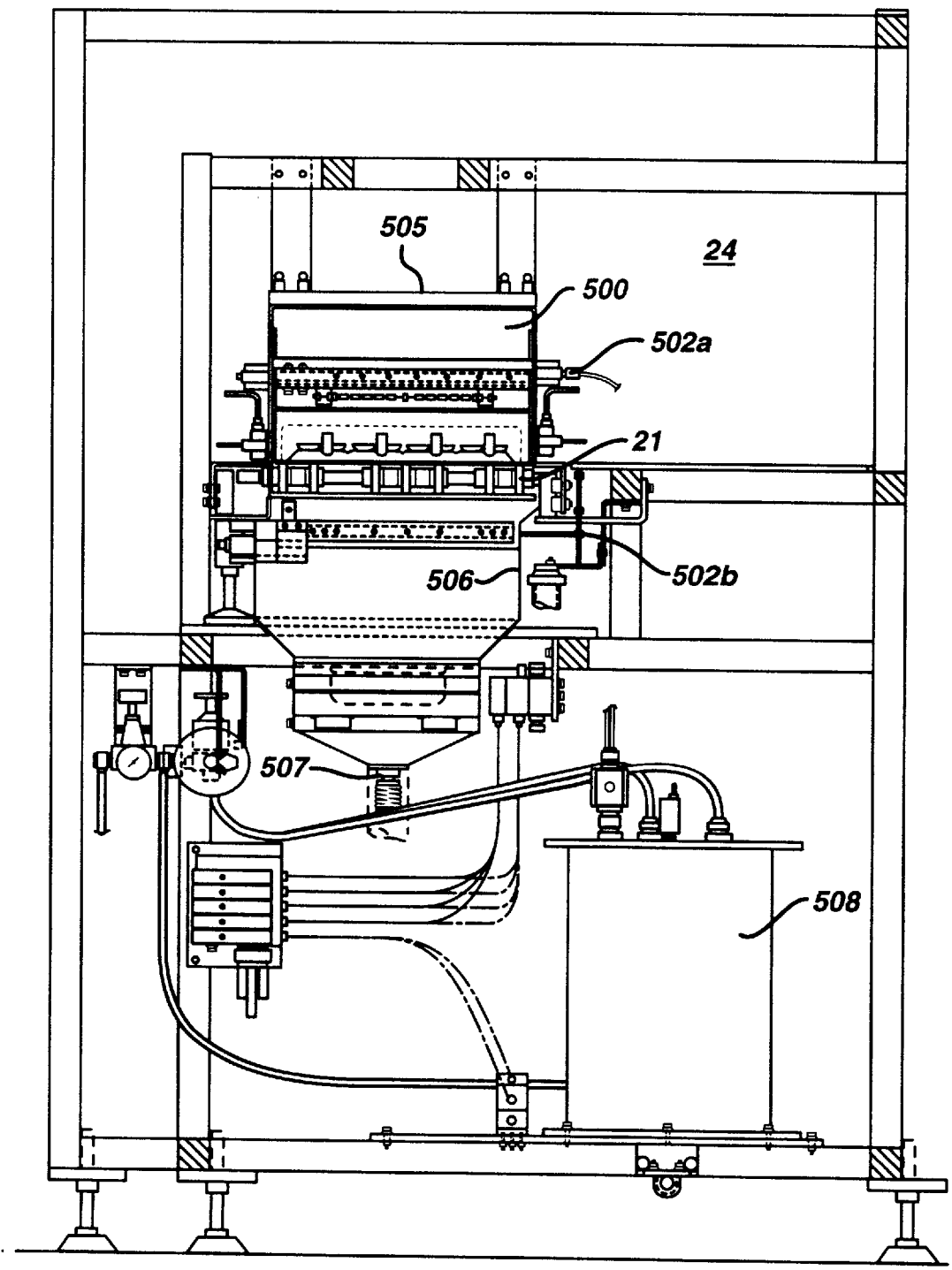
FIG. 31 is a partially cross-sectioned end view of the washing station illustrated in FIG. 30.
Figure 32:
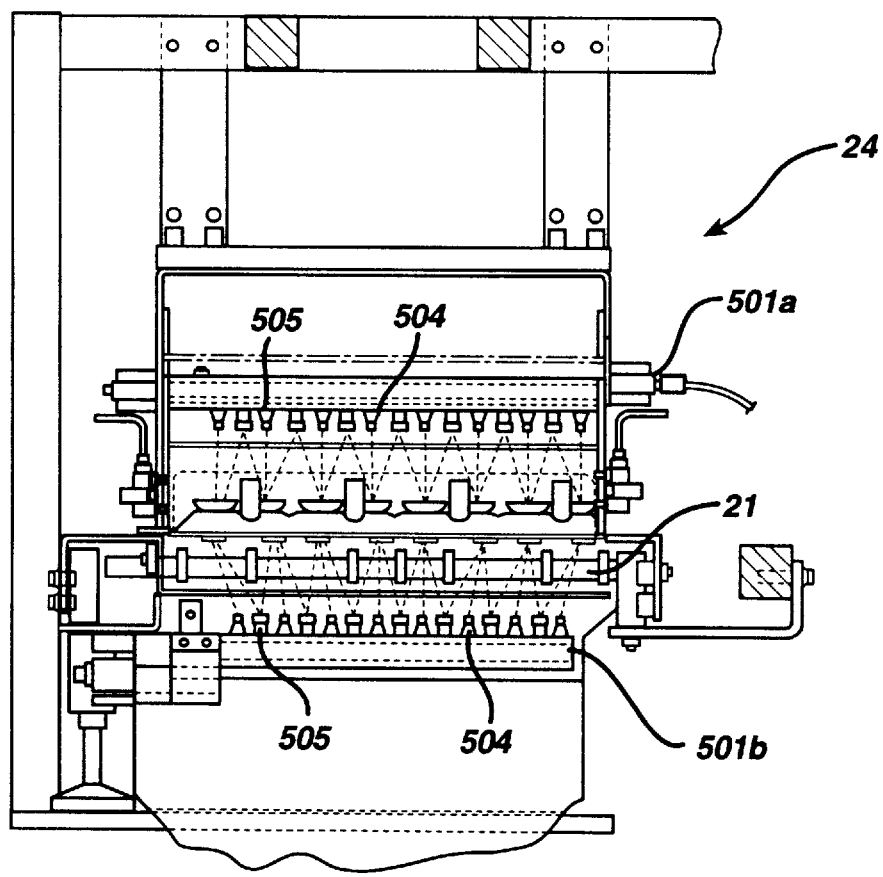
FIG. 32 is a partially cross-sectioned detail view of a portion of the washing station illustrated in FIG. 30, as taken along section line A—A.

The hydration apparatus of the present invention also includes a wash station illustrated in FIG. 1 within dotted line box 24. This wash station is further illustrated in FIGS. 30–32 in which FIG. 30 is an elevation view from the backside while FIGS. 31 and 32 are section views taken along section lines A–A$^1$ and B–B$^1$ of FIG. 30.

The wash station 24 includes the return conveyor 21 which is used to transport in alternate sequence the top chamber plates and the hydration base members of the present invention. As illustrated in FIG. 30, a pair of hydration base members and a single top chamber plate are illustrated in the wash chamber 500. The wash chamber 500 includes a plurality of nozzle arrays 501a, 501b, 502a, 502b, and 503a, and 503b. The interaction of nozzles of 501a and 501b is illustrated in FIG. 32 in which a plurality of precisely focused impingement jets are generated by high velocity impingement nozzles one of which is indicated at 504. The high velocity impingement nozzles are alternated with spray nozzles 505 to provide thorough cleaning of the top chamber plate and the hydration base member.

The nozzle array 501b is likewise equipped with alternating high velocity impingement nozzles 504 and spray nozzles 505. It should be noted that as the top chamber and the hydration base are returned along the return conveyor 21, the lens receiving surface of the hydration base member is oriented upwardly, while the lens transfer surface of the top chamber plate is oriented downwardly. Thus, the nozzle arrays 501a, 501b provide direct high velocity impingement cleaning to remove any contact lenses, or components thereof that adhered to either member during the hydration cycle. The back spray from the nozzles is contained within the wash chamber 500 by means of a housing 505 and a catch basin 506 which also serves to drain the wash water through drain 507. Nozzle arrays 502a, 502b, 503a and 503b are flood jet nozzles which are intended to flush away any lenses or portions thereof which were dislodged during the spray cleaning by nozzles 501a, 501b.

The wash station includes its own separate supply of deionized water which is accumulated in tank 508. The available water pressure in tank 508 is boosted by means of pump 509 and the spray sequence is controlled by a plurality of valves generally indicated at 510. Spray sequence may be continuous or cycled as desired.

While the invention has been particularly shown and described with respect to the preferred embodiments, it will be understood by those skilled in the art. The changes in forms and details may be made therein without departing from the spirit and scope of the invention, which is limited only by the scope of the following claims.

We claim:

1. An automated apparatus for hydrating a molded hydrophilic contact lens, said automated apparatus comprising:
   (a) a first robotic assembly for removing a plurality of contact lens molds from a carrier, each mold having a contact lens therein, and assembling said molds with a mold carrier and a plurality of lens transfer means to form a first hydration carrier;
   (b) a second robotic assembly for immersing said first hydration carrier in a hydration bath to hydrate the lens and release said lens from said mold, and to allow said lens to transfer from said mold to said lens transfer means; said second robotic assembly removing said first hydration carrier from said bath after a predetermined time;
   (c) a transport for transporting said first hydration carrier through said hydration bath;
   (d) a third robotic assembly for removing said molds from said lens transfer means and transporting said lens transfer means and said lenses to a subsequent processing station.

2. An automated apparatus as claimed in claim 1 wherein said first robotic assembly is a pick and place robot that picks a plurality of contact lens molds carried by one or more pallet carriers and places them in a lens mold carrier.

3. An automated apparatus as claimed in claim 2, wherein said lens transfer means includes a plurality of lens transfer assemblies for engaging said contact lens molds, and forming a hydration chamber there between.

4. An automated apparatus as claimed in claim 3 wherein said third robotic assembly includes a first robotic disassembly device to remove said lens mold and said mold carrier from the first hydration carrier.

5. An automated apparatus as claimed in claim 4, wherein said third robotic assembly further comprises a rotary transfer device for engaging said lens transfer plate and inverting it for assembly with a hydration base to form a second hydration carrier.

6. An automated apparatus as claimed in claim 4, wherein said first robotic disassembly device includes registration means which cooperate with a third robotic device to align a plurality of vacuum grips with said plurality of contact lens molds.

7. An automated apparatus as claimed in claim 4, wherein said third robotic assembly further comprises:
   (a) a rotary transfer device for engaging said lens transfer means and translating it to said first robotic disassembly device,
   (b) a third robotic device for registering said mold carrier for dis-assembly of said molds and said lens transfer means prior to forming a second hydration carrier.

8. An automated apparatus as claimed in claim 7 wherein said third robotic device includes at least one tapered pin for penetrating said mold carrier for registration of said mold carrier, and said dis-assembly device includes at least one female member for mating with said tapered pin.

9. An automated apparatus as claimed in claim 1, wherein said lens transfer means includes a top chamber plate having:
   a transport frame, said transport frame facilitating transfer of a contact lens between two processing stations;
   a plurality of carrier elements, each element including a body portion having a convex lens attachment surface on one end and a means for attaching each body portion to said transport frame on an opposite end; and
   a fluid line extending through each body portion of each element for introducing a fluid between said convex lens attachment surface and a contact lens carrier thereon to release said lens.

10. An automated apparatus as claimed in claim 9, wherein said lens transfer means further includes a plurality of magnets for engaging a plurality of magnets steels in said mold carrier to secure each of said molds to said carrier elements.

11. An automated apparatus as claimed in claim 9, wherein said convex lens attachment surface generally conforms to a concave surface of the contact lens to enable said convex lens attachment surface to hold the contact lens with surface tension.

12. An automated apparatus as claimed in claim 11 wherein said body portion is formed of polyetheretherketone and includes a circumferential wall having a plurality of openings formed therein, said wall formed proximal to a circumference of the convex lens attachment surface.

13. An automated apparatus as claimed in claim 9, wherein said body portion includes an annular shoulder formed proximal to a circumference of the convex lens attachment surface.

14. An automated apparatus as claimed in claim 9, wherein said top chamber plate further comprises the first hydration carrier having a plurality of concave lens holding surfaces, each of said concave surfaces associated with a respective carrier element to receive a lens attached thereto, and a fluid line extending through said body portion of said carrier element for introducing a fluid between said convex lens attachment surface and said lens to release the lens from said convex lens attachment surface and transfer said lens to said concave holding surface.

15. An automated apparatus as claimed in claim 14 wherein said concave lens holding surface defines a hydration chamber between said concave holding surface an the convex lens attachment surface.

16. An automated apparatus as claimed in claim 1, wherein said second robotic assembly slides said first hydration carrier into said hydration bath at a predetermined angle.

17. An automated apparatus as claimed in claim 16, wherein said second robotic assembly slides said first hydration assembly into said hydration bath with the contact lens molds positioned above said lens transfer means.

18. An automated apparatus as claimed in claim 17, wherein said predetermined angle is 45° from the surface of the hydration bath, ±20°.

19. An automated apparatus as claimed in claim 1, wherein said second robotic assembly slides said first hydration carrier into said hydration bath at a predetermined speed.

20. An automated apparatus as claimed in claim 19, wherein said predetermined speed does not exceed 40 mm/sec.

21. An automated apparatus as claimed in claim 1, wherein said means further comprises a heater for heating the temperature of the hydration bath to a predetermined temperature ranging from 55° C. to 90° C.

22. An automated apparatus as claimed in claim 21, wherein said predetermined temperature is 70° C.

23. An automated apparatus as claimed in claim 1, wherein said hydration bath is a bath of deionized water with a surfactant therein.

24. An automated apparatus as claimed in claim 23, wherein said surfactant ranges from 0.005% to 5% of said hydration bath.

25. An automated apparatus as claimed in claim 1 wherein said second robotic assembly further includes a pick unit for removing said hydration carrier from said bath at a speed that does not exceed 24 mm/sec.

26. An automated apparatus as claimed in claim 1, wherein said lens transfer means includes a lens transfer plate comprising a plurality of convex lens carrier elements, with a convex carrier element associated with each lens to be hydrated, said automated means further comprising a plurality of second hydration carriers, each of said second hydration carriers having a plurality of concave lens holding surfaces that are arranged to cooperate with said convex lens carrier elements to define a plurality of hydrating chambers therebetween, wherein said third robotic assembly assembles said lens transfer plate and said lenses with said second hydration carrier for transport to said subsequent processing station.

27. An automated apparatus as claimed in claim 26, wherein said apparatus further includes a plurality of extraction stations for receiving said second hydration carriers and said hydration chambers defined therein.

28. An automated apparatus as claimed in claim 26, wherein said automated means further comprises an index conveyor for advancing each of said second hydration carriers through each of said extraction stations.

29. An automated apparatus as claimed in claim 1 in which said mold carrier defines a plurality of openings for receiving said plurality of contact lens molds from said first robotic assembly, each of said openings having a resilient member therein for receiving a one of said contact lens molds.

30. An automated apparatus as claimed in claim 29 in which said mold carrier further includes a plurality of magnet steels for cooperating with a plurality of magnets carried by a top chamber plate to secure said mold carrier to said top chamber plate.

31. An automated apparatus as claimed in claim 30 in which said top chamber plate supports said plurality of lens transport means, with a single one of said lens transfer means aligned with a single one of said contact lens molds carried by said mold carrier to thereby form a first hydration carrier.

32. An automated apparatus for hydrating a hydrophilic lens, said apparatus comprising:
(a) a plurality of carriers, each carrier having
(i) a lens transfer plate, said lens transfer plate having a plurality of lens carrier elements, each carrier element having a convex lens attachment surface, and each lens attachment surface defining a fluid port therein for introducing a fluid between said convex lens attachment surface and a contact lens carrier thereon;
(ii) a hydration base, said hydration base defining a plurality of concave lens holding surfaces with a concave lens holding surface associated with a lens carrier element to define a hydration chamber therebetween, each concave lens holding surface also defining a fluid port therein for introducing a fluid between said concave holding surface and a contact lens carrier within said hydration chamber;
(b) a plurality of automated extraction stations, each station having a discharge manifold, said discharge manifold cooperating with said carriers to provide a flow of fluid within each hydration chamber;
(c) an index transport for conveying each of said hydration bases through each of said plurality of extraction stations; and
(d) a controller for sequencing the flow of fluid at each station with the conveyance of each carrier means thereto.

33. An automated apparatus for hydrating a hydrophilic lens as claimed in claim 32 wherein fresh deionized water is introduced into said hydration chambers at each automated extraction station to flush leachable substances from the hydrating chambers.

34. An automated apparatus as claimed in claim 33 wherein said apparatus further includes a transport path between each of said automated extraction stations wherein a fluid in said hydration chambers and an incremental residence time on said transport path between each of said extraction stations is used to extract impurities from said contact lens through mass transfer exchange.

35. An automated apparatus as claimed in claim 34 wherein said controller controls said incremental residence time and the duration of the flow of deionized water through each hydration chamber.

36. An automated apparatus as claimed in claim 32 wherein each of said lens carrier elements further includes a body portion having a circumferential wall with a plurality of radial openings formed therein, said wall formed proximal to a circumference of the convex lens attachment surface.

37. An automated apparatus as claimed in claim 32 wherein said apparatus further comprises a final station for separating said lens transfer plate and said hydration base, said final station having a fluid discharge manifold to supply a fluid to a pivot defined in said convex lens attachment surface to ensure transfer of said lens to said concave lens holding surface prior to separation of said carrier means.

38. An automated apparatus as claimed in claim 32 wherein said index transport further includes a walking beam assembly for transporting said carriers through said hydration bath.

39. An automated apparatus as claimed in claim 32 wherein said index transport further includes at least one pair of fixed supports and at least one walking beam having a pair of moveable supports for each of said carriers.

40. An automated apparatus as claimed in claim 39 wherein said index transport further includes at least two pair of fixed supports for supporting each of said carriers at a diagonal within said hydration tank, and two walking beams, each beam having a pair of moveable supports for each of said carriers.

41. An automated apparatus as claimed in claim 32 wherein said transport frame includes a resilient support for centering and supporting each of said contact lens molds during transport.

\* \* \* \* \*